United States Patent
Raleigh et al.

(10) Patent No.: US 10,798,558 B2
(45) Date of Patent: Oct. 6, 2020

(54) ADAPTING NETWORK POLICIES BASED ON DEVICE SERVICE PROCESSOR CONFIGURATION

(71) Applicant: Headwater Research LLC, Tyler, TX (US)

(72) Inventors: Gregory G. Raleigh, Woodside, CA (US); James Lavine, Corte Madera, CA (US)

(73) Assignee: HEADWATER RESEARCH LLC, Tyler, TX (US)

( * ) Notice: Subject to any disclaimer, the term of this patent is extended or adjusted under 35 U.S.C. 154(b) by 0 days.

(21) Appl. No.: 16/213,612

(22) Filed: Dec. 7, 2018

(65) Prior Publication Data

US 2019/0261160 A1    Aug. 22, 2019

Related U.S. Application Data

(60) Continuation of application No. 15/446,279, filed on Mar. 1, 2017, now Pat. No. 10,171,988, which is a
(Continued)

(51) Int. Cl.
*H04W 8/18*    (2009.01)
*H04L 12/14*    (2006.01)
(Continued)

(52) U.S. Cl.
CPC ........... *H04W 8/18* (2013.01); *H04L 12/1403* (2013.01); *H04L 41/0816* (2013.01); *H04M 15/00* (2013.01); *H04M 15/58* (2013.01); *H04W 4/24* (2013.01); *H04W 12/06* (2013.01); *H04W 12/08* (2013.01); *H04W 24/10* (2013.01);
(Continued)

(58) Field of Classification Search
CPC . H04L 12/14; H04L 12/1403; H04L 41/0816; H04L 41/0893; H04L 41/5003; H04L 41/5025; H04M 15/00; H04M 15/58; H04M 2215/0188; H04W 4/24;
(Continued)

(56) References Cited

U.S. PATENT DOCUMENTS

| 5,131,020 A | 7/1992 | Liebesny et al. |
| 5,283,904 A | 2/1994 | Carson et al. |

(Continued)

FOREIGN PATENT DOCUMENTS

| CA | 2688553 A1 | 12/2008 |
| CN | 1310401 A | 8/2001 |

(Continued)

OTHER PUBLICATIONS

"Ads and movies on the run," the Gold Coast Bulletin, Southport, Qld, Jan. 29, 2008.
(Continued)

*Primary Examiner* — Andrew Joseph Rudy
(74) *Attorney, Agent, or Firm* — James E. Harris

(57) ABSTRACT

Disclosed herein are various embodiments to prevent, detect, or take action in response to the moving a device credential from one device to another, the improper configuration of a service processor, a missing service processor, or the tampering with a service processor in device-assisted services (DAS) systems.

18 Claims, 54 Drawing Sheets

Related U.S. Application Data continuation of application No. 14/473,137, filed on Aug. 29, 2014, now Pat. No. 9,591,474, which is a division of application No. 13/237,827, filed on Sep. 20, 2011, now Pat. No. 8,832,777, which is a continuation-in-part of application No. 12/695,019, filed on Jan. 27, 2010, now Pat. No. 8,275,830, and a continuation-in-part of application No. 12/380,780, filed on Mar. 2, 2009, now Pat. No. 8,839,388, said application No. 12/695,019 is a continuation-in-part of application No. 12/380,778, filed on Mar. 2, 2009, now Pat. No. 8,321,526.

(60) Provisional application No. 61/384,456, filed on Sep. 20, 2010, provisional application No. 61/385,020, filed on Sep. 21, 2010, provisional application No. 61/387,243, filed on Sep. 28, 2010, provisional application No. 61/387,247, filed on Sep. 28, 2010, provisional application No. 61/389,547, filed on Oct. 4, 2010, provisional application No. 61/407,358, filed on Oct. 27, 2010, provisional application No. 61/418,507, filed on Dec. 1, 2010, provisional application No. 61/418,509, filed on Dec. 1, 2010, provisional application No. 61/420,727, filed on Dec. 7, 2010, provisional application No. 61/422,565, filed on Dec. 13, 2010, provisional application No. 61/422,572, filed on Dec. 13, 2010, provisional application No. 61/422,574, filed on Dec. 13, 2010, provisional application No. 61/435,564, filed on Jan. 24, 2011, provisional application No. 61/472,606, filed on Apr. 6, 2011, provisional application No. 61/270,353, filed on Jul. 6, 2009, provisional application No. 61/264,126, filed on Nov. 24, 2009, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009.

(51) Int. Cl.
| | |
|---|---|
| *H04L 12/24* | (2006.01) |
| *H04M 15/00* | (2006.01) |
| *H04W 4/24* | (2018.01) |
| *H04W 12/06* | (2009.01) |
| *H04W 12/08* | (2009.01) |
| *H04W 24/10* | (2009.01) |

(52) U.S. Cl.
CPC .......... *H04L 12/14* (2013.01); *H04L 41/0893* (2013.01); *H04L 41/5003* (2013.01); *H04L 41/5025* (2013.01); *H04M 2215/0188* (2013.01)

(58) Field of Classification Search
CPC ....... H04W 8/18; H04W 12/06; H04W 12/08; H04W 24/10
USPC .............. 455/406, 414.1, 432.1, 456.1, 405; 705/28, 30; 709/217–223
See application file for complete search history.

(56) References Cited

U.S. PATENT DOCUMENTS

| | | |
|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,751,719 A | 5/1998 | Chen et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,915,226 A | 6/1999 | Martineau |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |
| 6,185,576 B1 | 2/2001 | Mcintosh |
| 6,198,915 B1 | 3/2001 | McGregor et al. |
| 6,219,786 B1 | 4/2001 | Cunningham et al. |
| 6,226,277 B1 | 5/2001 | Chuah |
| 6,246,870 B1 | 6/2001 | Dent et al. |
| 6,263,055 B1 | 7/2001 | Garland et al. |
| 6,292,828 B1 | 9/2001 | Williams |
| 6,317,584 B1 | 11/2001 | Abu-Amara et al. |
| 6,370,139 B2 | 4/2002 | Redmond |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,466,984 B1 | 10/2002 | Naveh et al. |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,522,629 B1 | 2/2003 | Anderson, Sr. |
| 6,526,066 B1 | 2/2003 | Weaver |
| 6,532,235 B1 | 3/2003 | Benson et al. |
| 6,532,579 B2 | 3/2003 | Sato et al. |
| 6,535,855 B1 | 3/2003 | Cahill et al. |
| 6,535,949 B1 | 3/2003 | Parker |
| 6,539,082 B1 | 3/2003 | Lowe et al. |
| 6,542,465 B1 | 4/2003 | Wang |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,591,098 B1 | 7/2003 | Shieh et al. |
| 6,598,034 B1 | 7/2003 | Kloth |
| 6,601,040 B1 | 7/2003 | Kolls |
| 6,603,969 B1 | 8/2003 | Vuoristo et al. |

(56) References Cited

U.S. PATENT DOCUMENTS

| | | |
|---|---|---|
| 6,603,975 B1 | 8/2003 | Inouchi et al. |
| 6,606,744 B1 | 8/2003 | Mikurak |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,732,176 B1 | 5/2004 | Stewart et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,842,628 B1 | 1/2005 | Arnold et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gurnani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,202 B2 | 10/2005 | Heinonen et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,970,927 B1 | 11/2005 | Stewart et al. |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,020,781 B1 | 3/2006 | Saw et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,031,733 B2 | 4/2006 | Alminana et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | Mckenna et al. |
| 7,113,997 B2 | 9/2006 | Jayapalan et al. |
| 7,120,133 B1 | 10/2006 | Joo et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,200,551 B1 | 4/2007 | Senez |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,209,664 B1 | 4/2007 | McNicol et al. |
| 7,212,491 B2 | 5/2007 | Koga |
| 7,219,123 B1 | 5/2007 | Fiechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,315,892 B2 | 1/2008 | Freimuth et al. |

(56) References Cited

U.S. PATENT DOCUMENTS

| | | |
|---|---|---|
| 7,317,699 B2 | 1/2008 | Godfrey et al. |
| 7,318,111 B2 | 1/2008 | Zhao |
| 7,320,029 B2 | 1/2008 | Rinne et al. |
| 7,320,781 B2 | 1/2008 | Lambert et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,366,934 B1 | 4/2008 | Narayan et al. |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Alakoski et al. |
| 7,395,056 B2 | 7/2008 | Petermann |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanagh |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,433,362 B2 | 10/2008 | Mallya et al. |
| 7,436,816 B2 | 10/2008 | Mehta et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,466,652 B2 | 12/2008 | Lau et al. |
| 7,467,160 B2 | 12/2008 | McIntyre |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,489,918 B2 | 2/2009 | Zhou et al. |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,756 B2 | 3/2009 | Bahl |
| 7,505,795 B1 | 3/2009 | Lim et al. |
| 7,508,794 B2 | 3/2009 | Feather et al. |
| 7,508,799 B2 | 3/2009 | Sumner et al. |
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,549 B2 | 4/2009 | Karaoguz et al. |
| 7,522,576 B2 | 4/2009 | Du et al. |
| 7,526,541 B2 | 4/2009 | Roese et al. |
| 7,529,204 B2 | 5/2009 | Bourlas et al. |
| 7,533,158 B2 | 5/2009 | Grannan et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,875 B2 | 6/2009 | Mikkelsen et al. |
| 7,548,976 B2 | 6/2009 | Bahl et al. |
| 7,551,921 B2 | 6/2009 | Petermann |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,565,328 B1 | 7/2009 | Donner |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,584,298 B2 | 9/2009 | Klinker et al. |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,603,710 B2 | 10/2009 | Harvey et al. |
| 7,606,357 B2 | 10/2009 | Daigle |
| 7,606,918 B2 | 10/2009 | Holzman et al. |
| 7,607,041 B2 | 10/2009 | Kraemer et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,057 B2 | 10/2009 | Bahl et al. |
| 7,610,328 B2 | 10/2009 | Haase et al. |
| 7,610,396 B2 | 10/2009 | Taglienti et al. |
| 7,612,712 B2 | 11/2009 | LaMance et al. |
| 7,613,444 B2 | 11/2009 | Lindqvist et al. |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,620,383 B2 | 11/2009 | Taglienti et al. |
| 7,627,314 B2 | 12/2009 | Carlson et al. |
| 7,627,600 B2 | 12/2009 | Citron et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,253 B2 | 12/2009 | Plestid et al. |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,644,414 B2 | 1/2010 | Smith et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,668,966 B2 | 2/2010 | Klinker et al. |
| 7,676,673 B2 | 3/2010 | Weller et al. |
| 7,680,086 B2 | 3/2010 | Eglin |
| 7,681,226 B2 | 3/2010 | Kraemer et al. |
| 7,684,370 B2 | 3/2010 | Kezys |

(56) References Cited

U.S. PATENT DOCUMENTS

| | | |
|---|---|---|
| 7,685,131 B2 | 3/2010 | Batra et al. |
| 7,685,254 B2 | 3/2010 | Pandya |
| 7,685,530 B2 | 3/2010 | Sherrard et al. |
| 7,688,792 B2 | 3/2010 | Babbar et al. |
| 7,693,107 B2 | 4/2010 | De Froment |
| 7,693,720 B2 | 4/2010 | Kennewick et al. |
| 7,697,540 B2 | 4/2010 | Haddad et al. |
| 7,707,320 B2 | 4/2010 | Singhai et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,721,296 B2 | 5/2010 | Ricagni |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,742,961 B2 | 6/2010 | Aaron et al. |
| 7,743,119 B2 | 6/2010 | Friend et al. |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,509 B2 | 7/2010 | Rajagopalan et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,769,397 B2 | 8/2010 | Funato et al. |
| 7,770,785 B2 | 8/2010 | Jha et al. |
| 7,774,323 B2 | 8/2010 | Helfman |
| 7,774,412 B1 | 8/2010 | Schnepel |
| 7,774,456 B1 | 8/2010 | Lownsbrough et al. |
| 7,778,176 B2 | 8/2010 | Morford |
| 7,778,643 B2 | 8/2010 | Laroia et al. |
| 7,788,700 B1 | 8/2010 | Feezel et al. |
| 7,792,257 B1 | 9/2010 | Vanier et al. |
| 7,792,538 B2 | 9/2010 | Kozisek |
| 7,792,708 B2 | 9/2010 | Alva |
| 7,797,019 B2 | 9/2010 | Friedmann |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,522 B2 | 9/2010 | Schlüter et al. |
| 7,805,606 B2 * | 9/2010 | Birger ............... H04L 29/12207 713/168 |
| 7,809,351 B1 | 10/2010 | Panda et al. |
| 7,809,372 B2 | 10/2010 | Rajaniemi |
| 7,813,746 B2 | 10/2010 | Rajkotia |
| 7,817,615 B1 | 10/2010 | Breau et al. |
| 7,817,983 B2 | 10/2010 | Cassett et al. |
| 7,822,837 B1 | 10/2010 | Urban et al. |
| 7,822,849 B2 | 10/2010 | Titus |
| 7,826,427 B2 | 11/2010 | Sood et al. |
| 7,826,607 B1 | 11/2010 | De Carvalho Resende et al. |
| 7,835,275 B1 | 11/2010 | Swan et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,170 B1 | 12/2010 | Hargens et al. |
| 7,849,477 B2 | 12/2010 | Cristofalo et al. |
| 7,853,250 B2 | 12/2010 | Harvey et al. |
| 7,853,255 B2 | 12/2010 | Karaoguz et al. |
| 7,853,656 B2 | 12/2010 | Yach et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,868,814 B1 | 1/2011 | Bergman |
| 7,873,001 B2 | 1/2011 | Silver |
| 7,873,344 B2 | 1/2011 | Bowser et al. |
| 7,873,346 B2 | 1/2011 | Petersson et al. |
| 7,873,540 B2 | 1/2011 | Arumugam |
| 7,873,705 B2 | 1/2011 | Kalish |
| 7,873,985 B2 | 1/2011 | Baum |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,882,247 B2 | 2/2011 | Sturniolo et al. |
| 7,882,560 B2 | 2/2011 | Kraemer et al. |
| 7,885,644 B2 | 2/2011 | Gallagher et al. |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,890,581 B2 | 2/2011 | Rao et al. |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,908,358 B1 | 3/2011 | Prasad et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,917,130 B1 | 3/2011 | Christensen et al. |
| 7,920,529 B1 | 4/2011 | Mahler et al. |
| 7,921,463 B2 | 4/2011 | Sood et al. |
| 7,925,740 B2 | 4/2011 | Math et al. |
| 7,925,778 B1 | 4/2011 | Wijnands et al. |
| 7,929,446 B2 | 4/2011 | Bozarth et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,930,553 B2 | 4/2011 | Satarasinghe et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,937,470 B2 | 5/2011 | Curley et al. |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,470 B1 | 5/2011 | Cohen et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,969,950 B2 | 6/2011 | Iyer et al. |
| 7,970,350 B2 | 6/2011 | Sheynman |

(56) References Cited

U.S. PATENT DOCUMENTS

| | | |
|---|---|---|
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,979,889 B2 | 7/2011 | Gladstone et al. |
| 7,979,896 B2 | 7/2011 | McMurtry et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,024,424 B2 | 9/2011 | Freimuth et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,054,778 B2 | 11/2011 | Polson |
| 8,059,530 B1 | 11/2011 | Cole |
| 8,060,017 B2 | 11/2011 | Schlicht et al. |
| 8,060,463 B1 | 11/2011 | Spiegel |
| 8,060,603 B2 | 11/2011 | Caunter et al. |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,361 B2 | 1/2012 | Hagan |
| 8,090,616 B2 | 1/2012 | Proctor, Jr. et al. |
| 8,091,087 B2 | 1/2012 | Ali et al. |
| 8,094,551 B2 | 1/2012 | Huber et al. |
| 8,095,112 B2 | 1/2012 | Chow et al. |
| 8,095,124 B2 | 1/2012 | Balia |
| 8,095,175 B2 | 1/2012 | Todd et al. |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,108,680 B2 | 1/2012 | Murray |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,121,117 B1 | 2/2012 | Amdahl et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,301 B1 | 3/2012 | Ahmed et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,144,853 B1 | 3/2012 | Aboujaoude et al. |
| 8,145,194 B2 | 3/2012 | Yoshikawa et al. |
| 8,146,142 B2 | 3/2012 | Lortz et al. |
| 8,149,748 B2 | 4/2012 | Bata et al. |
| 8,149,771 B2 | 4/2012 | Khivesara et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,152,246 B2 | 4/2012 | Miller et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |
| 8,160,056 B2 | 4/2012 | Van der Merwe et al. |
| 8,160,554 B2 | 4/2012 | Gosselin et al. |
| 8,160,555 B2 | 4/2012 | Gosselin et al. |
| 8,160,556 B2 | 4/2012 | Gosselin et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,175,966 B2 | 5/2012 | Steinberg et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,087 B2 | 5/2012 | Fisher et al. |
| 8,190,122 B1 | 5/2012 | Alexander et al. |
| 8,190,675 B2 | 5/2012 | Tribbett |
| 8,191,106 B2 | 5/2012 | Choyi et al. |

(56) References Cited

U.S. PATENT DOCUMENTS

| | | |
|---|---|---|
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,204,794 B1 | 6/2012 | Peng et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,230,061 B2 | 7/2012 | Hassan et al. |
| 8,233,433 B2 | 7/2012 | Kalhan |
| 8,233,883 B2 | 7/2012 | De Froment |
| 8,233,895 B2 | 7/2012 | Tysowski |
| 8,234,583 B2 | 7/2012 | Sloo et al. |
| 8,238,287 B1 | 8/2012 | Gopi et al. |
| 8,238,913 B1 | 8/2012 | Bhattacharyya et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,249 B2 | 9/2012 | Hu |
| 8,266,269 B2 | 9/2012 | Short et al. |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,285,992 B2 | 10/2012 | Mathur et al. |
| 8,290,820 B2 | 10/2012 | Plastina et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,505 B2 | 11/2012 | Bennett |
| 8,306,518 B1 | 11/2012 | Gailloux |
| 8,306,741 B2 | 11/2012 | Tu |
| 8,307,067 B2 | 11/2012 | Ryan |
| 8,307,095 B2 | 11/2012 | Clark et al. |
| 8,310,943 B2 | 11/2012 | Mehta et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,902 B2 | 11/2012 | Moring et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,359 B2 | 12/2012 | Kauffman |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,339,991 B2 | 12/2012 | Biswas et al. |
| 8,340,625 B1 | 12/2012 | Johnson et al. |
| 8,340,628 B2 | 12/2012 | Taylor et al. |
| 8,340,644 B2 | 12/2012 | Sigmund et al. |
| 8,340,678 B1 | 12/2012 | Pandey |
| 8,340,718 B2 | 12/2012 | Colonna et al. |
| 8,346,023 B2 | 1/2013 | Lin |
| 8,346,210 B2 | 1/2013 | Balsan et al. |
| 8,346,923 B2 | 1/2013 | Rowles et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,355,570 B2 | 1/2013 | Karsanbhai et al. |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,102 B2 | 2/2013 | Luft et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,380,247 B2 | 2/2013 | Engstrom |
| 8,380,804 B2 | 2/2013 | Jain et al. |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,392,982 B2 | 3/2013 | Harris et al. |
| 8,396,458 B2 | 3/2013 | Raleigh |
| 8,396,929 B2 | 3/2013 | Helfman et al. |
| 8,401,906 B2 | 3/2013 | Ruckart |
| 8,401,968 B1 | 3/2013 | Schattauer et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |

(56) References Cited

U.S. PATENT DOCUMENTS

| | | |
|---|---|---|
| 8,406,736 B2 | 3/2013 | Das et al. |
| 8,406,756 B1 | 3/2013 | Reeves et al. |
| 8,407,472 B2 | 3/2013 | Hao et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,413,245 B2 | 4/2013 | Kraemer et al. |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,442,507 B2 | 5/2013 | Duggal et al. |
| 8,443,390 B2 | 5/2013 | Lo et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,457,603 B2 | 6/2013 | El-Kadri et al. |
| 8,461,958 B2 | 6/2013 | Saenz et al. |
| 8,463,194 B2 | 6/2013 | Erlenback et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,135 B2 | 7/2013 | Cai et al. |
| 8,483,694 B2 | 7/2013 | Lewis et al. |
| 8,484,327 B2 | 7/2013 | Werner et al. |
| 8,484,568 B2 | 7/2013 | Rados et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,495,743 B2 | 7/2013 | Kraemer et al. |
| 8,499,087 B2 | 7/2013 | Hu |
| RE44,412 E | 8/2013 | Naqvi et al. |
| 8,500,533 B2 | 8/2013 | Lutnick et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,574 B2 | 8/2013 | Dvorak et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,510,743 B2 | 8/2013 | Hackborn et al. |
| 8,510,804 B1 | 8/2013 | Bonn et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,526,350 B2 | 9/2013 | Xue et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,531,995 B2 | 9/2013 | Khan et al. |
| 8,532,610 B2 | 9/2013 | Manning Cassett et al. |
| 8,533,341 B2 | 9/2013 | Aguirre et al. |
| 8,533,775 B2 | 9/2013 | Alcorn et al. |
| 8,535,160 B2 | 9/2013 | Lutnick et al. |
| 8,538,394 B2 | 9/2013 | Zimmerman et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,539,561 B2 | 9/2013 | Gupta et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,548,428 B2 | 10/2013 | Raleigh |
| 8,549,173 B1 | 10/2013 | Wu et al. |
| 8,554,876 B2 | 10/2013 | Winsor |
| 8,559,369 B2 | 10/2013 | Barkan |
| 8,561,138 B2 | 10/2013 | Rothman et al. |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,584,226 B2 | 11/2013 | Kudla et al. |
| 8,588,240 B2 | 11/2013 | Ramankutty et al. |
| 8,589,541 B2 | 11/2013 | Raleigh et al. |
| 8,589,955 B2 | 11/2013 | Roundtree et al. |
| 8,594,626 B1 | 11/2013 | Woodson et al. |
| 8,594,665 B2 | 11/2013 | Anschutz |
| 8,595,186 B1 | 11/2013 | Mandyam et al. |
| 8,600,850 B2 | 12/2013 | Zabawskyj et al. |
| 8,600,895 B2 | 12/2013 | Felsher |
| 8,601,125 B2 | 12/2013 | Huang et al. |
| 8,605,691 B2 | 12/2013 | Soomro et al. |
| 8,611,919 B2 | 12/2013 | Barnes, Jr. |
| 8,615,507 B2 | 12/2013 | Varadarajulu et al. |
| 8,619,735 B2 | 12/2013 | Montemurro et al. |
| 8,620,257 B2 | 12/2013 | Qiu et al. |
| 8,620,281 B2 | 12/2013 | Gosselin et al. |
| 8,621,056 B2 | 12/2013 | Coussemaeker et al. |
| 8,630,314 B2 | 1/2014 | York |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,635,335 B2 | 1/2014 | Raleigh et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,654,952 B2 | 2/2014 | Wang et al. |
| 8,655,357 B1 | 2/2014 | Gazzard et al. |
| 8,656,472 B2 | 2/2014 | McMurtry et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,670,752 B2 | 3/2014 | Fan et al. |
| 8,675,507 B2 | 3/2014 | Raleigh |
| 8,675,852 B2 | 3/2014 | Maes |
| 8,676,682 B2 | 3/2014 | Kalliola |
| 8,676,925 B1 | 3/2014 | Liu et al. |
| 8,688,671 B2 | 4/2014 | Ramer et al. |
| 8,688,784 B2 | 4/2014 | Zabawskyj et al. |
| 8,693,323 B1 | 4/2014 | McDysan |
| 8,694,772 B2 | 4/2014 | Kao et al. |
| 8,699,355 B2 | 4/2014 | Macias |
| 8,700,729 B2 | 4/2014 | Dua |
| 8,701,015 B2 | 4/2014 | Bonnat |
| 8,701,080 B2 | 4/2014 | Tripathi |
| 8,705,361 B2 | 4/2014 | Venkataraman et al. |
| 8,706,863 B2 | 4/2014 | Fadell |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,724,486 B2 | 5/2014 | Seto et al. |

(56) References Cited

U.S. PATENT DOCUMENTS

| | | |
|---|---|---|
| 8,725,700 B2 | 5/2014 | Rappaport |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,738,860 B1 | 5/2014 | Griffin et al. |
| 8,739,035 B2 | 5/2014 | Trethewey |
| 8,742,694 B2 | 6/2014 | Bora et al. |
| 8,744,339 B2 | 6/2014 | Halfmann et al. |
| 8,761,711 B2 | 6/2014 | Grignani et al. |
| 8,761,809 B2 | 6/2014 | Faith et al. |
| 8,775,233 B1 | 7/2014 | Lybrook et al. |
| 8,780,857 B2 | 7/2014 | Balasubramanian et al. |
| 8,787,249 B2 | 7/2014 | Giaretta et al. |
| 8,793,304 B2 | 7/2014 | Lu et al. |
| 8,793,758 B2 | 7/2014 | Raleigh et al. |
| 8,804,517 B2 | 8/2014 | Oerton |
| 8,804,695 B2 | 8/2014 | Branam |
| 8,811,338 B2 | 8/2014 | Jin et al. |
| 8,811,991 B2 | 8/2014 | Jain et al. |
| 8,812,525 B1 | 8/2014 | Taylor, III |
| 8,818,394 B2 | 8/2014 | Bienas et al. |
| 8,819,253 B2 | 8/2014 | Simeloff et al. |
| 8,825,109 B2 | 9/2014 | Montemurro et al. |
| 8,826,411 B2 | 9/2014 | Moen et al. |
| 8,831,561 B2 | 9/2014 | Sutaria et al. |
| 8,837,322 B2 | 9/2014 | Venkataramanan et al. |
| 8,838,686 B2 | 9/2014 | Getchius |
| 8,838,752 B2 | 9/2014 | Lor et al. |
| 8,843,849 B2 | 9/2014 | Neil et al. |
| 8,845,415 B2 | 9/2014 | Lutnick et al. |
| 8,849,262 B2 | 9/2014 | Desai et al. |
| 8,849,297 B2 | 9/2014 | Balasubramanian |
| 8,855,620 B2 | 10/2014 | Sievers et al. |
| 8,856,015 B2 | 10/2014 | Mesaros |
| 8,862,751 B2 | 10/2014 | Faccin et al. |
| 8,863,111 B2 | 10/2014 | Selitser et al. |
| 8,868,725 B2 | 10/2014 | Samba |
| 8,868,727 B2 | 10/2014 | Yumerefendi et al. |
| 8,875,042 B2 | 10/2014 | LeJeune et al. |
| 8,880,047 B2 | 11/2014 | Konicek et al. |
| 8,891,483 B2 | 11/2014 | Connelly et al. |
| 8,898,748 B2 | 11/2014 | Burks et al. |
| 8,908,516 B2 | 12/2014 | Tzamaloukas et al. |
| 8,929,374 B2 | 1/2015 | Tönsing et al. |
| 8,930,238 B2 | 1/2015 | Coffman et al. |
| 8,943,551 B2 | 1/2015 | Ganapathy et al. |
| 8,948,198 B2 | 2/2015 | Nee et al. |
| 8,948,726 B2 | 2/2015 | Smith et al. |
| 8,949,382 B2 | 2/2015 | Cornett et al. |
| 8,949,597 B1 | 2/2015 | Reeves et al. |
| 8,955,038 B2 | 2/2015 | Nicodemus et al. |
| 8,966,018 B2 | 2/2015 | Bugwadia et al. |
| 8,971,841 B2 | 3/2015 | Menezes et al. |
| 8,971,912 B2 | 3/2015 | Chou et al. |
| 8,977,284 B2 | 3/2015 | Reed |
| 8,995,952 B1 | 3/2015 | Baker et al. |
| 9,002,342 B2 | 4/2015 | Tenhunen et al. |
| 9,008,653 B2 | 4/2015 | Sparks et al. |
| 9,014,059 B2 | 4/2015 | Richardson et al. |
| 9,014,973 B2 | 4/2015 | Ruckart |
| 9,015,331 B2 | 4/2015 | Lai et al. |
| 9,030,934 B2 | 5/2015 | Shah et al. |
| 9,032,427 B2 | 5/2015 | Gallant et al. |
| 9,049,010 B2 | 6/2015 | Jueneman et al. |
| 9,064,275 B1 | 6/2015 | Lu et al. |
| 9,105,031 B2 | 8/2015 | Shen et al. |
| 9,107,053 B2 | 8/2015 | Davis et al. |
| 9,111,088 B2 | 8/2015 | Ghai et al. |
| 9,135,037 B1 | 9/2015 | Petrescu-Prahova et al. |
| 9,137,286 B1 | 9/2015 | Yuan |
| 9,143,933 B2 | 9/2015 | Ikeda et al. |
| 9,172,553 B2 | 10/2015 | Dawes et al. |
| 9,173,090 B2 | 10/2015 | Tuchman et al. |
| 9,177,455 B2 | 11/2015 | Remer |
| 9,183,524 B2 | 11/2015 | Carter |
| 9,225,847 B2 | 12/2015 | Daymond et al. |
| 9,262,370 B2 | 2/2016 | Hofstaedter et al. |
| 9,277,433 B2 | 3/2016 | Raleigh et al. |
| 9,282,460 B2 | 3/2016 | Souissi |
| 9,286,469 B2 | 3/2016 | Kraemer et al. |
| 9,286,604 B2 | 3/2016 | Aabye et al. |
| 9,288,276 B2 | 3/2016 | Adamczyk et al. |
| 9,313,708 B2 | 4/2016 | Nam et al. |
| 9,325,737 B2 | 4/2016 | Gutowski et al. |
| 9,326,173 B2 | 4/2016 | Luft |
| 9,344,557 B2 | 5/2016 | Gruchala et al. |
| 9,350,842 B2 | 5/2016 | Swanburg et al. |
| 9,363,285 B2 | 6/2016 | Kitamura |
| 9,367,680 B2 | 6/2016 | Mahaffey et al. |
| 9,402,254 B2 | 7/2016 | Kneckt et al. |
| 9,413,546 B2 | 8/2016 | Meier et al. |
| 9,418,381 B2 | 8/2016 | Ahuja et al. |
| 9,436,805 B1 | 9/2016 | Kravets |
| 9,479,917 B1 | 10/2016 | Gota et al. |
| 9,501,803 B2 | 11/2016 | Bilac et al. |
| 9,525,992 B2 | 12/2016 | Rao et al. |
| 9,534,861 B1 | 1/2017 | Kellgren |
| 9,544,397 B2 | 1/2017 | Raleigh et al. |
| 9,557,889 B2 | 1/2017 | Raleigh et al. |
| 9,589,117 B2 | 3/2017 | Ali et al. |
| 9,609,459 B2 | 3/2017 | Raleigh |
| 9,609,510 B2 | 3/2017 | Raleigh et al. |
| 9,609,544 B2 | 3/2017 | Raleigh et al. |
| 9,615,192 B2 | 4/2017 | Raleigh |
| 9,634,850 B2 | 4/2017 | Taft et al. |
| 9,642,004 B2 | 5/2017 | Wang et al. |
| 9,648,022 B2 | 5/2017 | Peterka et al. |
| 9,680,658 B2 | 6/2017 | Goel et al. |
| 9,681,003 B1 | 6/2017 | Kim et al. |
| 9,691,082 B1 | 6/2017 | Burnett et al. |
| 9,749,899 B2 | 8/2017 | Raleigh et al. |
| 9,755,842 B2 | 9/2017 | Raleigh et al. |
| 9,923,790 B2 | 3/2018 | Patel et al. |
| 9,954,975 B2 | 4/2018 | Raleigh et al. |
| 9,986,413 B2 | 5/2018 | Raleigh |
| 10,002,332 B2 | 6/2018 | Spong |
| 10,024,948 B2 | 7/2018 | Ganick et al. |
| 10,057,775 B2 | 8/2018 | Raleigh et al. |
| 10,064,033 B2 | 8/2018 | Raleigh |
| 10,171,681 B2 | 1/2019 | Raleigh et al. |
| 10,171,988 B2 | 1/2019 | Raleigh et al. |
| 10,171,990 B2 | 1/2019 | Raleigh et al. |
| 10,237,773 B2 | 3/2019 | Raleigh et al. |
| 10,248,996 B2 | 4/2019 | Raleigh |
| 10,264,138 B2 | 4/2019 | Raleigh et al. |
| 10,285,025 B1 * | 5/2019 | Baker .................... H04W 4/24 |
| 10,321,515 B2 | 6/2019 | Shen et al. |
| 10,462,627 B2 | 10/2019 | Raleigh et al. |
| 10,492,102 B2 * | 11/2019 | Raleigh ................ H04W 28/10 |
| 10,523,726 B2 | 12/2019 | Pantos et al. |
| 10,582,375 B2 * | 3/2020 | Raleigh .................... H04W 4/24 |
| 2001/0048738 A1 | 12/2001 | Baniak et al. |
| 2001/0053694 A1 | 12/2001 | Igarashi et al. |
| 2002/0013844 A1 | 1/2002 | Garrett et al. |
| 2002/0022472 A1 | 2/2002 | Watler et al. |
| 2002/0022483 A1 | 2/2002 | Thompson et al. |
| 2002/0049074 A1 | 4/2002 | Eisinger et al. |
| 2002/0099848 A1 | 7/2002 | Lee |
| 2002/0116338 A1 | 8/2002 | Gonthier et al. |
| 2002/0120370 A1 | 8/2002 | Parupudi et al. |
| 2002/0120540 A1 | 8/2002 | Kende et al. |
| 2002/0131397 A1 | 9/2002 | Patel et al. |
| 2002/0131404 A1 | 9/2002 | Mehta et al. |
| 2002/0138599 A1 | 9/2002 | Dilman et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Salmenkaita et al. |

(56) References Cited

U.S. PATENT DOCUMENTS

| | | |
|---|---|---|
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0028623 A1 | 2/2003 | Hennessey et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0060189 A1 | 3/2003 | Minear et al. |
| 2003/0084321 A1 | 5/2003 | Tarquini et al. |
| 2003/0088671 A1 | 5/2003 | Klinker et al. |
| 2003/0133408 A1 | 7/2003 | Cheng et al. |
| 2003/0134650 A1 | 7/2003 | Sundar et al. |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0184793 A1 | 10/2003 | Pineau |
| 2003/0188006 A1 | 10/2003 | Bard |
| 2003/0188117 A1 | 10/2003 | Yoshino et al. |
| 2003/0191646 A1 | 10/2003 | D'Avello et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0019564 A1 | 1/2004 | Goldthwaite et al. |
| 2004/0021697 A1 | 2/2004 | Beaton et al. |
| 2004/0024756 A1 | 2/2004 | Rickard |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0054779 A1 | 3/2004 | Takeshima et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0114553 A1 | 6/2004 | Jiang et al. |
| 2004/0116140 A1 | 6/2004 | Babbar et al. |
| 2004/0123153 A1 | 6/2004 | Wright et al. |
| 2004/0127200 A1 | 7/2004 | Shaw et al. |
| 2004/0127208 A1 | 7/2004 | Nair et al. |
| 2004/0127256 A1 | 7/2004 | Goldthwaite et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0165596 A1 | 8/2004 | Garcia et al. |
| 2004/0167958 A1 | 8/2004 | Stewart et al. |
| 2004/0168052 A1 | 8/2004 | Clisham et al. |
| 2004/0170191 A1 | 9/2004 | Guo et al. |
| 2004/0176104 A1 | 9/2004 | Arcens |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225561 A1 | 11/2004 | Hertzberg et al. |
| 2004/0225898 A1 | 11/2004 | Frost et al. |
| 2004/0236547 A1 | 11/2004 | Rappaport et al. |
| 2004/0243680 A1 | 12/2004 | Mayer |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0041617 A1 | 2/2005 | Huotari et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | DeMello et al. |
| 2005/0060525 A1 | 3/2005 | Schwartz et al. |
| 2005/0075115 A1 | 4/2005 | Corneille et al. |
| 2005/0079863 A1 | 4/2005 | Macaluso |
| 2005/0091505 A1 | 4/2005 | Riley et al. |
| 2005/0096024 A1 | 5/2005 | Bicker et al. |
| 2005/0097516 A1 | 5/2005 | Donnelly et al. |
| 2005/0107091 A1 | 5/2005 | Vannithamby et al. |
| 2005/0108075 A1 | 5/2005 | Douglis et al. |
| 2005/0111463 A1 | 5/2005 | Leung et al. |
| 2005/0128967 A1 | 6/2005 | Scobbie |
| 2005/0135264 A1 | 6/2005 | Popoff et al. |
| 2005/0163320 A1 | 7/2005 | Brown et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0226178 A1 | 10/2005 | Forand et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0020787 A1 | 1/2006 | Choyi et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072550 A1 | 4/2006 | Davis et al. |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0178943 A1 | 8/2006 | Rollinson et al. |
| 2006/0182137 A1 | 8/2006 | Zhou et al. |
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0193280 A1 | 8/2006 | Lee et al. |
| 2006/0199608 A1 | 9/2006 | Dunn et al. |
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0221829 A1 | 10/2006 | Holmstrom et al. |
| 2006/0233108 A1 | 10/2006 | Krishnan |

(56) References Cited

U.S. PATENT DOCUMENTS

| | | |
|---|---|---|
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0277590 A1 | 12/2006 | Limont et al. |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0111740 A1 | 5/2007 | Wandel |
| 2007/0124077 A1 | 5/2007 | Hedlund |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0165630 A1 | 7/2007 | Rasanen et al. |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0191006 A1 | 8/2007 | Carpenter |
| 2007/0192460 A1 | 8/2007 | Choi et al. |
| 2007/0198656 A1 | 8/2007 | Mazzaferri et al. |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0242619 A1 | 10/2007 | Murakami et al. |
| 2007/0242659 A1 | 10/2007 | Cantu et al. |
| 2007/0243862 A1 | 10/2007 | Coskun et al. |
| 2007/0248100 A1 | 10/2007 | Zuberi et al. |
| 2007/0254646 A1 | 11/2007 | Sokondar |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0256128 A1 | 11/2007 | Jung et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0265003 A1 | 11/2007 | Kezys et al. |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0057894 A1 | 3/2008 | Aleksic et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |
| 2008/0101291 A1 | 5/2008 | Jiang et al. |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0125079 A1 | 5/2008 | O'Neil et al. |
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0148402 A1 | 6/2008 | Bogineni et al. |
| 2008/0160958 A1 | 7/2008 | Abichandani et al. |
| 2008/0161042 A1 | 7/2008 | Pernu |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168275 A1 | 7/2008 | DeAtley et al. |
| 2008/0168523 A1 | 7/2008 | Ansari et al. |
| 2008/0177998 A1 | 7/2008 | Apsangi et al. |
| 2008/0178300 A1 | 7/2008 | Brown et al. |
| 2008/0183811 A1 | 7/2008 | Kotras et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |

(56) References Cited

U.S. PATENT DOCUMENTS

| | | |
|---|---|---|
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0242290 A1 | 10/2008 | Bhatia et al. |
| 2008/0250053 A1 | 10/2008 | Aaltonen et al. |
| 2008/0256593 A1 | 10/2008 | Vinberg et al. |
| 2008/0259924 A1 | 10/2008 | Gooch et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0282319 A1 | 11/2008 | Fontijn et al. |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0316983 A1 | 12/2008 | Daigle |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0054061 A1 | 2/2009 | Dawson et al. |
| 2009/0065571 A1 | 3/2009 | Jain |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0079699 A1 | 3/2009 | Sun |
| 2009/0109898 A1 | 4/2009 | Adams et al. |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0157792 A1 | 6/2009 | Fiatal |
| 2009/0163173 A1 | 6/2009 | Williams |
| 2009/0170554 A1 | 7/2009 | Want et al. |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0261783 A1 | 10/2009 | Gonzales et al. |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0299857 A1 | 12/2009 | Brubaker |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0010873 A1 | 1/2010 | Moreau |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027525 A1 | 2/2010 | Zhu |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0042675 A1 | 2/2010 | Fujii |
| 2010/0043068 A1 | 2/2010 | Varadhan et al. |
| 2010/0046373 A1 | 2/2010 | Smith et al. |
| 2010/0069074 A1 | 3/2010 | Kodialam et al. |
| 2010/0071053 A1 | 3/2010 | Ansari et al. |
| 2010/0075666 A1 | 3/2010 | Garner |
| 2010/0080202 A1 | 4/2010 | Hanson |
| 2010/0082431 A1 | 4/2010 | Ramer et al. |
| 2010/0103820 A1 | 4/2010 | Fuller et al. |
| 2010/0113020 A1 | 5/2010 | Subramanian et al. |
| 2010/0121744 A1 | 5/2010 | Belz et al. |
| 2010/0131584 A1 | 5/2010 | Johnson |
| 2010/0142478 A1 | 6/2010 | Forssell et al. |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0227632 A1 | 9/2010 | Bell et al. |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0254387 A1 | 10/2010 | Trinh et al. |
| 2010/0284327 A1 | 11/2010 | Miklos |
| 2010/0284388 A1 | 11/2010 | Fantini et al. |
| 2010/0287599 A1 | 11/2010 | He et al. |
| 2010/0311402 A1 | 12/2010 | Srinivasan et al. |
| 2010/0318652 A1 | 12/2010 | Samba |
| 2010/0322071 A1 | 12/2010 | Avdanin et al. |
| 2010/0325420 A1 | 12/2010 | Kanekar |
| 2011/0004917 A1 | 1/2011 | Salsa et al. |
| 2011/0013569 A1 | 1/2011 | Scherzer et al. |
| 2011/0019574 A1 | 1/2011 | Malomsoky et al. |
| 2011/0071854 A1 | 3/2011 | Medeiros et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |
| 2011/0252430 A1 | 10/2011 | Chapman et al. |
| 2011/0264923 A1 | 10/2011 | Kocher et al. |
| 2011/0277019 A1 | 11/2011 | Pritchard, Jr. |
| 2012/0020296 A1 | 1/2012 | Scherzer et al. |
| 2012/0029718 A1 | 2/2012 | Davis |
| 2012/0108225 A1 | 5/2012 | Luna et al. |
| 2012/0144025 A1 | 6/2012 | Melander et al. |

(56) References Cited

U.S. PATENT DOCUMENTS

| | | |
|---|---|---|
| 2012/0155296 A1 | 6/2012 | Kashanian |
| 2012/0166364 A1 | 6/2012 | Ahmad et al. |
| 2012/0166604 A1 | 6/2012 | Fortier et al. |
| 2012/0195200 A1 | 8/2012 | Regan |
| 2012/0196644 A1 | 8/2012 | Scherzer et al. |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0072177 A1 | 3/2013 | Ross et al. |
| 2013/0084835 A1 | 4/2013 | Scherzer et al. |
| 2013/0095787 A1 | 4/2013 | Kashanian |
| 2013/0117140 A1 | 5/2013 | Kashanian |
| 2013/0144789 A1 | 6/2013 | Aaltonen et al. |
| 2013/0176908 A1 | 7/2013 | Baniel et al. |
| 2013/0326356 A9 | 12/2013 | Zheng et al. |
| 2014/0073291 A1 | 3/2014 | Hildner et al. |
| 2014/0198687 A1 | 7/2014 | Raleigh |
| 2014/0241342 A1 | 8/2014 | Constantinof |
| 2015/0039763 A1 | 2/2015 | Chaudhary et al. |
| 2015/0181628 A1 | 6/2015 | Haverinen et al. |
| 2017/0063695 A1 | 3/2017 | Ferrell |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 B | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1098490 A2 | 5/2001 |
| EP | 1289326 A1 | 3/2003 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 A1 | 10/2007 |
| EP | 1887732 A1 | 2/2008 |
| EP | 1942698 A1 | 7/2008 |
| EP | 1978772 | 10/2008 |
| EP | 2007065 A1 | 12/2008 |
| EP | 2026514 A1 | 2/2009 |
| EP | 2466831 A1 | 6/2012 |
| JP | 3148713 B2 | 3/2001 |
| JP | 2005339247 A | 12/2005 |
| JP | 2006041989 | 2/2006 |
| JP | 2006155263 A | 6/2006 |
| JP | 2006197137 | 7/2006 |
| JP | 2006344007 A | 12/2006 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| KR | 20040053858 A | 6/2004 |
| WO | 1998058505 | 12/1998 |
| WO | 1999027723 | 6/1999 |
| WO | 1999065185 | 12/1999 |
| WO | 0208863 | 1/2002 |
| WO | 2002045315 A2 | 6/2002 |
| WO | 2002067616 A1 | 8/2002 |
| WO | 2002093877 A1 | 11/2002 |
| WO | 2003014891 | 2/2003 |
| WO | 2003017063 A2 | 2/2003 |
| WO | 2003017065 A2 | 2/2003 |
| WO | 2003058880 | 7/2003 |
| WO | 2004028070 | 4/2004 |
| WO | 2004064306 A2 | 7/2004 |
| WO | 2004077797 | 9/2004 |
| WO | 2004095753 | 11/2004 |
| WO | 2005008995 | 1/2005 |
| WO | 2005053335 A1 | 6/2005 |
| WO | 2005083934 A1 | 9/2005 |
| WO | 2006004467 | 1/2006 |
| WO | 2006004784 A1 | 1/2006 |
| WO | 2006012610 A2 | 2/2006 |
| WO | 2006050758 | 5/2006 |
| WO | 2006073837 | 7/2006 |
| WO | 2006077481 | 7/2006 |
| WO | 2006093961 A1 | 9/2006 |
| WO | 2006120558 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 | 6/2007 |
| WO | 2007069245 | 6/2007 |
| WO | 2007097786 A | 8/2007 |
| WO | 2007107701 | 9/2007 |
| WO | 2007120310 | 10/2007 |
| WO | 2007124279 | 11/2007 |
| WO | 2007126352 | 11/2007 |
| WO | 2007129180 A2 | 11/2007 |
| WO | 2007133844 A | 11/2007 |
| WO | 2008017837 | 2/2008 |
| WO | 2008051379 | 5/2008 |
| WO | 2008066419 | 6/2008 |
| WO | 2008080139 | 7/2008 |
| WO | 2008080430 A1 | 7/2008 |
| WO | 2008099802 | 8/2008 |
| WO | 2009008817 A1 | 1/2009 |
| WO | 2009091295 A1 | 7/2009 |
| WO | 2010088413 | 8/2010 |
| WO | 2010128391 A2 | 11/2010 |
| WO | 2011002450 A1 | 1/2011 |
| WO | 2011149532 A1 | 12/2011 |

OTHER PUBLICATIONS

"ASA/PIX: Allow Split Tunneling for VPN Clients on the ASA Configuration Example," Document ID 70917, Jan. 10, 2008.
"Communication Concepts for Mobile Agent Systems," by Joachim Baumann et al.; Inst. of Parallel and Distributed High-Performance Systems, Univ. of Stuttgart, Germany, pp. 123-135, 1997.
"End to End QoS Solution for Real-time Multimedia Application;" Computer Engineering and Applications, 2007, 43 (4):155-159, by Tan Zu-guo, Wang Wen-juan; Information and Science School, Zhanjian Normal College, Zhan jiang, Guangdong 524048, China.
"Jentro Technologies launches Zenlet platform to accelerate location-based content delivery to mobile devices," The Mobile Internet, Boston, MA, Feb. 2008.
"The Construction of Intelligent Residential District in Use of Cable Television Network," Shandong Science, vol. 13, No. 2, Jun. 2000.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.

(56) References Cited

OTHER PUBLICATIONS

3rd Generation Partnership Project, "Technical Specification Group Services and System Aspects; Policy and Charging Control Architecture," Release 8, Document No. 3GPP TS 23.203, V8.4.0, Dec. 2008.
3rd Generation Partnership Project; "Technical Specification Group Services and System Aspects; IP Flow Mobility and seamless WLAN offload; Stage 2," Release 10, Document No. 3GPP TS 23.261, V1.0.0, Mar. 2010.
Accuris Networks, "The Business Value of Mobile Data Offload—a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Ahmed et al., "Multi Access Data Network Connectivity and IP Flow Mobility in Evolved Packet System (EPS)," 2010 IEEE.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Android Cupcake excerpts, The Android Open Source Project, Feb. 10, 2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.
Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.
Ehnert, "Small application to monitor IP trafic on a Blackberry—1.01.03", Mar. 27, 2008; http://www.ehnert.net/MiniMoni/.
European Commission, "Data Roaming Tariffs—Transparency Measures," obtained from Europa—Europe's Information Society Thematic Portal website, Jun. 24, 2011: http://ec.europa.eu/information_society/activities/roaming/data/measures/index_en.htm.
Farooq et al., "An IEEE 802.16 WiMax Module for the NS-3 Simulator," Mar. 2-6, 2009.
Fujitsu, "Server Push Technology Survey and Bidirectional Communication in HTTP Browser," Jan. 9, 2008 (JP).
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Jing et al., "Client-Server Computing in Mobile Environments," GTE Labs. Inc., Purdue University, ACM Computing Surveys, vol. 31, No. 2, Jun. 1999.
Kasper et al., "Subscriber Authentication in mobile cellular Networks with virtual software SIM Credentials using Trusted Computing," Fraunhofer—Institute for Secure Information Technology SIT, Darmstadt, Germany; ICACT 2008.
Kassar et al., "An overview of vertical handover decision strategies in heterogeneous wireless networks," ScienceDirect, University Pierre & Marie Curie, Paris, France, Jun. 5, 2007.
Kim, "Free wireless a high-wire act; MetroFi needs to draw enough ads to make service add profits," San Francisco Chronicle, Aug. 21, 2006.
Knight et al., "Layer 2 and 3 Virtual Private Networks: Taxonomy, Technology, and Standarization Efforts," IEEE Communications Magazine, Jun. 2004.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Koutsopoulou et al., "Middleware Platform for the Support of Charging Reconfiguration Actions," 2005.
Kuntze et al., "Trustworthy content push," Fraunhofer—Institute for Secure Information Technology SIT; Germany; WCNC 2007 proceedings, IEEE.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and the Challenges," Scroll, vol. 1, No. 1, 2008.
Loopt User Guide, metroPCS, Jul. 17, 2008.
Muntermann et al., "Potentials und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Nilsson et al., "A Novel MAC Scheme for Solving the QoS Parameter Adjustment Problem in IEEE802.11e EDCA," Feb. 2006.
Nuzman et al., "A compund model for TCP connection arrivals for LAN and WAN applications," Oct. 22, 2002.
Open Mobile Alliance (OMA), Push Architecture, Candidate Version 2.2; Oct. 2, 2007; OMA-AD-Push-V2_2-20071002-C.
Oppliger, Rolf, "Internet Security: Firewalls and Bey," Communications of the ACM, May 1997, vol. 40. No. 5.
Quintana, David, "Mobile Multitasking," Apr. 14, 2010.
Rao et al., "Evolution of Mobile Location-Based Services," Communication of the ACM, Dec. 2003.
Richtel "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Roy et al., "Energy Management in Mobile Devices with the Cinder Operating System", Stanford University, MIT CSAIL, Jun. 3, 2010.
Ruckus Wireless—White Paper; "Smarter Wi-Fi for Mobile Operator Infrastructures" 2010.
Sabat, "The evolving mobile wireless value chain and market structure," Nov. 2002.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Steglich, Stephan, "I-Centric User Interaction," Nov. 21, 2003.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Van Eijk, et al., "GigaMobile, Agent Technology for Designing Personalized Mobile Service Brokerage," Jul. 1, 2002.
VerizonWireless.com news, "Verizon Wireless Adds to Portfolio of Cosumer-Friendly Tools With Introduction of Usage controls, Usage Controls and Chaperone 2.0 Offer Parents Full Family Security Solution," Aug. 18, 2008.
Windows7 Power Management, published Apr. 2009.
Wireless Broadband Alliance, "WISPr 2.0, Apr. 8, 2010"; Doc. Ref. No. WBA/RM/WISPr, Version 01.00.

(56) References Cited

OTHER PUBLICATIONS

Zhu et al., "A Survey of Quality of Service in IEEE 802.11 Networks," IEEE Wireless Communications, Aug. 2004.

\* cited by examiner

| Service Processor 115 Embodiment | Partial Summary of Embodiment Functions |
|---|---|
| Service Control Device Link 1691 | Device side control plane link for connecting Service Processor 415 to Service Controller. In some embodiments, also serves as the link for the agent heartbeat function. |
| Access Control Integrity Agent 1694 | Collects device information on service policy, service usage, agent configuration and agent behavior. Cross checks this information to identify integrity breaches in the service policy implementation and control system. Initiates action when a service policy violation or a system integrity breach is suspected. In some embodiments, verifies configuration of other agents or performs challenge-response sequence testing. In some embodiments, monitors software loading activity, protected memory access or communication with Service Processor agents to detect unauthorized changes to Service Processor software or configuration. |
| Service Monitor Agent 1696 | Records and reports device service usage. In some embodiments, assists in communicating application tagging of traffic flows through the networking stack policy implementation. In some embodiments, maintains a history and provides reports or summary reports of which networks in addition to the networks controlled by the Service Controller that the device has connected to. In some embodiments, this network activity summary may include a summary of the networks accessed, activity vs. time per connection, traffic vs. time per connection. |
| Billing Agent 1695 | Detects and reports billing events. In some embodiments, provide notification on service usage levels, provide options on service usage control policy, accept choices on service usage policy, provide transaction options or accept transaction choices. In some embodiments, interacts with Transaction Servers 134 to conduct ecommerce transactions with central billing. |
| User Interface 1697 | Provide service interface to users. |
| Service Downloader 1663 | Provides a download function to install or update service software elements on the device. |
| Connection Manager 1804 | Provides a control and supervision function for one or more modem drivers or modems that connect to an access network. |
| Modem Selection and Control 1811 | Selects the access network connection. |
| Modem Drivers 1831, 1815, 1814, 1813, 1812 | Converts data traffic into modem bus traffic for one or more modems. |
| Modems 2141, 2125, 2124, 2123, 2122 | Connects the device to one or more networks. |

*Fig. 10*

| Service Controller 122 Element | Partial Summary of Embodiment Functions |
|---|---|
| Service Control Server Link 1638 | Network side control plane link for connecting Service Controller 422 Service Processor 415 device agents. In some embodiments, also serves as the link for the agent heartbeat function. |
| Access Control Integrity Server 1654 | Collects device information on service policy, service usage, agent configuration and agent behavior. Cross checks this information to identify integrity breaches in the service policy implementation and control system. Initiates action when a service policy violation or a system integrity breach is suspected. |
| Service History Server 118 | Collects and records service usage reports from the Access Network AAA Server 421 and the Service Monitor Agent 496. In some embodiments, maintains a history of which networks in addition to the networks controlled by the Service Controller that the device has connected to. In some embodiments, this network activity summary may include a summary of the networks accessed, activity vs. time per connection, traffic vs. time per connection. In some embodiments, this activity summary is further analyzed or reported to estimate the type of service plan associated with the traffic activity for the purpose of bill sharing reconciliation. |
| Central Provider Billing System 123 | Provides mediation function for central provider billing events. Accepts service plan changes. In some embodiments, provides updates on device service usage, service plan limits or service policies. |
| Billing Event Server 1662 | In some embodiments, collects billing events, provides service plan information to the Service Processor 415, provides service usage updates to the Service Processor 415, serves as interface between device and central Provider Billing System 123, or provides trusted third party function for certain ecommerce billing transactions. |
| Service Download Control Server 1660 | Provides a download function to install or update service software elements on the device. |

*Fig. 11*

Service Processor Communication Frame 2502

| Service Processor Framing Sequence # 2504 | Time Stamp 2506 | Agent Function #1 ID 2508 | Agent Function #1 Message Length 2510 | Agent Function #1 Message 2512 | ... | Agent Function #N ID 2514 | Agent Function #N Message Length 2516 | Agent Function #N Message 2518 |

Service Controller Communication Frame 2522

| Service Controller Framing Sequence # 2524 | Time Stamp 2526 | Agent Function #1 ID 2528 | Agent Function #1 Message Length 2530 | Agent Function #1 Message 2532 | ... | Agent Function #N ID 2534 | Agent Function #N Message Length 2536 | Agent Function #N Message 2538 |

*Fig. 17*

| Example Service Processor Heartbeat Parameter Embodiments | Description | Frequency |
|---|---|---|
| Access control integrity report | Contains the latest results of the Access Control Integrity agents Service Processor system checks and reports any error events. | Not necessary to report in every heartbeat if there are no errors. Can report only on error, set a minimum frequency or respond to Service Controller polling. |
| Service monitor report | Reports filtered summary of Service Monitor Agent measurements. Summary reduces control traffic and filters out unauthorized private information. | Every heartbeat. Some embodiments link this to amount of data usage in the data path to keep overhead low. Report immediately upon polling from Service Controller. |
| Billing event report | Reports any billing activity since the last heartbeat. Billing events may include service usage events, transaction events, bill by account records, bill by account offset reports, or any other event that results in a billing event report. | Send upon billing event. Report immediately upon polling from Service Controller. |
| Service Processor settings report | Reports service policy settings for all Service Processor agents. | Not necessary to send every heartbeat. Some embodiments link this to amount of data usage to reduce overhead. Can report every N heartbeats. Report immediately upon polling from Service Controller. |
| Customer resource management report | Reports filtered summary of Service Monitor Agent measurements or filtered summary of other device or user activity such as service preferences, advertisement behavior and location. Summary reduces control traffic and filters out unauthorized private information. | Not necessary to send every heartbeat. Some embodiments link this to amount of data usage to reduce overhead. Can report every N heartbeats. Report immediately upon polling from Service Controller. |
| Responses to Service Processor agent queries | Sends agent responses to challenge response queries from the Service Controller. | Report immediately upon polling from Service Controller. |
| Location tracking service update | Reports filtered summary of location tracking information. Summary reduces control traffic and filters out unauthorized private information. | Not necessary to send every heartbeat. Some embodiments call for a minimum time based transmission frequency. |

*Fig. 18A*

| Example Service Processor Heartbeat Parameter Embodiments | Description | Frequency |
|---|---|---|
| Service usage based transmission frequency | Lowers overhead by buffering and reserving heartbeat communications from agents and servers until a certain amount of data has been transmitted or received in the network, or a certain amount of service has been consumed. When the parameters are chosen properly, this can result in the network control plane traffic overhead being a small percentage of data path traffic or result in the control plane traffic cost being a small percentage of the service usage cost. | Ranges depending on settings. For example, if there are 5 agents messages that typically need to be communicated, and each message is less than 100 bytes, and Service Processor heartbeat framing plus network overhead would result in a packet size of less than 1,000 bytes, and the heartbeat packet is transmitted when 10,000,000 bytes have been communicated over the data path, then the overhead loss due to one heartbeat packet in each direction is less than 0.02%. |
| Constant frequency transmissions | Since the device may be off line for long periods of time where the Service Control Processor needs to verify service control integrity, in some embodiments it can be advantageous to transmit heartbeat packets at a minimum rate regardless of data traffic activity. This is accomplished by setting a timer that sends queued heartbeat packets on a regular schedule. | Ranges depending on settings and applications. |
| Service Controller polled transmissions | In some embodiments, the Service Controller may poll the Service Processor for a heartbeat transmission at which time the Service Processor will frame and transmit all queued heartbeat messages. | Ranges depending on applications. In some embodiments this is used as an on demand function while in others it is used as a way to set heartbeat transmission timing functions in the Service Controller. |
| Service Processor polled transmissions | In some embodiments, the Service Processor polls the Service Controller for a heartbeat transmission at which time the Service Controller will frame and transmit all queued heartbeat messages. | Ranges depending on applications. In some embodiments this is used as an on demand function while in others it is used as a way to set heartbeat transmission timing functions in the Service Processor. |

*Fig. 18B*

| Example Service Processor Heartbeat Parameter Embodiments | Description | Frequency |
|---|---|---|
| Agent self check reports | Agent reports results of various agent self diagnosis procedures to ensure that the agent is properly configured, operating properly, properly implementing service control policy or has not been tampered with. [provide examples which are extensions of typical software security self diagnosis reporting] | In some embodiments an report is made during every heartbeat transmission. In other embodiments the report is generated by a request from the Service Controller. In other embodiments the report is generated by timing determined by the device. In some embodiments the report is generated when there is a verification error of some kind that is identified. |

*Fig. 18C*

| Example Service Processor Heartbeat Parameter Embodiments | Description | Frequency |
|---|---|---|
| Environment reports | One or more agents scan the storage or execution environment for one or more of the agents to identify potential threats to the integrity of the service implementation or agent integrity and makes a report. In one example embodiment, a scan is done to determine if unauthorized software or hardware is executing in a secure agent environment. In another embodiment, a scan is done to determine the software that has been loaded into a portion of the device operating environment, memory or storage, and the software list is referenced against a known threat list. In another example embodiment, the list of entities that accessed one or more agents is scanned to determine if an unauthorized access to an agent has occurred. In another embodiment a scan is performed to determine if unauthorized access to secure execution environment, memory or storage has occurred. In another example embodiment, the network access pattern for the device is logged and analyzed to determine if there is an access pattern that is known to be associated with a threat to service or agent control integrity. In another example embodiment, the internal device software, memory or peripheral access pattern is logged and analyzed to determine if there is an access pattern that is known to be associated with a threat to service or agent control integrity. | In some embodiments an report is made during every heartbeat transmission. In other embodiments the report is generated by a request from the Service Controller. In other embodiments the report is generated by timing determined by the device. In some embodiments the report is generated when there is a verification error of some kind that is identified. |

*Fig. 18D*

| Example Service Processor Heartbeat Parameter Embodiments | Description | Frequency |
|---|---|---|
| User notification response reports | Billing agent, UI agent or another agent logs user notification events and the response of the user to the notification event. In some embodiments these events may be cross-referenced to the notification policy that should be in force on the device and the device service usage to ensure that the proper notification sequences are being adhered to. In other embodiments, the user notification responses are logged and used to document user choices to notification events, billing event decisions, service control decisions or service cost control decisions. In some embodiments, the user may be asked to provide a password, biometric signature, hardware key or other mechanism to positively identify that the user is in possession of the device or to verify that the service is operating properly or is implemented properly. In some embodiments, the user may be asked to acknowledge a service overage notification and/or to also provide a password, biometric signature, hardware key or other mechanism to verify the service overage acknowledgement. | In some embodiments an report is made during every heartbeat transmission. In other embodiments the report is generated by a request from the Service Controller. In other embodiments the report is generated by timing determined by the device, for example when there has been a user notification sequence action with the user. In some embodiments, the report is generated when there is a verification error of some kind that is identified. |

Fig. 18E

| Example Service Processor Heartbeat Parameter Embodiments | Description | Frequency |
|---|---|---|
| User warning response reports | Billing agent, UI agent or another agent logs user warning events and the response of the user to warning event. In some embodiments the user response is used to determine if the user is in positive control of the device. In some embodiments the response is used to confirm that the user acknowledges a billing overage or other service cost event. In some embodiments, the user may be asked to provide a password, biometric signature, hardware key or other mechanism to positively identify that the user is in possession of the device or to verify that the service is operating properly or is implemented properly. | In some embodiments an report is made during every heartbeat transmission. In other embodiments the report is generated by a request from the Service Controller. In other embodiments the report is generated by timing determined by the device, for example when there has been a warning sequence action with the user. In some embodiments the report is generated when there is a verification error of some kind that is identified. |
| Agent communication log reports | Reports entities that established or attempted to establish communication with the agents. In one embodiment, reports a list of entities and the number of times the entity communicated or attempted to communicate with the agent. In another embodiments, reports an error flag when unauthorized entities attempt to establish communication with an agent. | In some embodiments an report is made during every heartbeat transmission. In other embodiments the report is generated by a request from the Service Controller. In other embodiments the report is generated by timing determined by the device. In some embodiments the report is generated when there is a verification error of some kind that is identified. |

*Fig. 18F*

| Example Service Processor Heartbeat Parameter Embodiments | Description | Frequency |
|---|---|---|
| Service usage synchronization data | IPDR or other data that is used to synchronize the device service usage counters. In some embodiments the data is time stamped so that the service usage at a point in time may be reconciled between the local device usage count and the network based usage count, and then the local device usage count since the point in time may be used to estimate the present real time usage count. In some embodiments, the service usage data from the device is used by the network as the actual service usage or billing data base for the device. In other embodiments, a bill by account function is included in the service usage synchronization data so that the service usage may be billed to different accounts other than a single or main user account. | Service usage synchronization is continuous with each heartbeat in some embodiments. In other embodiments service usage synchronization is based on a push from the Service Controller or other network function that sends the IPDR information to the device. In other embodiments, the device requests a synchronization data transmission. |
| Service cost synchronization data | Information to reconcile a service cost estimate on the local device with a service cost count from a network based function. Similar to the service usage count, in some embodiments the service cost information is time stamped so that service cost at a point in time may be reconciled between the device and the network based function, and then a local measure of service cost may be used to estimate the present real-time service cost. In some embodiments the local service cost is determined by taking recorded billing events and looking up the cumulative cost of one or more billing events using a service usage to cost look up data base stored locally on the device or available from a network function. In some embodiments, service cost estimation is done entirely in the network and the result is pushed out to the device UI. In other embodiments service cost estimation is done in the device based on local usage estimates and a local usage to cost lookup table. | Service cost synchronization is continuous with each heartbeat in some embodiments. In other embodiments service cost synchronization is based on a push from the Service Controller or other network function that sends the IPDR information to the device. In other embodiments, the device requests a synchronization data transmission. |

*Fig. 18G*

| Example Service Processor Heartbeat Parameter Embodiments | Description | Frequency |
|---|---|---|
| Available network information and roaming information | Device receives available network or available roaming service provider information from a network function. The available network or roaming service information may include the potential network service or roaming service a device or user may choose to select, or the network service or roaming service the user has already selected. In some embodiments this information includes service cost information to aid the device or the user in determining the potential or actual costs of service usage while using the available network or roaming network. In some embodiments the service cost information is used to help the user in selecting the available network provider or roaming service provider. In some embodiments the available network cost information or roaming cost information is combined with a measure of expected or possible service usage to estimate how much a typical usage scenario may cost. In some embodiments, the available network information or roaming information is used to help the user estimate the present available network or roaming service charges for services used to date. In some embodiments service usage is recorded and sent to a network function that estimates the current service cost. In other embodiments the service cost is estimated locally on the device based on a service usage estimate and a service usage to cost look up function. In other embodiments, the service cost is derived by querying the available network or roaming network billing system. | In some embodiments available network information or roaming information is requested by the device. In other embodiments, the information is periodically updated by the Service Controller or other network function that contains the information. |

Fig. 18H

| Example Service Processor Heartbeat Parameter Embodiments | Description | Frequency |
|---|---|---|
| System messages and responses | In some embodiments the heartbeat function may be used as a secure control channel to display a system messages or screen that is generated by a network function or server to the end user and possibly report user inputs to the UI message or screen. Examples include, ...... etc. | System messages are generated by the Service Controller and transmitted as needed in some embodiments. In other embodiments, some system messages are generated in response to user input or requests. In other embodiments, system messages are generated on a regular time table or in accordance with a certain amount of service usage. |
| UI screen messages and responses | In some embodiments the heartbeat function may be used as a secure control channel to display user interface message or screen that is generated by a network function or serve to the end user and possibly report user inputs to the UI message or screen. Examples include service usage UI, service choice UI, upgrade UI, transaction UI, marketing UI, billing UI, user identify confirmation UI, user service warning UI, user potential service tamper response request UI, etc. | UI screen messages are generated by the Service Controller and transmitted as needed in some embodiments. In other embodiments, some user UI messages are generated in response to user input or requests. In other embodiments, UI messages are generated on a regular time table or in accordance with a certain amount of service usage. |
| Local agent check-in history | Logs and reports agent check-ins or self reports that are made to a local agent integrity verification function. | In some embodiments an report is made during every heartbeat transmission. In other embodiments the report is generated by a request from the Service Controller. In other embodiments the report is generated by timing determined by the device. In some embodiments the report is generated when there is a verification error of some kind that is identified. |

*Fig. 18I*

| Example Service Processor Heartbeat Parameter Embodiments | Description | Frequency |
|---|---|---|
| Software install report | Logs and reports one or more aspects of software installs that have occurred on the device. | In some embodiments an report is made during every heartbeat transmission. In other embodiments the report is generated by a request from the Service Controller. In other embodiments the report is generated by timing determined by the device. In some embodiments the report is generated when there is a verification error of some kind that is identified. In some embodiments, the report is generated when new SW is installed. |
| Test billing event | In some embodiments the Service Controller or other network function may send or cause a test billing event wherein the device triggers a local billing sequence for the purpose of verifying that the billing sequence is properly logged, conducted and reported. The billing sequence can be related to a service usage event or sequence, a transaction event or sequence, or any other event or sequence that should result in a billing event. | In some embodiments, the test billing event timing is determined by the Service Controller or other network function. In others it is generated by the device or on a regular schedule. |
| Test service event | In some embodiments the service Controller or other network function may send or cause a service usage event wherein the device triggers a local service usage event or sequence for the purpose of verifying that the service usage event or sequence is properly logged and reported. | In some embodiments, the test service usage event timing is determined by the Service Controller or other network function. In others it is generated by the device or on a regular schedule. |

*Fig. 18J*

| Service Policy Implementation Verification Technique Embodiments | Example Error Trigger Criteria Embodiments | Example Error Response Embodiments |
|---|---|---|
| Verify service usage measure in network is consistent with expected service behavior | Network service usage measure is in conflict with expected service usage. Examples: traffic usage outside limits, address access outside limits, data rate outside limits, traffic shaping rules not being followed. | In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19A*

| Service Policy Implementation Verification Technique Embodiments | Example Error Trigger Criteria Embodiments | Example Error Response Embodiments |
|---|---|---|
| Verify service usage measure at device is consistent with expected service behavior | Device service usage measure is in conflict with expected service usage. Examples: traffic usage too high, address access outside limits, email accessed against policy. | Same as above. |
| Verify service usage measure in network is consistent with service usage measure at device | Device service usage measure varies significantly from network service usage measure | Same as above. |
| Verify service usage measure at one point in device is consistent with service usage measure at a second point in device | Service usage measure at one point in device stack that is inconsistent with another point indicates error or potential parasitic usage | Same as above. In some embodiments, the differences in service measures on the device may be used to evaluate the nature of the service usage policy implementation problem. |

Fig. 19B

| Service Policy Implementation Verification Technique Embodiments | Example Error Trigger Criteria Embodiments | Example Error Response Embodiments |
|---|---|---|
| Verify that service policies in effect are as intended | Service policy setting queries result in settings that are different than intended | In some embodiments, reset service policies and see if error persist. If this does not clear the error, or if this is not the error correction method employed, then perform on or more of the following actions:<br>In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19C*

| Service Policy Implementation Verification Technique Embodiments | Example Error Trigger Criteria Embodiments | Example Error Response Embodiments |
|---|---|---|
| Verify presence of Service Processor agents | Agent does not respond to agent communication or query response | In some embodiments, run dynamic agent load, in some cases with different encryption, sequencing or obfuscation for the new agent code to refresh one or more agents. If this does not clear the error, or if this is not the error correction method employed, then perform on or more of the following actions: In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19D*

| Service Policy Implementation Verification Technique Embodiments | Example Error Trigger Criteria Embodiments | Example Error Response Embodiments |
|---|---|---|
| Verify configuration of Service Processor agents | Agent configuration audit or configuration self-check fails. | In some embodiments, run dynamic agent load, in some cases with different encryption, sequencing or obfuscation for the new agent code to refresh one or more agents. If this does not clear the error, or if this is not the error correction method employed, then perform on or more of the following actions: In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct.In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis |

*Fig. 19E*

| Service Policy Implementation Verification Technique Embodiments | Example Error Trigger Criteria Embodiments | Example Error Response Embodiments |
|---|---|---|
| Verify billing events are reported or are reported properly | Billing Agent query reveals logged billing events that have not been reported. | In some embodiments, perform a billing event test to determine if the billing event reporting sequence is operating properly. In some embodiments, run dynamic agent load, in some cases with different encryption, sequencing or obfuscation for the new agent code to refresh one or more agents. If this does not clear the error, or if these are not the error correction methods employed, then perform on or more of the following actions:<br>In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a service usage test to determine if the device is properly reporting service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19F*

| Service Policy Implementation Verification Technique Embodiments | Example Error Trigger Criteria Embodiments | Example Error Response Embodiments |
|---|---|---|
| Verify network reported service usage measure are consistent with reported device billing data. | Billing agent is not properly reporting billing events for service usage, transactions, bill by account, or other billing event functions. | In some embodiments, perform a service usage test to determine if the service usage reporting sequence is operating properly. In some embodiments, run dynamic agent load, in some cases with different encryption, sequencing or obfuscation for the new agent code to refresh one or more agents. If this does not clear the error, or if these are not the error correction methods employed, then perform on or more of the following actions: In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19G*

| Service Policy Implementation Verification Technique Embodiments | Example Error Trigger Criteria Embodiments | Example Error Response Embodiments |
|---|---|---|
| Verify device reported service usage measure are consistent with reported device billing data. | Billing agent reports are inconsistent with service usage reports. | In some embodiments, perform a billing event test to determine if the billing event reporting sequence is operating properly. In some embodiments, run dynamic agent load, in some cases with different encryption, sequencing or obfuscation for the new agent code to refresh one or more agents. In some embodiments, perform a service usage test to determine if the service usage reporting sequence is operating properly. In some embodiments, run dynamic agent load, in some cases with different encryption, sequencing or obfuscation for the new agent code to refresh one or more agents. If this does not clear the error, or if these are not the error correction methods employed, then perform on or more of the following actions: In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19H*

| Service Policy Implementation Verification Technique Embodiments | Example Error Trigger Criteria Embodiments | Example Error Response Embodiments |
|---|---|---|
| Send test billing event through device and verify it is reported. | Test billing event is nor properly reported by the device. | In some embodiments, run dynamic agent load, in some cases with different encryption, sequencing or obfuscation for the new agent code to refresh one or more agents. If this does not clear the error, or if these are not the error correction methods employed, then perform on or more of the following actions: In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a service usage test to determine if the device is properly reporting service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19I*

| Service Policy Implementation Verification Technique Embodiments | Example Error Trigger Criteria Embodiments | Example Error Response Embodiments |
|---|---|---|
| Verify device reports billing events reported from transaction servers. | Transaction server receipts do not correspond with billing events from device. | In some embodiments, perform checks to determine of transaction server receipts are valid. In some embodiments, run dynamic agent load, in some cases with different encryption, sequencing or obfuscation for the new agent code to refresh one or more agents. If this does not clear the error, or if these are not the error correction methods employed, then perform on or more of the following actions: In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19J*

| Service Policy Implementation Verification Technique Embodiments | Example Error Trigger Criteria Embodiments | Example Error Response Embodiments |
|---|---|---|
| Verify activation tracking system presence, configuration or operation | Activation tracking service is not present, is not providing scheduled network activity reporting, or is exhibiting erroneous reports. | In some embodiments the response is to place the device ID. on a list of devices suspected of having activation tracking functions that have been tampered with for the purpose of central provider billing reconciliation. In some embodiments, install a new copy of the activation tracking service agent software either from a locally stored device copy or a network download. In some embodiments where authorization exists to manage device software and some aspects of service tracking, run further checks on device service integrity such as agent query response. In some embodiments where authorization exists to manage a device access service connection, send error message to device UI, suspend device or place device on quarantine route. In some embodiments send error message to human interface for troubleshooting. |
| Verify device standing or service plan standing | No service plan on record or device not authorized | In some embodiments, if device is not yet activated with a service plan, provide UI with activation sequence. In some embodiments, if device is not authorized for service on one of the networks controlled by the Service Controller, send the UI en error message instructing the user how to proceed. In some embodiments, configure the Service Processor for the ambient service intended for that device. In some embodiments, download the appropriate Service Processor agent software that is appropriate for that device. |

*Fig. 19K*

| Service Policy Implementation Verification Technique Embodiments | Example Error Trigger Criteria Embodiments | Example Error Response Embodiments |
|---|---|---|
| Verify proper operation of Service Processor agents | Check input to output relationship on Policy Implementation agent, Firewall agent. Check billing event reports to verify events are being recorded. Check application and traffic inspection tagging system correctly tagging traffic. Verify Service Processor heartbeat reports proper agent integrity self-checks, cross-checks and query/response sequences with Service Controller. | In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

Fig. 19L

| Service Policy Implementation Verification Technique Embodiments | Example Error Trigger Criteria Embodiments | Example Error Response Embodiments |
|---|---|---|
| Service Processor heartbeat response reports | One or more of the heartbeat reports indicate an error in operation, configuration, or tamper and error prevention system. Heartbeat function not functioning properly but device is still indicating service usage on the network. | In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19M*

| Service Policy Implementation Verification Technique Embodiments | Example Error Trigger Criteria Embodiments | Example Error Response Embodiments |
|---|---|---|
| Test service event | Service usage reporting system does not properly report test service usage event | In some embodiments, run dynamic agent load, in some cases with different encryption, sequencing or obfuscation for the new agent code to refresh one or more agents. If this does not clear the error, or if this is not the error correction method employed, then perform on or more of the following actions:<br>In some embodiments, reset service policies and see if error persists. In some embodiments, perform agent settings check to verify that agent service usage control policy settings are correct In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing test event to determine if the device is properly reporting billing events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19N*

| Service Policy Implementation Verification Technique Embodiments | Example Error Trigger Criteria Embodiments | Example Error Response Embodiments |
|---|---|---|
| Load a fresh version of Service Processor software and perform integrity reports | After fresh load of Access Control Integrity Agent, agent discovers one or more of the other agents are corrupted. | Run dynamic agent load, in some cases with different encryption, sequencing or obfuscation for the new agent code to refresh other agents and see if problem persists. If this does not clear the error, or if this is not the error correction method employed, then perform on or more of the following actions:<br>In some embodiments, reset service policies and see if error persists. In some embodiments, perform agent settings check to verify that agent service usage control policy settings are correct. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 190*

| Service Policy Implementation Verification Technique Embodiments | Example Error Trigger Criteria Embodiments | Example Error Response Embodiments |
|---|---|---|
| Verify Service Processor code configuration with agent self diagnosis checks | One or more of the agents indicates an error after running a self-check. | Run dynamic agent load, in some cases with different encryption, sequencing or obfuscation for the new agent code to refresh other agents and see if problem persists. If this does not clear the error, or if this is not the error correction method employed, then perform on or more of the following actions:<br>In some embodiments, reset service policies and see if error persists. In some embodiments, perform agent settings check to verify that agent service usage control policy settings are correct. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

Fig. 19P

| Service Policy Implementation Verification Technique Embodiments | Example Error Trigger Criteria Embodiments | Example Error Response Embodiments |
|---|---|---|
| Verify that device uses service only after being authorized | Device gains access to the network and does not check in with the Access Control Integrity Server and service measures indicate device is on the network. | In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19Q*

| Service Policy Implementation Verification Technique Embodiments | Example Error Trigger Criteria Embodiments | Example Error Response Embodiments |
|---|---|---|
| Verify user standing | User does not respond with proper response to UI query such as request for ID, password or biometric input. This process may be part of handling a suspected error. | In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. In some embodiments, the user may be asked to acknowledge a service overage notification and/or to also provide a password, biometric signature, hardware key or other mechanism to verify the service overage acknowledgement. |

Fig. 19R

| Service Policy Implementation Verification Technique Embodiments | Example Error Trigger Criteria Embodiments | Example Error Response Embodiments |
|---|---|---|
| Agent communications log | Unauthorized communications with one or more agents is detected | In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

*Fig. 19S*

| Service Policy Implementation Tamper or Error Protection Technique | Example Error Trigger Criteria | Example Error Responses |
|---|---|---|
| Detect or block device networking activity that is potentially harmful for the operation of Service Processor. | Network activity is observed in service monitor reports that fit known patterns that indicated harmful software may be present on device. | Initiate or install and initiate eradication software. Block traffic from the suspect entity. In some embodiments if software can not be eradicated or blocked, then send message to UI and either suspend device, place on SPAN, place on watch list, place on further action list or place on quarantine network. In some embodiments send error message to human interface for troubleshooting. |
| Detect or block unauthorized Service Processor software from being loaded. | Access Control Integrity Agent discovers software that is on a known malicious list. | Same as above. |
| Detect or block unauthorized access of protected Service Processor software or hardware memory. | Unauthorized access is detected, memory contents are corrupted or unresponsive. | Identify the entity that has gained access to the Service Processor if possible and eradicate. In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. |
| Detect or block unauthorized communication with Service Processor software or hardware. | Unauthorized communication is detected. | Identify the entity that has gained access to the Service Processor if possible and eradicate. In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. |

*Fig. 20A*

| Service Policy Implementation Tamper or Error Protection Technique | Example Error Trigger Criteria | Example Error Responses |
|---|---|---|
| Secure loader with signed SW installed into protected memory | Unauthorized access is detected, memory contents are corrupted or unresponsive. | Identify the entity that has gained access to the Service Processor if possible and eradicate. In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. |
| Secure encrypted communication between Service Processor agents. | Secure communication link is in error or unauthorized access is detected. | Identify the entity that has gained access to the Service Processor if possible and eradicate. In some embodiments repair any compromised agents with dynamic agent load, in some cases with different encryption, sequencing or obfuscation for the new agent code. In some embodiments, run dynamic agent load, in some cases with different encryption, sequencing or obfuscation for the new agent code to refresh agents with communication links that are in error or entire Service Processor. In some embodiments send message to UI and either suspend device, place on SPAN, place on watch list, place on further action list or place on quarantine network. In some embodiments send error message to human interface for troubleshooting. |
| Secure encrypted communication between Service Processor and Service Controller. | Service Processor communication is lost. | Send error message to device UI (if possible), suspend device, place on SPAN, place on watch list, place on further action list or place device on quarantine route. In some embodiments send error message to human interface for troubleshooting. |
| Execution of Service Processor software within secure memory. | Unauthorized access is detected, memory contents are corrupted or unresponsive. | Identify the entity that has gained access to the Service Processor if possible and eradicate. In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. |

*Fig. 20B*

| Service Policy Implementation Tamper or Error Protection Technique | Example Error Trigger Criteria | Example Error Responses |
|---|---|---|
| Storage of service processor software in secure memory | Secure memory violation or Service Processor stored in non- secure memory | Identify the entity that has gained access to the Service Processor if possible and eradicate. In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. |
| Detection or removal of software thought to be harmful to Service Processor operation. | Unauthorized software is detected. | Initiate or install and initiate eradication software. Block traffic from the suspect entity. In some embodiments if software can not be eradicated or blocked, then send message to UI and either suspend device, place on SPAN, place on watch list, place on further action list or place on quarantine network. In some embodiments send error message to human interface for troubleshooting. |
| Recording and reporting of software loading signatures, software activity signatures or network activity signatures for later identification of threat sequences. | Unauthorized software or malicious network activity is detected | Same as above. |
| Implement critical Service Processor software as a self refreshing program that resists corruption by running self audit and reinstall processes such as placing audit function in inaccessible memory or OS functions or bios. | Re-installation function alerts that re-installation has been required. Continued re-installations or failure to re-install alert increases severity of warnings. | Identify the entity that has gained access to the Service Processor if possible and eradicate. In some embodiments send message to UI and either suspend device, place on SPAN, place on watch list, place on further action list or place on quarantine network. In some embodiments send error message to human interface for troubleshooting. |

*Fig. 20C*

| Service Policy Implementation Tamper or Error Protection Technique | Example Error Trigger Criteria | Example Error Responses |
|---|---|---|
| Encrypted agent code | Code check, agent query-response, agent self check or other agent configuration check discovers error in code encryption | In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. Identify the entity that may have gained access to the Service Processor if possible and eradicate. |
| Obfuscated agent code | Code check, agent query-response, agent self check or other agent configuration check discovers error in code obfuscation | Same as above. |
| Unique agent identification numbers and signatures | Agent is discovered to have an incorrect ID. or fails signature | Same as above. |
| Secure agent communication bus | Agent communication bus monitoring discovers unauthorized communication or other unauthorized access to one or more agents is discovered | Same as above. |
| Agent level message encryption | Agent is found to be communicating without the required level of agent communication encryption | Same as above. |

*Fig. 20D*

| Service Policy Implementation Tamper or Error Protection Technique | Example Error Trigger Criteria | Example Error Responses |
|---|---|---|
| Service control link message level encryption | Unauthorized communication traffic is discovered on service control link | In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. Identify the entity that may have gained access to the Service Processor if possible and eradicate. |
| Service control link transport layer encryption | Unauthorized communication traffic is discovered on service control link | Same as above. |
| Agent communication access permissions | Unauthorized communication is discovered with one or more agents | Same as above. |
| Agent communication log | Unauthorized communication is discovered with one or more agents | Same as above. |
| Encrypted agent code for downloads | Agent download is found to have incorrect or absent encryption or signature | Same as above. |
| Secure downloader memory | Unauthorized access to or storage in secure downloader memory is discovered | Same as above. |

Fig. 20E

ADAPTING NETWORK POLICIES BASED ON DEVICE SERVICE PROCESSOR CONFIGURATION

BACKGROUND OF THE INVENTION

With the advent of mass market digital communications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMax (Worldwide Interoperability for Microwave Access), and Wi-Fi (Wireless Fidelity) wireless networks increasingly becoming user capacity constrained. Although wireless network capacity will increase with new higher capacity wireless radio access technologies, such as MIMO (Multiple-Input Multiple-Output), and with more frequency spectrum being deployed in the future, these capacity gains are likely to be less than what is required to meet growing digital networking demand.

Similarly, although wire line access networks, such as cable and DSL, can have higher average capacity per user, wire line user service consumption habits are trending toward very high bandwidth applications that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments are disclosed in the following detailed description and the accompanying drawings.

FIG. 10 provides a table summarizing various service processor functional elements in accordance with some embodiments.

FIG. 11 provides a table summarizing various service controller functional elements in accordance with some embodiments.

FIG. 17 is a functional diagram illustrating framing structure of a service processor communication frame and a service controller communication frame in accordance with some embodiments.

FIGS. 18A through 18J provide tables summarizing various service processor heartbeat functions and parameters in accordance with some embodiments.

FIGS. 19A through 19S provide tables summarizing various device based service policy implementation verification techniques in accordance with some embodiments.

FIGS. 20A through 20E provide tables summarizing various techniques for protecting the device based service policy from compromise in accordance with some embodiments.

DETAILED DESCRIPTION

Figure 1:
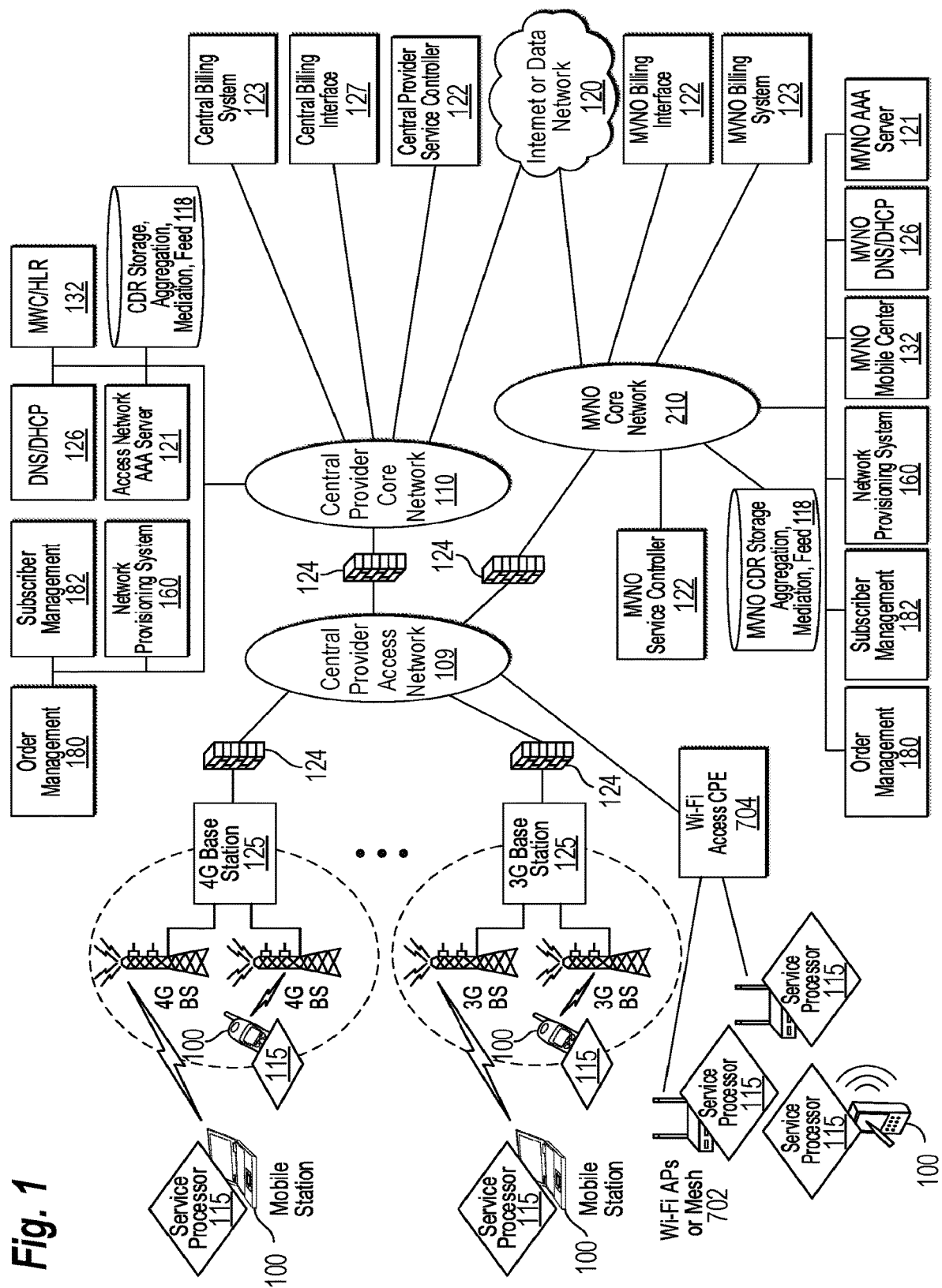
FIG. 1 illustrates a wireless network architecture for providing device assisted CDR creation, aggregation, mediation and billing in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There are many new types of digital devices where it is becoming desirable, for example, to connect these devices to wireless networks including wireless wide area networks (WWAN, such as 3G and 4G) and/or wireless local area (WLAN) networks. These devices include, for example, consumer electronics devices, business user devices, and machine to machine devices that benefit from flexible wide area data connections and the Internet. Example devices include netbooks, notebooks, mobile Internet devices, personal navigation (e.g., GPS enabled) devices, music and multimedia players, eReaders, industrial telemetry, automotive emergency response and diagnostics, 2-way home and industrial power metering and control, vending machines, parking meters, and many other devices. For example, it is highly advantageous to offer service usage and service billing plans for such devices that are more optimal for each type of device and each type of desired user experience. To accomplish this, more sophisticated service usage measuring and service usage billing systems are needed as compared to the conventional network based techniques in existence today. By providing more flexibility in service measurement and billing, more advantageous and cost effective service plans can be created for, for example, the new WWAN connected devices cited above for all three markets (e.g., consumer, business and machine to machine) that still maintain the necessary profit margins for the WWAN carriers to be successful with these various service businesses.

Accordingly, various embodiments disclosed herein provide for a new and flexible augmentation or replacement for existing carrier network service usage measurement, service usage accounting, and service usage billing systems and techniques.

A charging data record (CDR) is a term that as used herein defines a formatted measure of device service usage information, typically generated by one or more network functions that supervise, monitor, and/or control network access for the device. CDRs typically form the basis for recording device network service usage, and often form the basis for billing for such usage. Various embodiments are provided herein for device assisted CDR creation, mediation, and billing. There are many limitations to the capabilities of service usage recording, aggregation and/or billing when CDRs are generated exclusively by network based functions or equipment. Accordingly, by either augmenting network based service usage measures with device based service usage measures, or by replacing network based service usage measures with device based service usage measures, it is possible to create a CDR generation, aggregation, mediation and/or billing solution that has superior or more desirable capabilities/features. While in theory, many of the service usage measures that can be evaluated on a device can also be evaluated in the network data path using various network equipment technologies including but not limited to deep packet inspection (DPI), there are many examples where measuring service usage at the device is either more desirable or more practical, or in some cases it is the only way to obtain the desired measure. Such examples include but are not limited to the following:

Application layer service usage measures (e.g., traffic usage categorized by application or by combinations of application, destination, and/or content type);

Usage measures that do not involve user traffic but instead involve network overhead traffic (e.g., basic connection maintenance traffic, signaling traffic, network logon/AAA/authentication/monitoring traffic, service software update traffic);

Usage that is associated with services that are charged to another entity other than the end user (e.g., basic network connection service offer traffic, traffic associated with providing network access to or downloading service marketing information, traffic associated with advertiser sponsored services, traffic associated with content provider sponsored services, 911 service traffic);

Usage measures involving encrypted traffic (e.g., traffic that is run over encrypted networking protocols or between secure end points);

Implementing service usage measure collection and/or service usage billing across multiple networks that may have different and in some cases incompatible, inaccessible (to the CDR system of record) or incomplete service usage measurement capabilities;

Service usage measurement and/or service usage billing capabilities that are not supported by the present network gateways, routers, MWC/HLRs, AAA, CDR aggregation, CDR mediation, billing and/or provisioning systems;

New service usage measures and/or new service usage billing capabilities that are desirable to implement in a manner that does not require major changes or upgrades to the existing network gateways, routers, MWC/HLRs, AAA, CDR aggregation, CDR mediation, billing and/or provisioning systems;

New service usage measures and/or new service usage billing capabilities that are desirable to implement in a manner that allows for rapid definition and implementation of new service measures and/or billing plans;

New service usage measures and/or new service usage billing capabilities that are desirable to implement in a manner that may be implemented in a manner that enables multiple device group definitions in which each device group gets a customized programmable definition for service usage collection, accounting and/or billing;

Multi device billing;

Multi user billing;

Intermediate device billing with single user and multi user with and without multi device;

Content downloads from a specific source to a specific application with the content being of a specific type or even identified down to a particular content ID; and/or Various other single event transactions used for billing purposes.

For these and other reasons, it is desirable to provide a system/process that utilizes device assisted service usage measures that provides either an enhancement of existing network based service usage CDR system capabilities and techniques and/or a replacement for network based CDR system capabilities and techniques.

In some embodiments, techniques, such as a system and/or process, that utilize device assisted service usage measures include one or more of the following: (1) receiving a service usage measure from a device in communication with a wireless network, (2) verifying or protecting the validity of the service usage measure, (3) generating a CDR based on the service usage measure (e.g., device assisted CDR), (4) aggregating CDRs, and (5) mediating the CDR with network CDRs. In some embodiments, the techniques also include providing a design and provisioning of devices/ network equipment to recognize the CDRs. In some embodiments, the techniques also include provisioning to recognize that the device belongs to a Device Assisted Services (DAS) device group and that corresponding CDRs should be accepted and mediated. In some embodiments, the device assisted CDRs are also generated using formats, network communications protocols, network device authentication and/or provisioning to allow device assisted CDRs into the network CDR system, encryption, and/or signatures as required by the network (e.g., to comply with network generated CDR requirements or based on any other network and/or service provider requirements and/or standards).

In some embodiments, mediation rules include multi device, multi user, single user devices, and/or intermediate networking devices that can be single user or multi user, as described herein.

In some embodiments, a device assisted CDR generator collects device based service usage measures that are used as the basis for, or as an enhancement (e.g., as a supplement or in addition) to, one or more (e.g., network generated) CDRs that provide one or more networking functions with properly formatted service usage reports that the network function(s) accepts as being transmitted from an authorized source, read, and utilized for helping to determine the service usage of a device or group of devices. In some embodiments, the network functions that the device assisted CDR generator shares CDRs with typically include one or more of the following: service usage/CDR aggregation and/or mediation servers, gateways, routers, communication nodes, Mobile Wireless Centers (MWCs, including HLRs), databases, AAA systems, billing interfaces, and billing systems. For example, the process of CDR creation in the CDR generator typically includes either using one or more device based measures of service usage, or one or more device based measures of service usage in combination with one or more network based measures of service usage, possibly processing one or more of such service usage measures according to a set of CDR creation, CDR aggregation, and/or CDR mediation rules to arrive at a final device usage measure that is, for example, then formatted with the proper syntax, framed, possibly encrypted and/or signed, and encapsulated in a communication protocol or packet suitable for sharing with network functions. In some embodiments, the CDR generator resides in the device. In some embodiments, the CDR generator resides in a network server function that receives the device assisted service usage measures, along with possibly network based usage measures, and then creates a CDR (e.g., in the service controller 122).

In some embodiments, the device assisted CDR generator can reside in the service processor (e.g., service processor 115), for example, in the service usage history or billing server functions. In some embodiments, the device assisted CDR generator resides in the device itself, for example, within the service processor functions, such as the billing agent or the service monitor agent.

There are several factors that are considered in the various embodiments in order to create a useful, reliable, and secure device assisted CDR system, including, for example, but not limited to:

Identification of each device based service usage measure with one or more usage transaction codes;

Verification of the device based usage measure(s);

Secure communication of the device based usage measures to the network;

Efficient (e.g., low bandwidth) communication of the device based service usage measure;

Coordination/comparison/aggregation of the device based service usage measure with network based service usage measure(s);

Formatting the device based service usage measure into a CDR that can be properly communicated to the network functions and/or equipment that process service usage information;

Causing the network based functions and/or equipment used for CDR collection, aggregation, mediation and/or billing to recognize, authorize, and accept communications and CDRs from the device assisted CDR generator, reading and properly implementing the correct network session context for the CDR so that the CDR is properly associated with the correct device/user/ session;

Implementing the CDR aggregation rules that determine how to collect and aggregate the device assisted CDRs as they are reported through the network CDR system hierarchy;

Implementing the mediation rules that determine how the various device based service usage transaction code measures are combined and mediated with the other device based service usage transaction code measures to result in consistent service usage information for each of the transaction code categories maintained in the network;

Implementing the mediation rules that determine how the device assisted CDRs are combined and mediated with network based CDRs to result in consistent service usage information for each of the transaction code categories maintained in the network;

Implementing mediation rules to reconcile the variances between network based CDR usage measures and device assisted CDR usage measures;

Classification of one or more device groups, with each group having the capability to uniquely define the service usage collection, accounting, and/or billing rules;

Collecting CDRs generated on networks other than the home network so that service usage may be measured, accounted for, and/or billed for across multiple networks;

Multi device billing;

Multi user billing; and/or

Intermediate device billing with single user and multi user with and without multi device.

In some embodiments, verification of the relative accuracy of the device assisted service usage measure is provided. Given that, for example, the service usage measure is often being generated on an end user device or a device that is readily physically accessed by the general public or other non-secure personnel from a network management viewpoint, in some embodiments, the device agents used in one or more of the service processor 115 agents are protected from hacking, spoofing, and/or other misuse. Various techniques are provided herein for protecting the integrity of the agents used for generating the device assisted service usage measures.

In some embodiments, the service usage measures are verified by network based cross checks using various techniques. For example, network based cross checks can provide valuable verification techniques, because, for example, it is generally not possible or at least very difficult to defeat well designed network based cross checks using various techniques, such as those described herein, even if, for example, the measures used to protect the device agents are defeated or if no device protection measures are employed. In some embodiments, network based cross checks used to verify the device assisted service usage measures include comparing network based service usage measures (e.g. CDRs generated by service usage measurement apparatus in the network equipment, such as the BTS/BSCs 125, RAN Gateways 410, Transport Gateways 420, Mobile Wireless Center/HLRs 132, AAA 121, Service Usage History/CDR Aggregation, Mediation, Feed 118, or other network equipment), sending secure query/response command sequences to the service processor 115 agent(s) involved in device assisted CDR service usage measurement or CDR creation, sending test service usage event sequences to the device and verifying that the device properly reported the service usage, and using various other techniques, such as those described herein with respect to various embodiments.

In some embodiments, one or more of the following actions are taken if the device based service usage measure is found to be in error or inaccurate: bill the user for usage overage or an out of policy device, suspend the device, quarantine the device, SPAN the device, and/or report the device to a network administration function or person.

In some embodiments, the CDR syntax used to format the device assisted service usage information into a CDR and/or network communication protocols for transmitting CDRs are determined by industry standards (e.g., various versions of 3GPP TS 32.215 format and 3GPP2 TSG-X X.S0011 or TIA-835 format). In some embodiments, for a given network implementation the network designers will specify modifications of the standard syntax, formats and/or network communication/transmission protocols. In some embodiments, for a given network implementation the network designers will specify syntax, formats, and/or network communication/transmission protocols that are entirely different than the standards.

In some embodiments, within the syntax and formatting for the CDR the device assisted service usage is typically categorized by a transaction code. For example, the transaction code can be similar or identical to the codes in use by network equipment used to generate CDRs, or given that the device is capable of generating a much richer set of service usage measures, the transaction codes can be a superset of the codes used by network equipment used to generate CDRs (e.g., examples of the usage activities that can be labeled as transaction codes that are more readily supported by device assisted CDR systems as compared to purely network based CDR systems are provided herein).

In some embodiments, the device sends an identifier for a usage activity tag, an intermediate server determines how to aggregate into CDR transaction codes and which CDR transaction code to use.

In some embodiments, the device service processor 115 compartmentalizes usage by pre-assigned device activity transaction codes (e.g., these can be sub-transactions within the main account, transactions within a given bill-by-account transaction or sub-transactions within a bill-by-account transaction). The device implements bill-by-account rules to send different usage reports for each bill-by-account function. In some embodiments, the service controller 122 programs the device to instruct it on how to compartmentalize these bill-by-account service usage activities so that they can be mapped to a transaction code.

In some embodiments, the device reports less compartmentalized service usage information and the service controller 122 does the mapping of service usage activities to CDR transaction codes, including in some cases bill-by-account codes.

In some embodiments, the CDR sent to 118 or other network equipment, for example, can include various types of transaction codes including but not limited to a raw device usage CDR, a bill-by-account (e.g., a sub-activity transaction code) CDR, a billing offset CDR, and/or a billing credit CDR. For example, the decision logic (also referred to as business rules or CDR aggregation and mediation rules) that determines how these various types of CDR transaction codes are to be aggregated and mediated by the core network and the billing system can be located in the network equipment (e.g., a network element, such as service usage 118), in the service controller 122, and/or in the billing system 123.

In some embodiments, the device assisted CDR generator uses the device assisted service usage measures to generate a CDR that includes service usage information, service usage transaction code(s), and, in some embodiments, network information context. In some embodiments, the service usage information, transaction code, and/or network information context is formatted into communication framing, syntax, encryption/signature, security and/or networking protocols that are compatible with the formatting used by conventional networking equipment to generate CDRs. For example, this allows networking equipment used for CDR collection, recording, aggregation, mediation, and/or conversion to billing records to properly accept, read, and interpret the CDRs that are generated with the assistance of device based service usage measurement. In some embodiments, the device assisted service measures are provided to an intermediate network server referred to as a service controller (e.g., service controller 122). In some embodiments, the service controller uses a CDR feed aggregator for a wireless network to collect device generated usage information for one or more devices on the wireless network; and provides the device generated usage information in a syntax (e.g., charging data record (CDR)), and a communication protocol (e.g., 3GPP or 3GPP2, or other communication protocol(s)) that can be used by the wireless network to augment or replace network generated usage information for the one or more devices on the wireless network.

In some embodiments, mediation rules include multi device, multi user, single user devices, intermediate networking devices that can be single user or multi user. For example, the device assisted CDRs can be formatted by the device assisted CDR generator to include a transaction code for one user account, even though the CDRs originate from multiple devices that all belong to the same user. This is an example for a multi-user device assisted CDR billing solution. In another example for a multi-user device assisted CDR billing solution, device assisted CDRs from multiple devices and multiple users can all be billed to the same account (e.g., a family plan or a corporate account), but the bill-by-account CDR transaction records can be maintained through the billing system so that sub-account visibility is provided so that the person or entity responsible for the main account can obtain visibility about which users and/or devices are creating most of the service usage billing. For example, this type of multi-user, multi-device device assisted CDR billing solution can also be used to track types of service usage and/or bill for types of service usage that are either impossible or at least very difficult to account and/or bill for with purely network based CDR systems. In some embodiments, bill-by-account CDR transaction records can be used to provide sponsored transaction services, account for network chatter, provide service selection interfaces, and other services for multi-user or multi-device service plans.

In addition to conventional single user devices (e.g., cell phones, smart phones, netbooks/notebooks, mobile internet devices, personal navigation devices, music players, electronic eReaders, and other single user devices) device assisted service usage measurement and CDRs are also useful for other types of network capable devices and/or networking devices, such as intermediate networking devices (e.g., 3G/4G WWAN to WLAN bridges/routers/gateways, femto cells, DOCSIS modems, DSL modems, remote access/backup routers, and other intermediate network devices). For example, in such devices, particularly with a secure manner to verify that the device assisted service usage measures are relatively accurate and/or the device service processor 115 software is not compromised or hacked, many new service provider service delivery and billing models can be supported and implemented using the techniques described herein. For example, in a WiFi to WWAN bridge or router device multiple user devices can be supported with the same intermediate networking device in a manner that is consistent and compatible with the central provider's CDR aggregation and/or billing system by sending device assisted CDRs as described herein that have a service usage and/or billing code referenced to the end user and/or the particular intermediate device.

In some embodiments, the device assisted CDRs generated for the intermediate networking device are associated with a particular end user in which there can be several or many end users using the intermediate networking device for networking access, and in some embodiments, with each end user being required to enter a unique log-in to the intermediate networking device. For example, in this way, all devices that connect using WiFi to the intermediate networking device to get WWAN access generate CDRs can either get billed to a particular end user who is responsible for the master account for that device, or the CDRs can get billed in a secure manner, with verified relative usage measurement accuracy to multiple end users from the same intermediate networking device. In another example, an end user can have one account that allows access to a number of intermediate networking devices, and each intermediate networking device can generate consistent device assisted CDRs with transaction codes for that end user regardless of which intermediate networking device the end user logs in on.

In some embodiments, some of the services provided by the intermediate networking device are billed to a specific end user device assisted CDR transaction code, while other bill-by-account services are billed to other transaction code accounts, such as sponsored partner transaction service accounts, network chatter accounts, sponsored advertiser accounts, and/or service sign up accounts. For example, in this manner, various embodiments are provided in which intermediate networking devices (e.g., a WWAN to WiFi router/bridge) can sold to one user but can service and be used to bill other users (e.g., and this can be covered in the first purchasing user's service terms perhaps in exchange for a discount), or such intermediate networking devices can be located wherever access is desired without concern that the device will be hacked into so that services can be acquired without charge.

In some embodiments, various types of service usage transactions are billed for on the intermediate networking device, to any of one or more users, in which the information required to bill for such services is not available to the central provider or MVNO network equipment, just as is the case with, for example, conventional single user devices. In view of the various embodiments and techniques described herein, those skilled in the art will appreciate that similar service models are equally applicable not just to WWAN to WiFi intermediate networking devices, but also to the Femto Cell, remote access router, DOCSIS, DSL and other intermediate WWAN to WiFi networking devices.

FIG. 1 illustrates a wireless network architecture for providing device assisted CDR creation, aggregation, mediation and billing in accordance with some embodiments. As shown, FIG. 1 includes a 4G/3G/2G wireless network operated by, for example, a central provider. As shown, various wireless devices 100 are in communication with base stations 125 for wireless network communication with the wireless network, and other devices 100 are in communication with Wi-Fi Access Points (APs) or Mesh 702 for wireless communication to Wi-Fi Access CPE 704 in communication with central provider access network 109. In some embodiments, each of the wireless devices 100 includes a service processor 115 (as shown), and each service processor connects through a secure control plane link to a service controller 122. In some embodiments, the network based service usage information (e.g., CDRs) is obtained from one or more network elements. As shown, an MVNO core network 210 also includes a CDR storage, aggregation, mediation, feed 118, a MVNO billing interface 122, and a MVNO billing system 123 (and other network elements as shown in FIG. 1).

As shown in FIG. 1, a CDR storage, aggregation, mediation, feed 118 (e.g., service usage 118, including a billing aggregation data store and rules engine) is a functional descriptor for, in some embodiments, a device/network level service usage information collection, aggregation, mediation, and reporting function located in one or more of the networking equipment components attached to one or more of the sub-networks shown in FIG. 1 (e.g., central provider access network 109 and/or central provider core network 110), which is in communication with the service controller 122, and a central billing interface 127. As shown in FIG. 1, service usage 118 is shown as a function in communication with the central provider core network 110. In some embodiments, the CDR storage, aggregation, mediation, feed 118 function is located elsewhere in the network or partially located in elsewhere or integrated with as part of other network elements. In some embodiments, CDR storage, aggregation, mediation, feed 118 functionality is located or partially located in the AAA server 121 and/or the mobile wireless center/Home Location Register(HLR) 132 (as shown, in communication with a DNS/DHCP server 126). In some embodiments, service usage 118 functionality is located or partially located in the base station, base station controller and/or base station aggregator, collectively referred to as base station 125 in FIG. 1. In some embodiments, CDR storage, aggregation, mediation, feed 118 functionality is located or partially located in a networking component in the central provider access network 109, a networking component in the core network 110, the central billing system 123, the central billing interface 127, and/or in another network component or function. This discussion on the possible locations for the network based and device based service usage information collection, aggregation, mediation, and reporting function (e.g., CDR storage, aggregation, mediation, feed 118) can be easily generalized as described herein and as shown in the other figures described herein by one of ordinary skill in the art. Also as shown in FIG. 1, the service controller 122 is in communication with the central billing interface 123 (also sometimes referred to as the external billing management interface or billing communication interface) 127, which is in communication with the central billing system 123. As shown, an order management 180 and subscriber management 182 are also in communication with the central provider core network 110 for facilitating order and subscriber management of services for the devices 100 in accordance with some embodiments.

In some embodiments, the CDR storage, aggregation, mediation, feed 118 (and/or other network elements or combinations of network elements) provides a device/network level service usage information collection, aggregation, mediation, and reporting function. In some embodiments, the CDR storage, aggregation, mediation, feed 118 (and/or other network elements or combinations of network elements) collects device generated usage information for one or more devices on the wireless network (e.g., devices 100); and provides the device generated usage information in a syntax and a communication protocol that can be used by the wireless network to augment or replace network generated usage information for the one or more devices on the wireless network. In some embodiments, the syntax is a charging data record (CDR), and the communication protocol is selected from one or more of the following: 3GPP, 3GPP2, or other communication protocols. In some embodiments, the CDR storage, aggregation, mediation, feed 118 (and/or other network elements or combinations of network elements) includes a service usage data store (e.g., a billing aggregator) and a rules engine for aggregating the collected device generated usage information. In some embodiments, the syntax is a charging data record (CDR), and the network device is a CDR feed aggregator, and the CDR storage, aggregation, mediation, feed 118 (and/or other network elements or combinations of network elements) also aggregates CDRs for the one or more devices on the wireless network; applies a set of rules to the aggregated CDRs using a rules engine (e.g., bill by account, transactional billing, and/or any other billing or other rules for service usage information collection, aggregation, mediation, and reporting), and communicates a new set of CDRs for the one or more devices on the wireless network to a billing interface or a billing system (e.g., providing a CDR with a billing offset by account/service). In some embodiments, the CDR storage, aggregation, mediation, feed 118 (and/or other network elements or combinations of network elements) communicates a new set of CDRs for the one or more devices on the wireless network to a billing interface or a billing system. In some embodiments, the CDR storage, aggregation, mediation, feed 118 (and/or other network elements or combinations of network elements) communicates with a service controller to collect the device generated usage information for the one or more devices on the wireless network. In some embodiments, the CDR storage, aggregation, mediation, feed 118 (and/or other network elements or combinations of network elements) communicates with a service controller, in which the service controller is in communication with a billing interface or a billing system. In some embodiments, the CDR storage, aggregation, mediation, feed 118 (and/or other network elements or combinations of network elements) communicates the device generated usage information to a billing interface or a billing system. In some embodiments, the CDR storage, aggregation, mediation, feed (and/or other network elements or combinations of network elements) communicates with a transport gateway and/or a Radio Access Network (RAN) gateway to collect the network generated usage information for the one or more devices on the wireless network. In some embodiments, the service controller 122 communicates the device generated service usage information to the CDR storage, aggregation, mediation, feed 118 (and/or other network elements or combinations of network elements).

In some embodiments, the CDR storage, aggregation, mediation, feed 118 (and/or other network elements or combinations of network elements) performs rules for performing a bill by account aggregation and mediation function. In some embodiments, the service controller 122 in communication with the CDR storage, aggregation, mediation, feed 118 (and/or other network elements or combinations of network elements) performs a rules engine for aggregating and mediating the device generated usage information. In some embodiments, a rules engine device in communication with the CDR storage, aggregation, mediation, feed 118 (and/or other network elements or combinations of network elements) performs a rules engine for aggregating and mediating the device generated usage information.

In some embodiments, the rules engine is included in (e.g., integrated with/part of) the CDR storage, aggregation, mediation, feed 118. In some embodiments, the rules engine and associated functions, as described herein, is a separate function/device. In some embodiments, the service controller 122 performs some or all of these rules engine based functions, as described herein, and communicates with the central billing interface 127. In some embodiments, the service controller 122 performs some or all of these rules engine based functions, as described herein, and communicates with the central billing system 123.

In some embodiments, duplicate CDRs are sent from the network equipment to the billing system 123 that is used for generating service billing. In some embodiments, duplicate CDRs are filtered to send only those CDRs/records for devices controlled by the service controller and/or service processor (e.g., the managed devices). For example, this approach can provide for the same level of reporting, lower level of reporting, and/or higher level of reporting as compared to the reporting required by the central billing system 123.

In some embodiments, a bill-by-account billing offset is provided. For example, bill-by-account billing offset information can be informed to the central billing system 123 by providing a CDR aggregator feed that aggregates the device based service usage data feed to provide a new set of CDRs for the managed devices to the central billing interface 127 and/or the central billing system 123. In some embodiments, transaction billing is provided using similar techniques. For example, transaction billing log information can be provided to the central billing interface 127 and/or the central billing system 123.

In some embodiments, the rules engine (e.g., performed by the service usage 118 or another network element, as described herein) provides a bill-by-account billing offset. For example, device generated usage information (e.g., charging data records (CDRs)) includes a transaction type field (e.g., indicating a type of service for the associated service usage information). The rules engine can apply a rule or a set of rules based on the identified service associated with the device generated usage information to determine a bill-by-account billing offset (e.g., a new CDR can be generated to provide the determined bill-by-account billing offset). In some examples, the determined bill-by-account billing offset can be provided as a credit to the user's service usage account (e.g., a new CDR can be generated with a negative offset for the user's service usage account, such as for network chatter service usage, or transactional service usage, or for any other purposes based on one or more rules performed by the rules engine).

As another example, for a transactional service, a first new CDR can be generated with a negative offset for the user's service usage account for that transactional service related usage, and a second new CDR can be generated with a positive service usage value to charge that same service usage to the transactional service provider (e.g., Amazon, eBay, or another transactional service provider). In some embodiments, the service controller 122 generates these two new CDRs, and the service usage 118 stores, aggregates, and communicates these two new CDRs to the central billing interface 127. In some embodiments, the service controller 122 generates these two new CDRs, and the service usage 118 stores, aggregates, and communicates these two new CDRs to the central billing interface 127, in which the central billing interface 127 applies rules (e.g., performs the rules engine for determining the bill-by-account billing offset).

In some embodiments, the service controller 122 sends the device generated CDRs to the rules engine (e.g., service usage 118), and the rules engine applies one or more rules, such as those described herein and/or any other billing/service usage related rules as would be apparent to one of ordinary skill in the art. In some embodiments, the service controller 122 generates CDRs similar to other network elements, and the rules (e.g., bill-by-account) are performed in the central billing interface 127. For example, for the service controller 122 to generate CDRs similar to other network elements, in some embodiments, the service controller 122 is provisioned on the wireless network and behaves substantially similar to other CDR generators on the network) as would be apparent to one of ordinary skill in the art.

Figure 3:
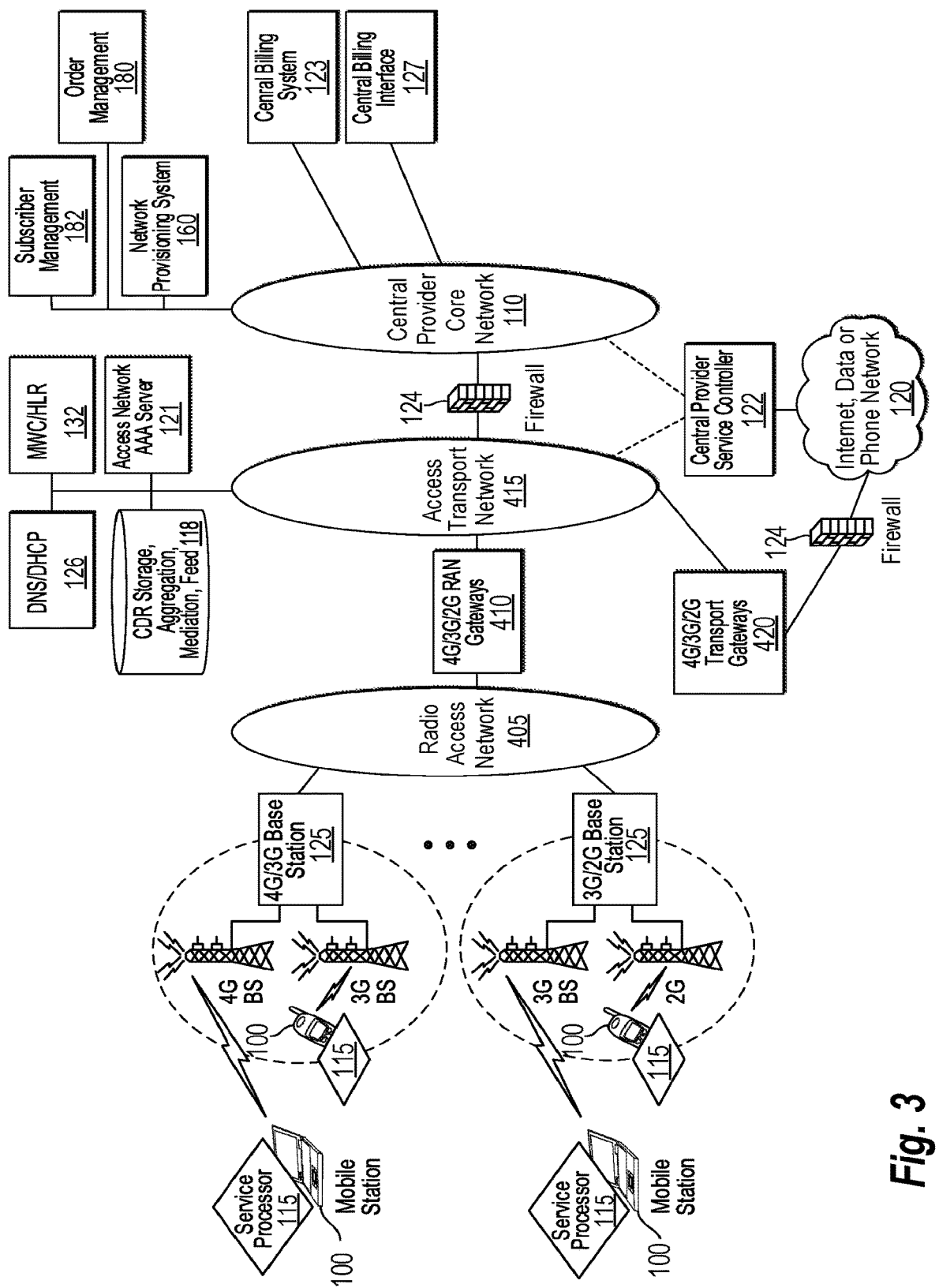
FIG. 3 illustrates another wireless network architecture for providing device assisted CDR creation, aggregation, mediation and billing in accordance with some embodiments.

In some embodiments, the service controller 122 is provisioned as a new type of networking function that is recognized as a valid and secure source for CDRs by the other necessary elements in the network (e.g., the Service Usage History/CDR Aggregation and Mediation Server 118). In some embodiments, in which the network apparatus typically only recognize CDRs from certain types of networking equipment (e.g., RAN Gateway 410 or Transport Gateway 420 (as shown in FIG. 3)), then the Service Controller 122 can provide authentication credentials to the other networking equipment that indicate it is one of the approved types of equipment (e.g., for purposes of generating/providing CDRs). In some embodiments, the link between the Service Controller 122 and the necessary CDR aggregation and mediation equipment is secured, authenticated, encrypted and/or signed.

In some embodiments, the CDR storage, aggregation, mediation, feed 118 discards the network based service usage information (e.g., network based CDRs) received from one or more network elements. In these embodiments, the service controller 122 can provide the device based service usage information (e.g., device based CDRs) to the CDR storage, aggregation, mediation, feed 118 (e.g., the CDR storage, aggregation, mediation, feed 118 can just provide a store, aggregate, and communication function(s)), and the device based service usage information is provided to the central billing interface 127 or the central billing system 123.

In some embodiments, the device based CDRs and/or new CDRs generated based on execution of a rules engine as described herein is provided only for devices that are managed and/or based on device group, service plan, or any other criteria, categorization, and/or grouping.

Figure 2:
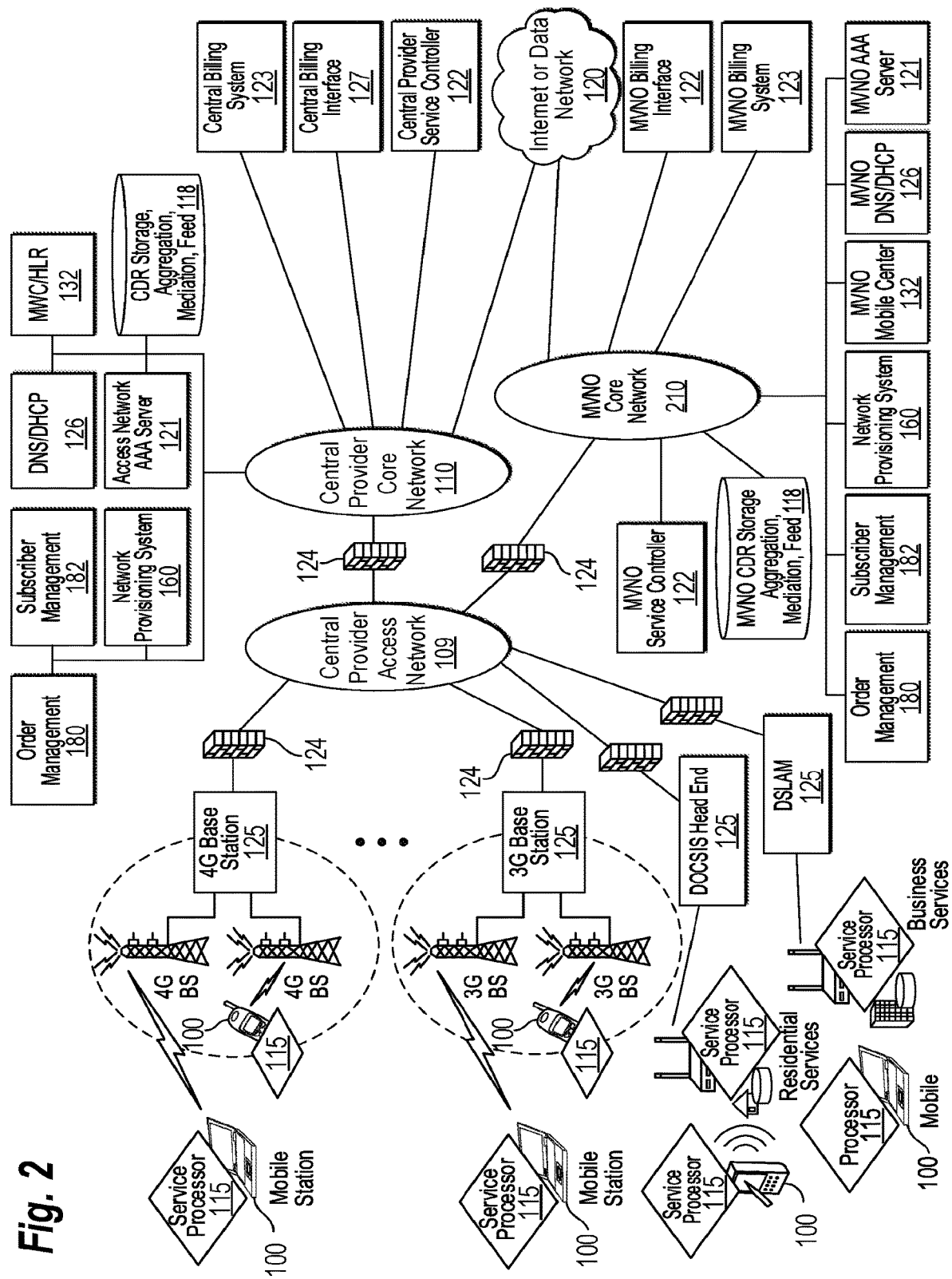
FIG. 2 illustrates another wireless network architecture for providing device assisted CDR creation, aggregation, mediation and billing in accordance with some embodiments.

FIG. 2 illustrates another wireless network architecture for providing device assisted CDR creation, aggregation, mediation and billing in accordance with some embodiments. As shown in FIG. 2, some devices 100 are in communication with DOC SIS Head End 125 and some devices 100 are in communication with DSLAM 125, which are in communication with the central provider access network 109.

FIG. 3 illustrates another wireless network architecture for providing device assisted CDR creation, aggregation, mediation and billing in accordance with some embodiments. Referring now to the 4G/3G/2G access network as shown in FIG. 3, the 4G/3G and 3G/2G base stations/nodes 125 are in communication with a 4G/3G/2G Radio Access Network (RAN) gateway 410 via a radio access network 405, which are in communication with a 4G/3G/2G transport gateway 420 via an access transport network 415. The central provider core network 110 is in network communication with the access transport network 415 (e.g., via a dedicated/leased line, and as shown, via a firewall 124). The Internet 120 is available via a firewall 124 and the transport gateway(s) 420, as shown. Also, as shown, a network apparatus provisioning system 160, order management 180, and subscriber management 182 are in communication with the central provider core network 110. As shown, a AAA server 121, a mobile wireless center/Home Location Register(HLR) 132, a DNS/DHCP 126, and CDR storage, aggregation, mediation, feed 118 are also in communication with the access transport network 415. The central billing system 123 and the central billing interface 127 are shown in communication with the central provider core network 110.

As shown, FIG. 3 includes a 4G/3G/2G wireless network operated by, for example, a central provider. In some embodiments, each of the wireless devices 100 includes a service processor 115 (as shown), and each service processor connects through a secure control plane link to a service controller 122. In some embodiments, the network based service usage information (e.g., network generated CDRs) is obtained from Radio Access Network (RAN) gateway(s) 410 and/or transport gateway(s) 420. In some embodiments, device based service usage information (e.g., device assisted CDRs) are generated by the service processor 115 and/or service controller 122 for some or all of the wireless devices 100 using similar techniques as described herein, and in some embodiments, such device based service usage information (e.g., device assisted CDRs) is sent to the CDR storage, aggregation, mediation, feed 118 (e.g., the CDR storage, aggregation, mediation, feed 118 can just provide a store, aggregate, and communication function(s)), and/or to the central billing interface 127 or the central billing system 123, as similarly described herein with respect to various embodiments.

Figure 4:
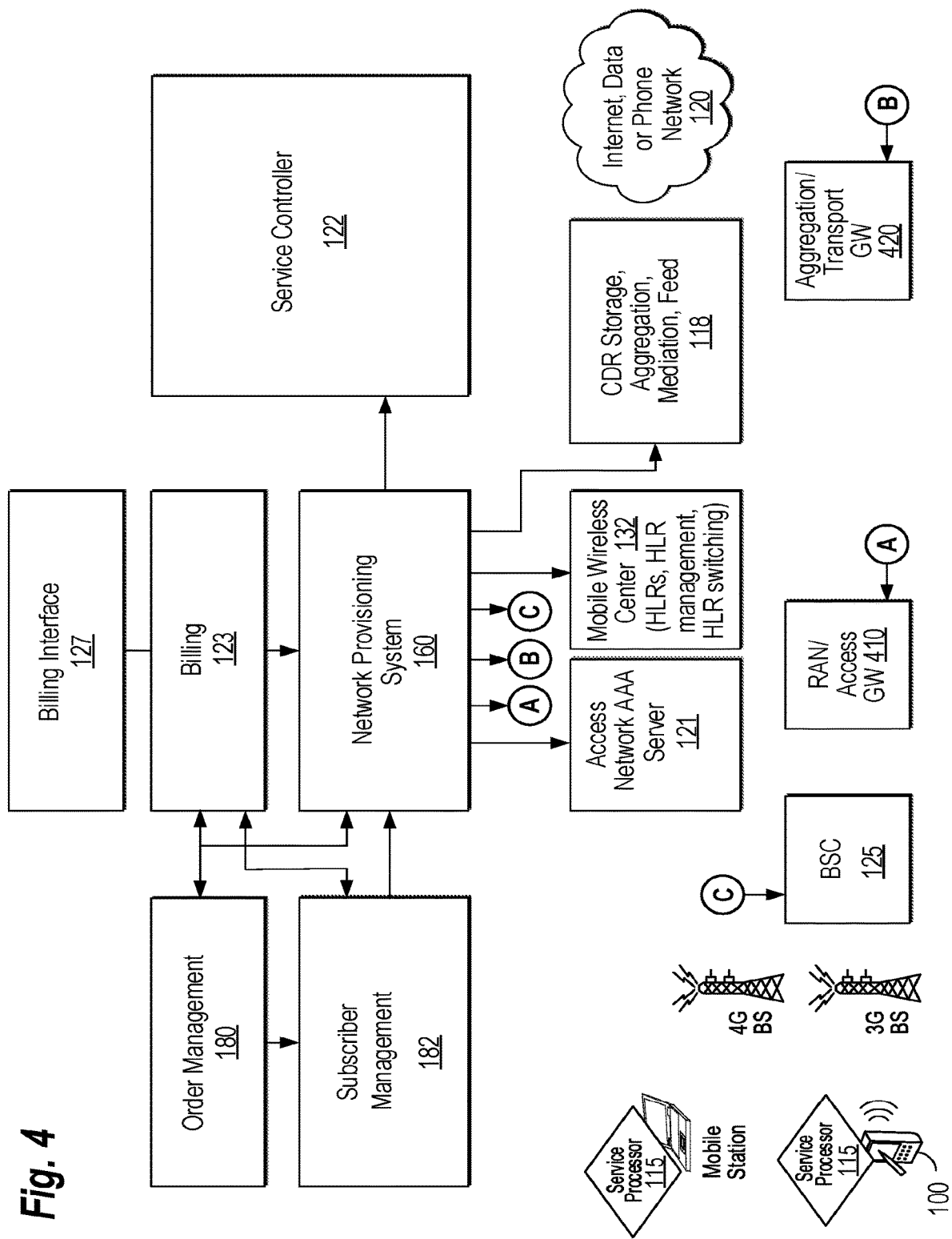
FIG. 4 illustrates provisioning of a wireless network for providing device assisted CDR creation, aggregation, mediation and billing in accordance with some embodiments.

FIG. 4 illustrates provisioning of a wireless network for providing device assisted CDR creation, aggregation, mediation and billing in accordance with some embodiments. As shown in FIG. 4, the provisioning of various network equipment is provided as shown to recognize each other as an authorized source of CDRs (e.g., this can be done manually or in an automated manner). For example, order management 180, subscriber management, billing interface 127, billing system 123, network provisioning system 160, service controller 122, access network AAA server 121, mobile wireless center 132, and CDR storage, aggregation, mediation feed 118 communicate with each other for such provisioning, which can be implemented using various techniques. In some embodiments, the various network elements are provisioned to recognize device assisted CDRs being generated by the service controller 122, which, for example, can be provided to the billing interface 127 and/or the billing system 123. In some embodiments, network generated CDRs are provided by RAN/Access gateway 410, aggregation/transport gateway 425, and/or base station controller 125. In some embodiments, other network elements generate/receive/store device assisted CDRs.

In some embodiments, provisioning of various network equipment is provided to recognize a given device as belonging to a device group that supports a service usage and/or billing plan that relies upon and/or utilizes device assisted CDRs.

In some embodiments, the CDR formats, transaction codes, and CDR transmission destinations are programmed for each device that generates CDRs, including the service controller 122 (e.g., in some embodiments, the service controller 122 is the intermediary for CDRs) and/or service processor 115 (e.g., in some embodiments, the device sends CDRs to network CDR aggregation or billing interface 127/billing system 123 with no intermediate server function).

Figure 5:
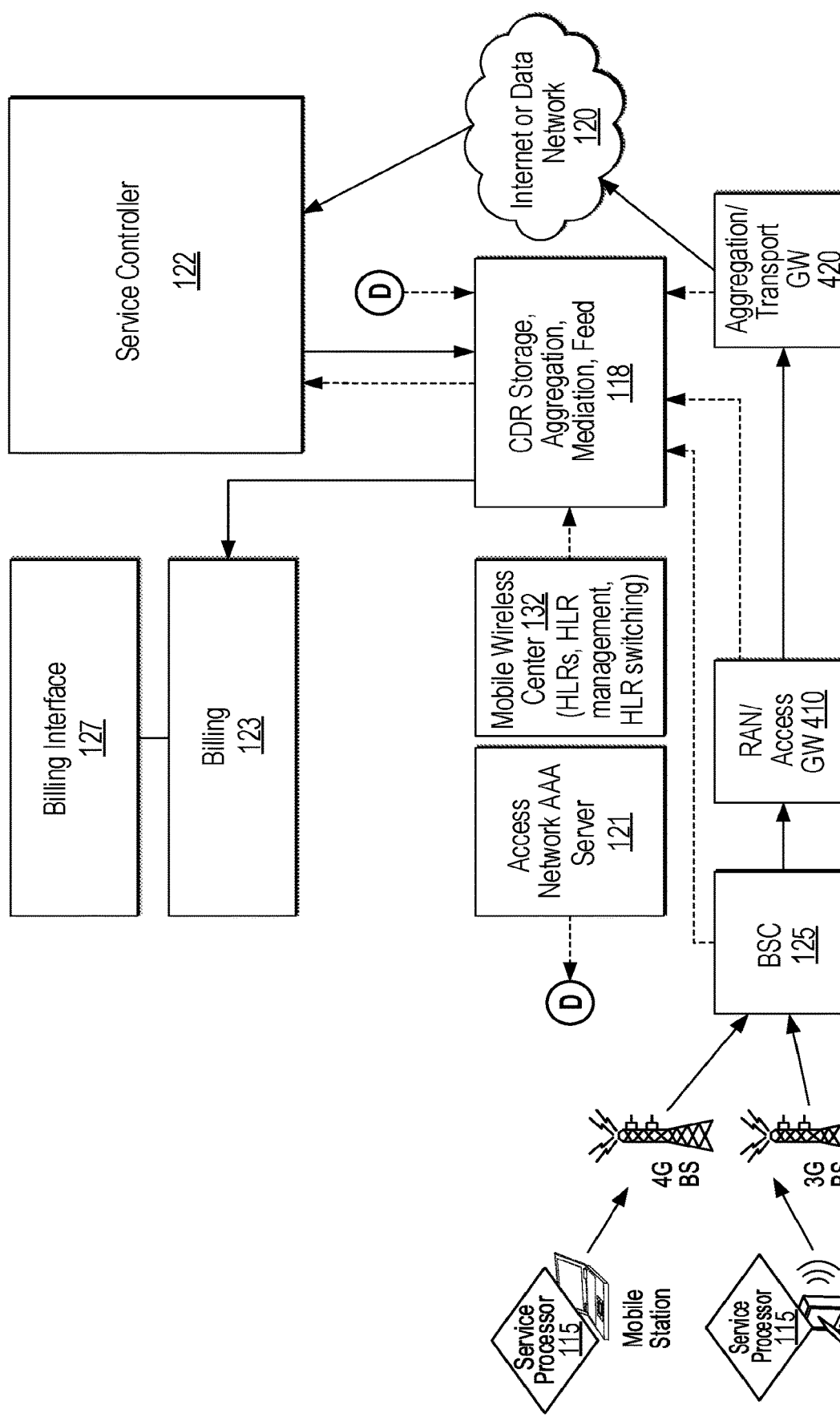
FIG. 5 illustrates a network architecture for providing device assisted CDRs in accordance with some embodiments.

FIG. 5 illustrates a network architecture for providing device assisted CDRs in accordance with some embodiments. As shown, network generated CDRs are sent from various network elements to the CDR storage, aggregation, mediation, feed 118 and the service controller 122, as shown in dashed lines with arrows in FIG. 5. In some embodiments, the network generated CDRs are used for verification of device assisted service (DAS) usage and/or billing information. In some embodiments, the network generated CDRs are provided to the service controller 122, and the service controller 122 implements aggregation and/or mediation rules to examine and, in some cases, aggregate and/or mediate network generated/based CDRs with device assisted/based CDRs.

In some embodiments, device assisted CDRs are sent from the service controller 122 to CDR storage, aggregation, mediation, feed 118 and communicated to the billing system 123, as shown in solid lines with arrows in FIG. 5. In some embodiments, CDR storage, aggregation, mediation, feed 118 uses DAS service usage CDRs to augment network generated/based CDRs with bill-by-account transaction codes (e.g., as similarly described herein). In some embodiments, CDR storage, aggregation, mediation, feed 118 implements aggregation and/or mediation rules to account for DAS CDR usage amount in a new bill-by-account transaction code and removes the same service usage amount from the bulk device account transaction code. In some embodiments, a first DAS CDR is sent for the new bill by account transaction code, and a second DAS CDR is sent to be used as a correction (credit) to the main device usage account transaction code, and CDR storage, aggregation, mediation, feed 118 implements the rules to perform this mediation. In some embodiments, a first DAS CDR is used for a given bill-by-account transaction code, and a second DAS CDR is used as the main device account transaction code, in which the service controller 122 (or device) has already implemented the mediation rules so that CDR storage, aggregation, mediation, feed 118 simply passes such DAS CDRs to billing after aggregating them.

Figure 6:
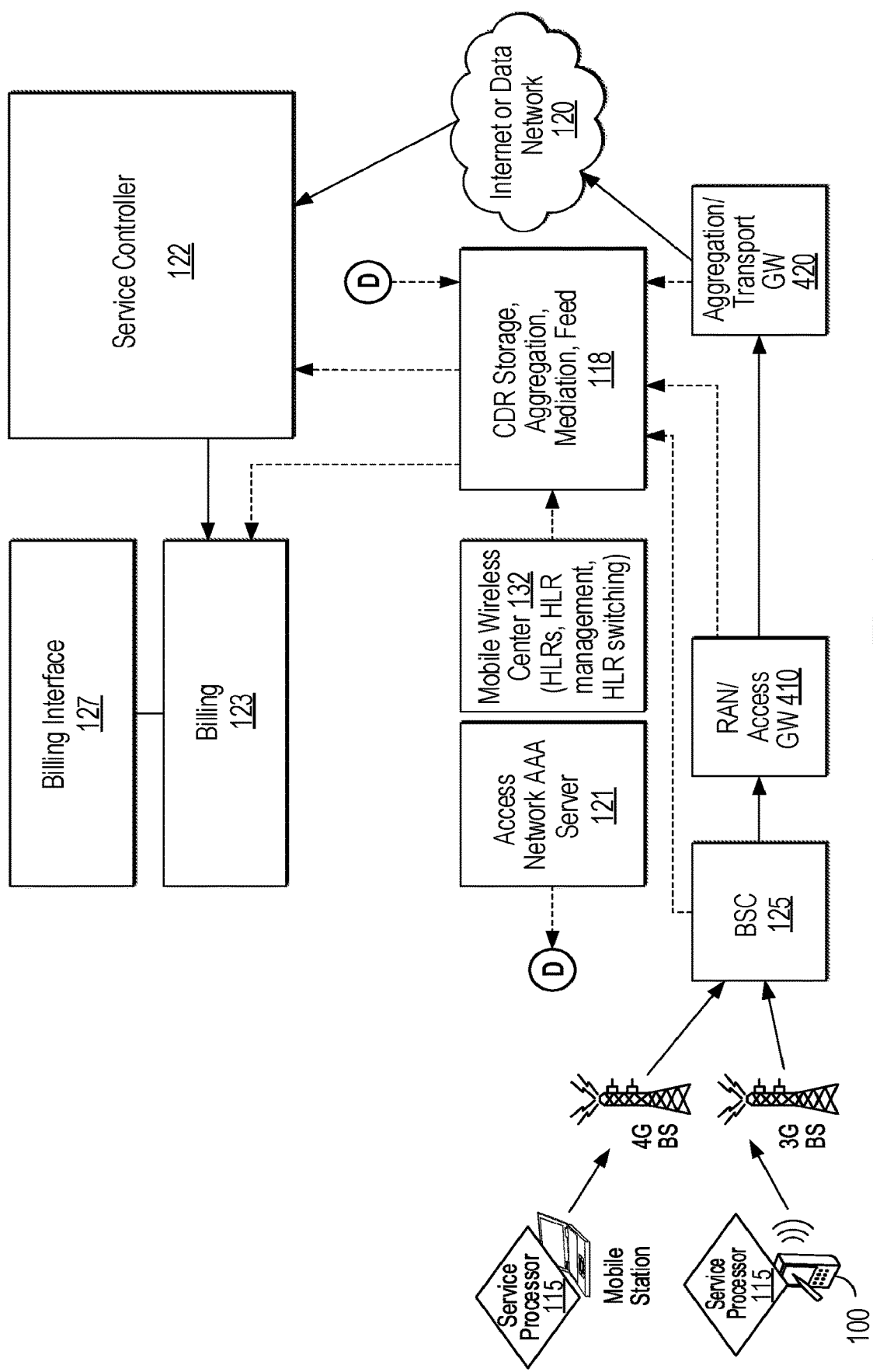
FIG. 6 illustrates another network architecture for providing device assisted CDRs in accordance with some embodiments.

FIG. 6 illustrates another network architecture for providing device assisted CDRs in accordance with some embodiments. FIG. 6 also shows the communication of device assisted CDRs and network generated CDRs using solid and dashed lines with arrows, respectively. As shown, in some embodiments, CDR storage, aggregation, mediation, feed 118 sends network based CDRs to service controller 122 for various purposes, such as those previously described herein.

In some embodiments, service controller 122 sends DAS CDRs to billing for various uses by the billing system 123. In some embodiments, the billing system 123 uses DAS service usage CDRs to augment network based CDRs with bill-by-account transaction codes. In some embodiments, the billing system 123 implements aggregation and/or mediation rules to account for DAS CDR usage amount in a new bill-by-account transaction code and removes the same service usage amount from the bulk device account transaction code. In some embodiments, a first DAS CDR is sent for the new bill by account transaction code, and a second DAS CDR is sent to be used as a correction (credit) to the main device usage account transaction code, and the billing system 123 implements the rules to perform this mediation. In some embodiments, a first DAS CDR is used for a given bill-by-account transaction code, and a second is used as the main device account transaction code, in which the service controller 122 (or device) has already implemented the mediation rules so that the billing system 123 simply passes such DAS CDRs after aggregating them.

Figure 7:
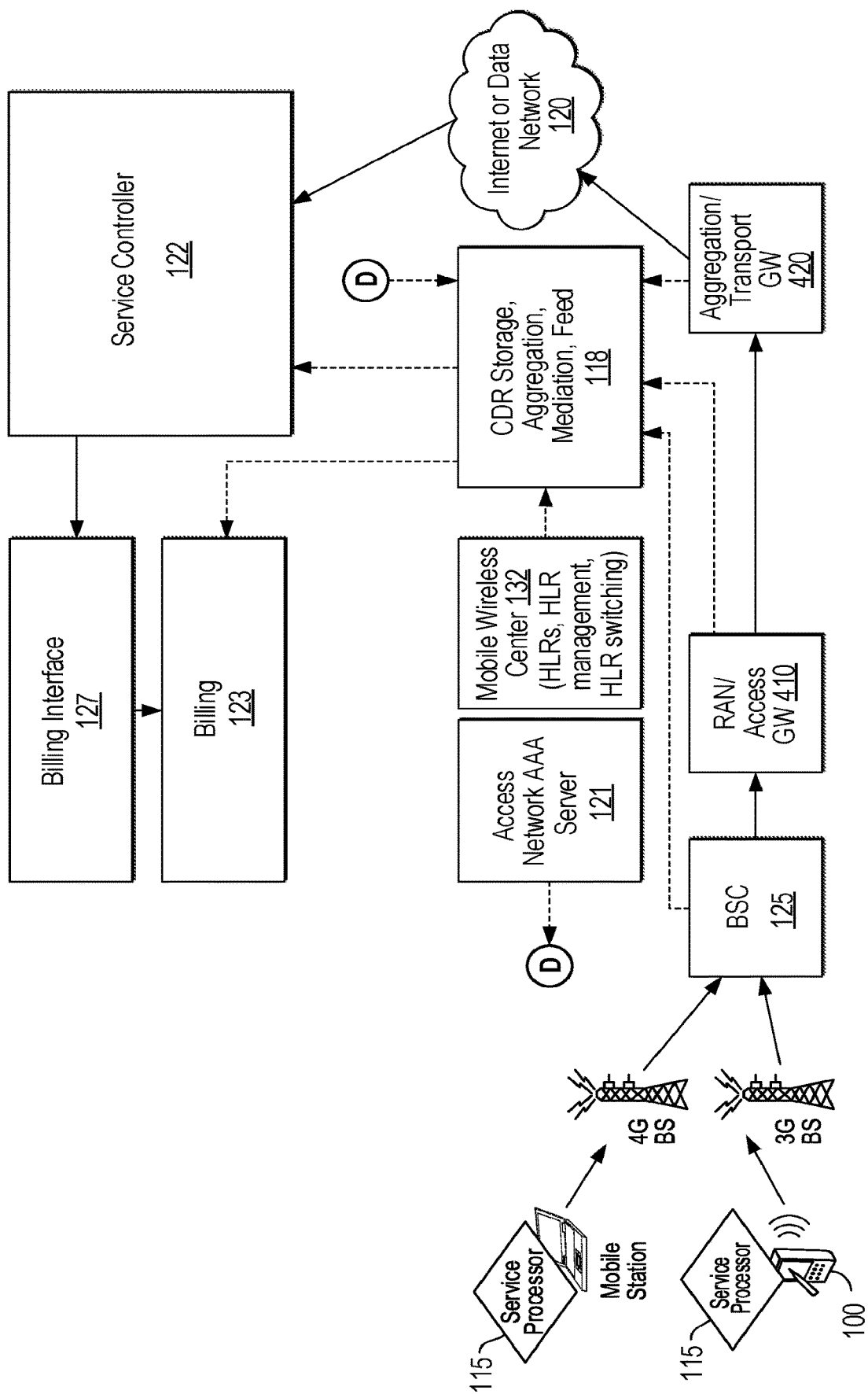
FIG. 7 illustrates another network architecture for providing device assisted CDRs in accordance with some embodiments.

FIG. 7 illustrates another network architecture for providing device assisted CDRs in accordance with some embodiments. FIG. 7 also shows the communication of device assisted CDRs and network generated CDRs using solid and dashed lines with arrows, respectively. FIG. 7 is similar to FIG. 6, except as shown in FIG. 7, service usage information is passed through the billing interface 127 instead of the billing CDR aggregation interface. For example, the service usage detailed bill-by-account information and offset (credit) information can be formatted as a CDR or can be formatted in a higher level syntax as required by the billing interface 127.

Figure 8:
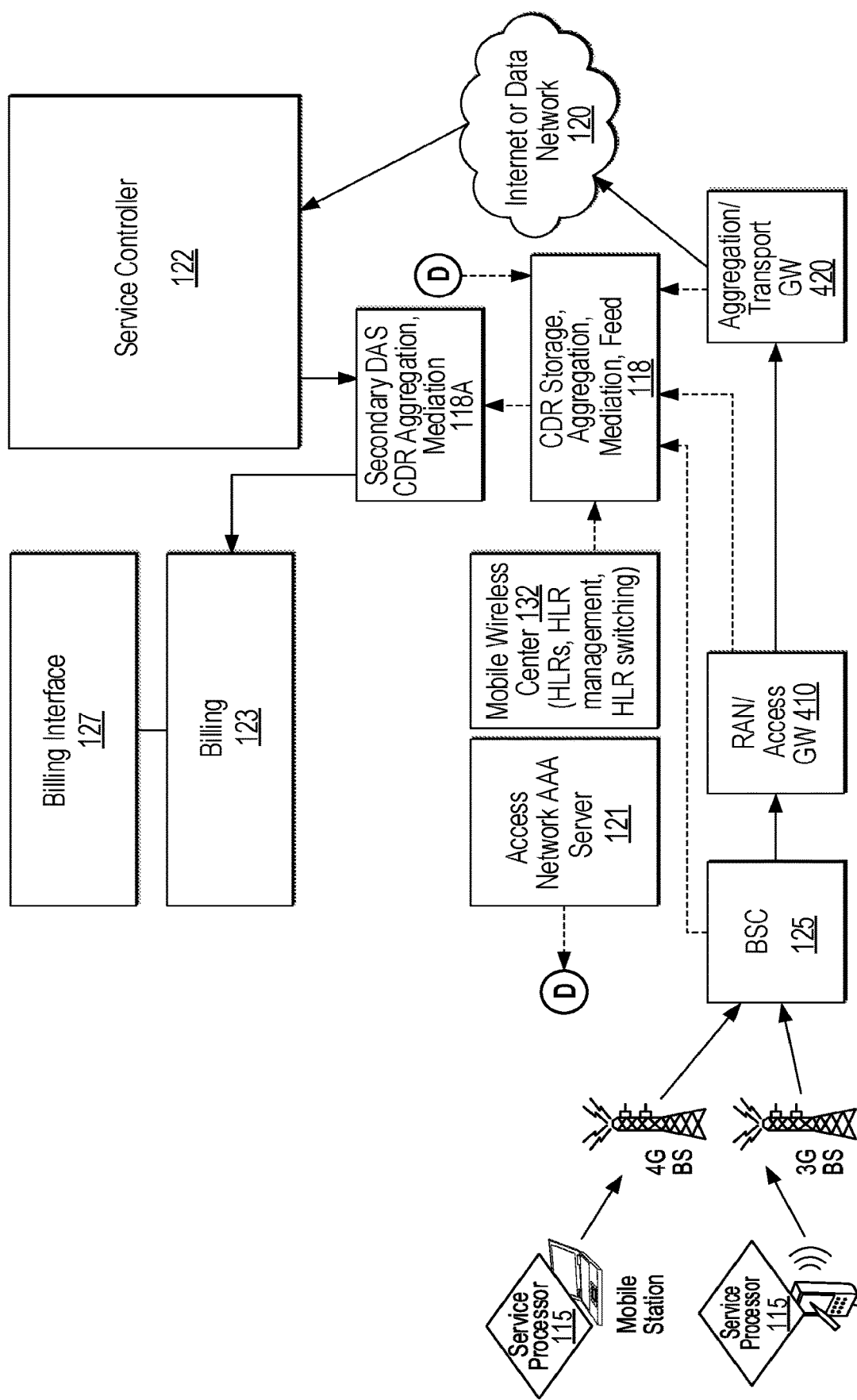
FIG. 8 illustrates another network architecture for providing device assisted CDRs in accordance with some embodiments.

FIG. 8 illustrates another network architecture for providing device assisted CDRs in accordance with some embodiments. FIG. 8 also shows the communication of device assisted CDRs and network generated CDRs using solid and dashed lines with arrows, respectively. In some embodiments, as shown in FIG. 8, the central provider need not modify the existing CDR storage, aggregation, mediation, feed 118, so the additional aggregation and mediation rules discussed above with respect to FIG. 5 are implemented as a new layer of rules in a new network function, shown as secondary DAS CDR aggregation mediation 118A, that is located between the billing system and the CDR storage, aggregation, mediation, feed 118. For example, this new network function (e.g., secondary DAS CDR aggregation mediation 118A) can reside in the network (as shown) or in the service processor 115, in the service controller 122, or elsewhere in the network or on the device.

Figure 9:
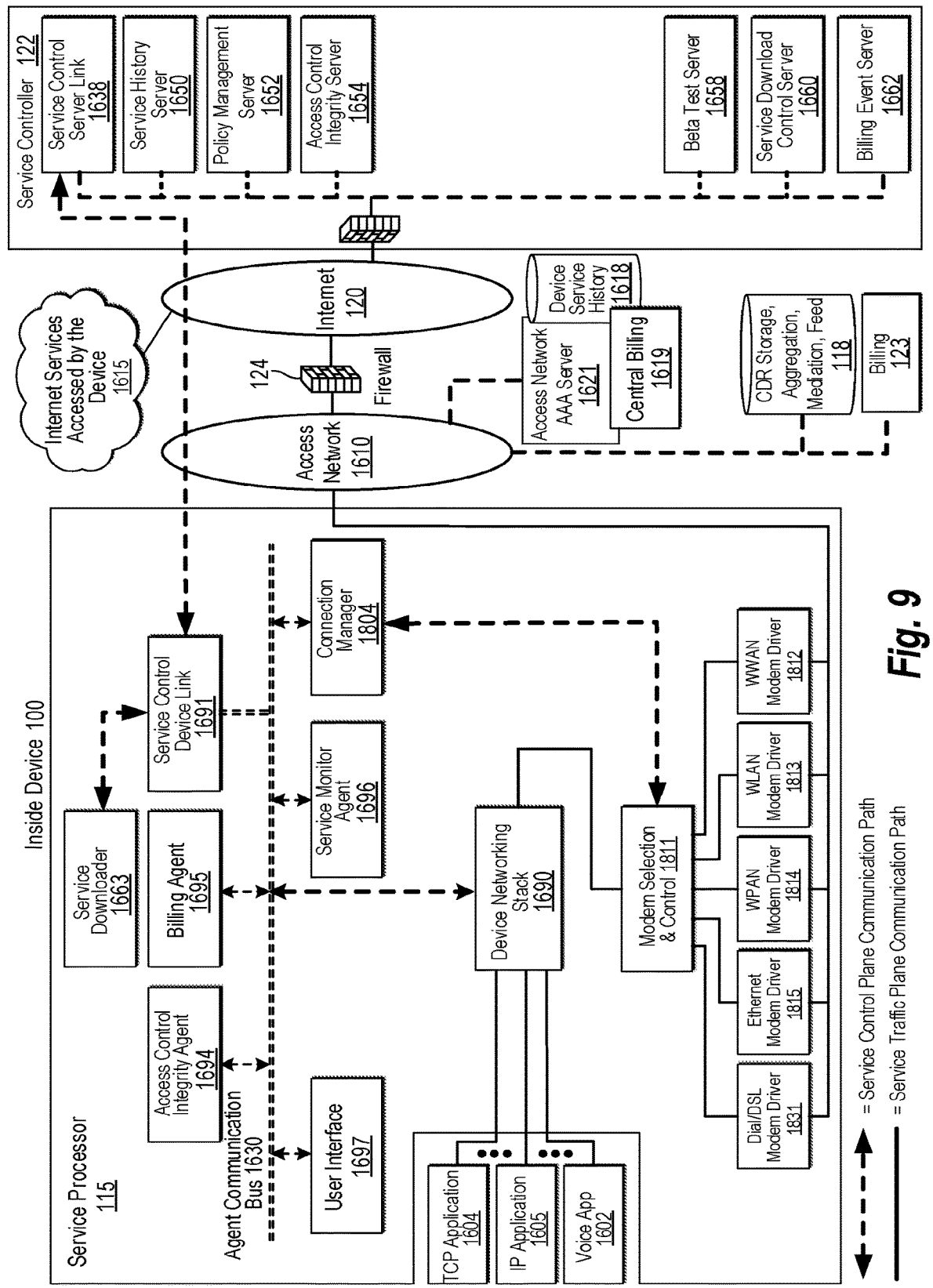
FIG. 9 is a functional diagram illustrating a device based service processor and a service controller in accordance with some embodiments.

FIG. 9 is a functional diagram illustrating a device based service processor 115 and a service controller 122 in accordance with some embodiments. For example, this provides relatively full featured device based service processor implementation and service controller implementation. As shown, this corresponds to a networking configuration in which the service controller 122 is connected to the Internet 120 and not directly to the access network 1610. As shown, a data plane (e.g., service traffic plane) communication path is shown in solid line connections and control plane (e.g., service control plane) communication path is shown in dashed line connections. As will be apparent, the division in functionality between one device agent and another is based on, for example, design choices, networking environments, devices and/or services/applications, and various different combinations can be used in various different implementations. For example, the functional lines can be re-drawn in any way that the product designers see fit. As shown, this includes certain divisions and functional breakouts for device agents as an illustrative implementation, although other, potentially more complex, embodiments can include different divisions and functional breakouts for device agent functionality specifications, for example, in order to manage development specification and testing complexity and workflow. In addition, the placement of the agents that operate, interact with or monitor the data path can be moved or re-ordered in various embodiments. For example, the functional elements shown in FIG. 9 are described below with respect to FIGS. 10 and 11.

As shown in FIG. 9, service processor 115 includes a service control device link 1691. For example, as device based service control techniques involving supervision across a network become more sophisticated, it becomes increasingly important to have an efficient and flexible control plane communication link between the device agents and the network elements communicating with, controlling, monitoring, or verifying service policy. In some embodiments, the service control device link 1691 provides the device side of a system for transmission and reception of service agent to/from network element functions. In some embodiments, the traffic efficiency of this link is enhanced by buffering and framing multiple agent messages in the transmissions. In some embodiments, the traffic efficiency is further improved by controlling the transmission frequency or linking the transmission frequency to the rate of service usage or traffic usage. In some embodiments, one or more levels of security or encryption are used to make the link robust to discovery, eavesdropping or compromise. In some embodiments, the service control device link 1691 also provides the communications link and heartbeat timing for the agent heartbeat function. As discussed below, various embodiments disclosed herein for the service control device link 1691 provide an efficient and secure solution for transmitting and receiving service policy implementation, control, monitoring and verification information with other network elements.

As shown in FIG. 9, the service controller 122 includes a service control server link 1638. In some embodiments, device based service control techniques involving supervision across a network (e.g., on the control plane) are more sophisticated, and for such it is increasingly important to have an efficient and flexible control plane communication link between the device agents (e.g., of the service processor 115) and the network elements (e.g., of the service controller 122) communicating with, controlling, monitoring, or verifying service policy. For example, the communication link between the service control server link 1638 of service controller 122 and the service control device link 1691 of the service processor 115 can provide an efficient and flexible control plane communication link, a service control link 1653 as shown in FIG. 9, and, in some embodiments, this control plane communication link provides for a secure (e.g., encrypted) communications link for providing secure, bidirectional communications between the service processor 115 and the service controller 122. In some embodiments, the service control server link 1638 provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link 1638 also provides the communications link and heartbeat timing for the agent heartbeat function.

In some embodiments, the service control server link 1638 provides for securing, signing, encrypting and/or otherwise protecting the communications before sending such communications over the service control link 1653. For example, the service control server link 1638 can send to the transport layer or directly to the link layer for transmission. In another example, the service control server link 1638 further secures the communications with transport layer encryption, such as TCP TLS SSH version 1 or 2 or another secure transport layer protocol. As another example, the service control server link 1638 can encrypt at the link layer, such as using IPSEC, various possible VPN services, other forms of IP layer encryption and/or another link layer encryption technique.

As shown in FIG. 9, the service controller 122 includes an access control integrity server 1654. In some embodiments, the access control integrity server 1654 collects device information on service policy, service usage, agent configuration and/or agent behavior. For example, the access control integrity server 1654 can cross check this information to identify integrity breaches in the service policy implementation and control system. In another example, the access control integrity server 1654 can initiate action when a service policy violation or a system integrity breach is suspected.

In some embodiments, the access control integrity server 1654 (and/or some other agent of service controller 122) acts on access control integrity agent 1694 reports and error conditions. Many of the access control integrity agent 1654 checks can be accomplished by the server. For example, the access control integrity agent 1654 checks include one or more of the following: service usage measure against usage range consistent with policies (e.g., usage measure from the network and/or from the device); configuration of agents; operation of the agents; and/or dynamic agent download.

In some embodiments, the access control integrity server 1654 (and/or some other agent of service controller 122) verifies device service policy implementations by comparing various service usage measures (e.g., based on network monitored information, such as by using IPDRs or CDRs, and/or local service usage monitoring information) against expected service usage behavior given the policies that are intended to be in place. For example, device service policy implementations can include measuring total data passed, data passed in a period of time, IP addresses, data per IP address, and/or other measures such as location, downloads, email accessed, URLs, and comparing such measures expected service usage behavior given the policies that are intended to be in place.

In some embodiments, the access control integrity server 1654 (and/or some other agent of service controller 122)

verifies device service policy, and the verification error conditions that can indicate a mismatch in service measure and service policy include one or more of the following: unauthorized network access (e.g., access beyond ambient service policy limits); unauthorized network speed (e.g., average speed beyond service policy limit); network data amount does not match policy limit (e.g., device not stop at limit without re-up/revising service policy); unauthorized network address; unauthorized service usage (e.g., VOIP, email, and/or web browsing); unauthorized application usage (e.g., email, VOIP, email, and/or web); service usage rate too high for plan, and policy controller not controlling/throttling it down; and/or any other mismatch in service measure and service policy. Accordingly, in some embodiments, the access control integrity server 1654 (and/or some other agent of service controller 122) provides a policy/service control integrity service to continually (e.g., periodically and/or based on trigger events) verify that the service control of the device has not been compromised and/or is not behaving out of policy.

As shown in FIG. 9, service controller 122 includes a service history server 1650. In some embodiments, the service history server 1650 collects and records service usage or service activity reports from the Access Network AAA Server 1621 and the Service Monitor Agent 1696. For example, although service usage history from the network elements can in certain embodiments be less detailed than service history from the device, the service history from the network can provide a valuable source for verification of device service policy implementation, because, for example, it is extremely difficult for a device error or compromise event on the device to compromise the network based equipment and software. For example, service history reports from the device can include various service tracking information, as similarly described above. In some embodiments, the service history server 1650 provides the service history on request to other servers and/or one or more agents. In some embodiments, the service history server 1650 provides the service usage history to the device service history 1618. In some embodiments, for purposes of facilitating the activation tracking service functions (described below), the service history server 1650 maintains a history of which networks the device has connected to. For example, this network activity summary can include a summary of the networks accessed, activity versus time per connection, and/or traffic versus time per connection. As another example, this activity summary can further be analyzed or reported to estimate the type of service plan associated with the traffic activity for the purpose of bill sharing reconciliation.

As shown in FIG. 9, service controller 122 includes a policy management server 1652. In some embodiments, the policy management server 1652 transmits policies to the service processor 115 via the service control link 1653. In some embodiments, the policy management server 1652 manages policy settings on the device (e.g., various policy settings as described herein with respect to various embodiments) in accordance with a device service profile. In some embodiments, the policy management server 1652 sets instantaneous policies on policy implementation agents (e.g., policy implementation agent 1690). For example, the policy management server 1652 can issue policy settings, monitor service usage and, if necessary, modify policy settings. For example, in the case of a user who prefers for the network to manage their service usage costs, or in the case of any adaptive policy management needs, the policy management server 1652 can maintain a relatively high frequency of communication with the device to collect traffic and/or service measures and issue new policy settings. In this example, device monitored service measures and any user service policy preference changes are reported, periodically and/or based on various triggers/events/requests, to the policy management server 1652. In this example, user privacy settings generally require secure communication with the network (e.g., a secure service control link 1653), such as with the policy management server 1652, to ensure that various aspects of user privacy are properly maintained during such configuration requests/policy settings transmitted over the network. For example, information can be compartmentalized to service policy management and not communicated to other databases used for CRM for maintaining user privacy.

In some embodiments, the policy management server 1652 provides adaptive policy management on the device. For example, the policy management server 1652 can issue policy settings and objectives and rely on the device based policy management (e.g., service processor 115) for some or all of the policy adaptation. This approach can require less interaction with the device thereby reducing network chatter on service control link 1653 for purposes of device policy management (e.g., network chatter is reduced relative to various server/network based policy management approaches described above). This approach can also provide robust user privacy embodiments by allowing the user to configure the device policy for user privacy preferences/settings so that, for example, sensitive information (e.g., geo-location data, website history) is not communicated to the network without the user's approval. In some embodiments, the policy management server 1652 adjusts service policy based on time of day. In some embodiments, the policy management server 1652 receives, requests or otherwise obtains a measure of network availability and adjusts traffic shaping policy and/or other policy settings based on available network capacity.

As shown in FIG. 9, service controller 122 includes a network traffic analysis server 1656. In some embodiments, the network traffic analysis server 1656 collects/receives service usage history for devices and/or groups of devices and analyzes the service usage. In some embodiments, the network traffic analysis server 1656 presents service usage statistics in various formats to identify improvements in network service quality and/or service profitability. In other embodiments, the network traffic analysis server 1656 estimates the service quality and/or service usage for the network under variable settings on potential service policy. In other embodiments, the network traffic analysis server 1656 identifies actual or potential service behaviors by one or more devices that are causing problems for overall network service quality or service cost.

As shown in FIG. 9, service controller 122 includes a beta test server 1658. In some embodiments, the beta test server 1658 publishes candidate service plan policy settings to one or more devices. In some embodiments, the beta test server 1658 provides summary reports of network service usage or user feedback information for one or more candidate service plan policy settings. In some embodiments, the beta test server 1658 provides a mechanism to compare the beta test results for different candidate service plan policy settings or select the optimum candidates for further policy settings optimization.

As shown in FIG. 9, service controller 122 includes a service download control server 1660. In some embodiments, the service download control server 1660 provides a download function to install and/or update service software elements (e.g., the service processor 115 and/or agents/components of the service processor 115) on the device, as described herein.

As shown in FIG. 9 service controller 122 includes a billing event server 1662. In some embodiments, the billing event server 1662 collects billing events, provides service plan information to the service processor 115, provides service usage updates to the service processor 115, serves as interface between device and central billing server 1619, and/or provides trusted third party function for certain ecommerce billing transactions.

As shown in FIG. 9, the Access Network AAA server 1621 is in network communication with the access network 1610. In some embodiments, the Access Network AAA server 1621 provides the necessary access network AAA services (e.g., access control and authorization functions for the device access layer) to allow the devices onto the central provider access network and the service provider network. In some embodiments, another layer of access control is required for the device to gain access to other networks, such as the Internet, a corporate network and/or a machine to machine network. This additional layer of access control can be implemented, for example, by the service processor 115 on the device. In some embodiments, the Access Network AAA server 1621 also provides the ability to suspend service for a device and resume service for a device based on communications received from the service controller 122. In some embodiments, the Access Network AAA server 1621 also provides the ability to direct routing for device traffic to a quarantine network or to restrict or limit network access when a device quarantine condition is invoked. In some embodiments, the Access Network AAA server 1621 also records and reports device network service usage (e.g., device network service usage can be reported to device service history 1618).

As shown in FIG. 9, the device service history 1618 is in network communication with the access network 1610. In some embodiments, the device service history 1618 provides service usage data records used for various purposes in various embodiments. In some embodiments, the device service history 1618 is used to assist in verifying service policy implementation. In some embodiments, the device service history 1618 is used to verify service monitoring. In some embodiments, the device service history 1618 is used to verify billing records and/or billing policy implementation. In some embodiments, the device service history 1618 is used to synchronize and/or verify the local service usage counter.

As shown in FIG. 9, the central provider billing server 1619 is in network communication with the access network 1610. In some embodiments, the central provider billing server 1619 provides a mediation function for central provider billing events. For example, the central provider billing server 1619 can accept service plan changes. In some embodiments, the central provider billing server 1619 provides updates on device service usage, service plan limits and/or service policies. In some embodiments, the central provider billing server 1619 collects billing events, formulates bills, bills service users, provides certain billing event data and service plan information to the service controller 122 and/or device 100.

As shown in FIG. 9, in some embodiments, modem selection and control 1811 selects the access network connection and is in communication with the modem firewall 1655, and modem drivers 1831, 1815, 1814, 1813, 1812 convert data traffic into modem bus traffic for one or more modems and are in communication with the modem selection and control 1811. In some embodiments, different profiles are selected based on the selected network connection (e.g., different service profiles/policies for WWAN, WLAN, WPAN, Ethernet and/or DSL network connections), which is also referred to herein as multimode profile setting. For example, service profile settings can be based on the actual access network (e.g., home DSL/cable or work network) behind the Wi-Fi not the fact that it is Wi-Fi (or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the service controller can sit in a service provider cloud or an MVNO cloud, the service controls can be provided by a VSP capability offered by the service provider or the service controller can be owned by the hotspot service provider that uses the service controller on their own without any association with an access network service provider. For example, the service processors can be controlled by the service controller to divide up the available bandwidth at the hotspot according to QoS or user sharing rules (e.g., with some users having higher differentiated priority (potentially for higher service payments) than other users). As another example, ambient services (as similarly described herein) can be provided for the hotspot for verified service processors.

In some embodiments, the service processor 115 and service controller 122 are capable of assigning multiple service profiles associated with multiple service plans that the user chooses individually or in combination as a package. For example, a device 100 starts with ambient services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased from the device 100). In some embodiments, the bill by account service can also track the transactions and, in some embodiments, advertisements for the purpose of revenue sharing, all using the service monitoring capabilities disclosed herein. After initiating services with the free ambient service discussed above, the user may later choose a post-pay monthly Internet, email and SMS service. In this case, the service controller 122 would obtain from the billing system 123 in the case of network based billing (or in some embodiments the service controller 122 billing event server 1622 in the case of device based billing) the billing plan code for the new Internet, email and SMS service. In some embodiments, this code is cross referenced in a database (e.g., the policy management server 1652) to find the appropriate service profile for the new service in combination with the initial ambient service. The new superset service profile is then applied so that the user maintains free access to the ambient services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device 100 service processor. In some embodiments, the device 100 (service processor 115) can determine the superset profile rather than the service controller 122 when more than one "stackable" service is selected by the user or otherwise applied to the device. The flexibility of the service processor 115 and service controller 122 embodiments described herein allow for a large variety of service profiles to be defined and applied individually or as a superset to achieve the desired device 100 service features.

As shown in FIG. 9, an agent communication bus 1630 represents a functional description for providing communication for the various service processor 115 agents and functions. In some embodiments, as represented in the functional diagram illustrated in FIG. 9, the architecture of the bus is generally multipoint to multipoint so that any agent can communicate with any other agent, the service controller or in some cases other components of the device, such user interface 1697 and/or modem components. As described below, the architecture can also be point to point for certain agents or communication transactions, or point to multipoint within the agent framework so that all agent communication can be concentrated, or secured, or controlled, or restricted, or logged or reported. In some embodiments, the agent communication bus is secured, signed, encrypted, hidden, partitioned and/or otherwise protected from unauthorized monitoring or usage. In some embodiments, an application interface agent (not shown) is used to literally tag or virtually tag application layer traffic so that the policy implementation agent(s) 1690 has the necessary information to implement selected traffic shaping solutions. In some embodiments, an application interface agent (not shown) is in communication with various applications, including a TCP application 1604, an IP application 1605, and a voice application 1602.

In some embodiments, device assisted services (DAS) techniques for providing an activity map for classifying or categorizing service usage activities to associate various monitored activities (e.g., by URL, by network domain, by website, by network traffic type, by application or application type, and/or any other service usage activity categorization/classification) with associated IP addresses are provided. In some embodiments, a policy control agent (not shown), service monitor agent 1696, or another agent or function (or combinations thereof) of the service processor 115 provides a DAS activity map. In some embodiments, a policy control agent, service monitor agent, or another agent or function (or combinations thereof) of the service processor provides an activity map for classifying or categorizing service usage activities to associate various monitored activities (e.g., by Uniform Resource Locator (URL), by network domain, by website, by network traffic type, by application or application type, and/or any other service usage activity classification/categorization) with associated IP addresses. In some embodiments, a policy control agent, service monitor agent, or another agent or function (or combinations thereof) of the service processor determines the associated IP addresses for monitored service usage activities using various techniques to snoop the DNS request(s) (e.g., by performing such snooping techniques on the device 100 the associated IP addresses can be determined without the need for a network request for a reverse DNS lookup). In some embodiments, a policy control agent, service monitor agent, or another agent or function (or combinations thereof) of the service processor records and reports IP addresses or includes a DNS lookup function to report IP addresses or IP addresses and associated URLs for monitored service usage activities. For example, a policy control agent, service monitor agent, or another agent or function (or combinations thereof) of the service processor can determine the associated IP addresses for monitored service usage activities using various techniques to perform a DNS lookup function (e.g., using a local DNS cache on the monitored device 100). In some embodiments, one or more of these techniques are used to dynamically build and maintain a DAS activity map that maps, for example, URLs to IP addresses, applications to IP addresses, content types to IP addresses, and/or any other categorization/classification to IP addresses as applicable. In some embodiments, the DAS activity map is used for various DAS traffic control and/or throttling techniques as described herein with respect to various embodiments. In some embodiments, the DAS activity map is used to provide the user various UI related information and notification techniques related to service usage as described herein with respect to various embodiments. In some embodiments, the DAS activity map is used to provide service usage monitoring, prediction/estimation of future service usage, service usage billing (e.g., bill by account and/or any other service usage/billing categorization techniques), DAS techniques for ambient services usage monitoring, DAS techniques for generating micro-CDRs (e.g., also referred to as service usage partition, service usage recording partition, service charging bucket, device generated CDRs, such as in the case where the device and not a network component are generating the usage records, ambient usage records, specialized service usage records, or other terms to indicate a service usage data record generated to provide a more refined or detailed breakdown of service usage for the device), and/or any of the various other DAS related techniques as described herein with respect to various embodiments.

Figure 16:
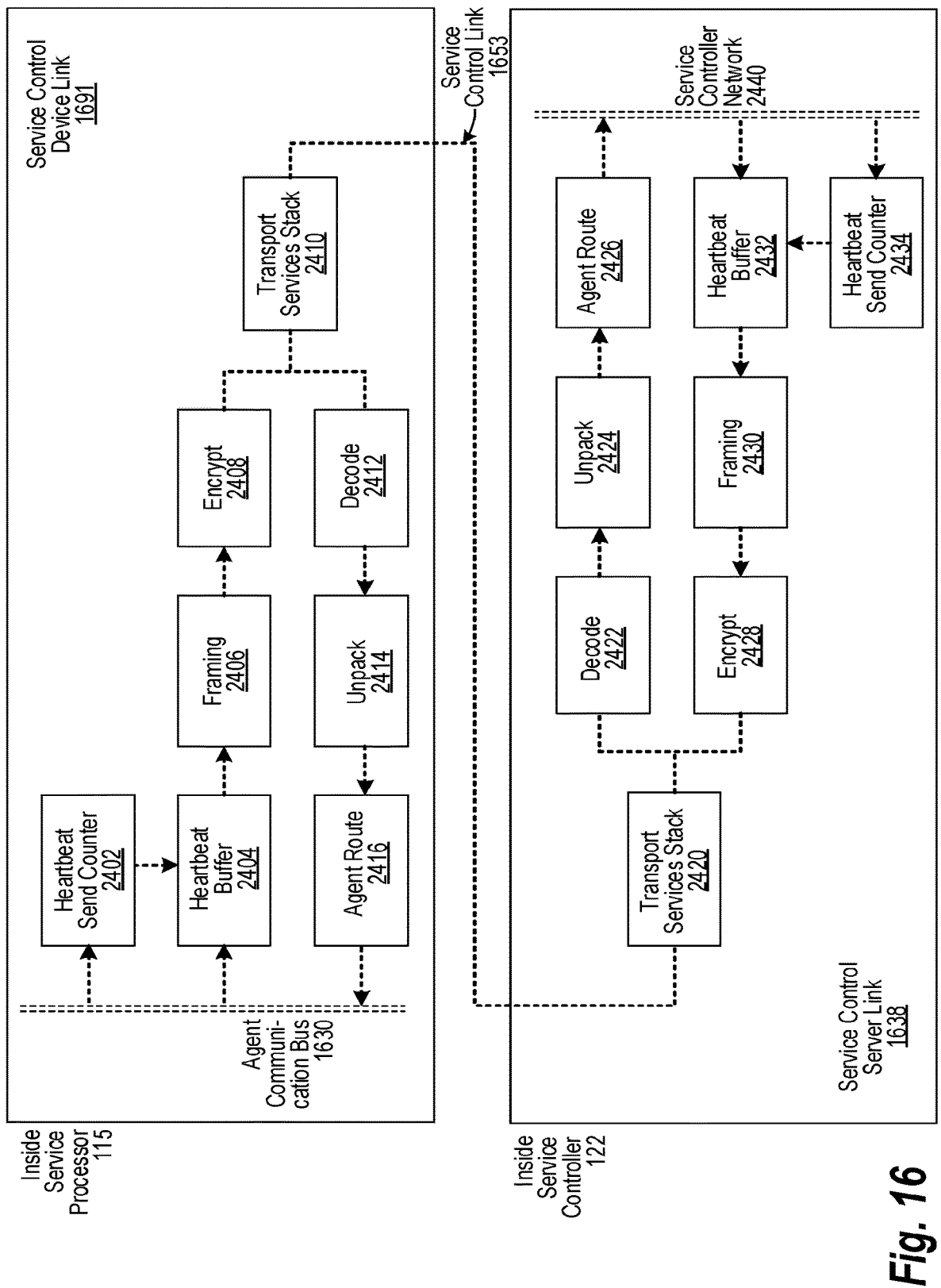
FIG. 16 is a functional diagram illustrating the service control device link of the service processor and the service control service link of the service controller in accordance with some embodiments.

In some embodiments, all or a portion of the service processor 115 functions disclosed herein are implemented in software. In some embodiments, all or a portion of the service processor 115 functions are implemented in hardware. In some embodiments, all or substantially all of the service processor 115 functionality (as discussed herein) is implemented and stored in software that can be performed on (e.g., executed by) various components in device 100. In some embodiments, it is advantageous to store or implement certain portions or all of service processor 115 in protected or secure memory so that other undesired programs (and/or unauthorized users) have difficulty accessing the functions or software in service processor 115. In some embodiments, service processor 115, at least in part, is implemented in and/or stored on secure non-volatile memory (e.g., non volatile memory can be secure non-volatile memory) that is not accessible without pass keys and/or other security mechanisms. In some embodiments, the ability to load at least a portion of service processor 115 software into protected non-volatile memory also requires a secure key and/or signature and/or requires that the service processor 115 software components being loaded into non-volatile memory are also securely encrypted and appropriately signed by an authority that is trusted by a secure software downloader function, such as service downloader 1663 as shown in FIG. 16. In some embodiments, a secure software download embodiment also uses a secure non-volatile memory. Those of ordinary skill in the art will also appreciate that all memory can be on-chip, off-chip, on-board and/or off-board.

FIG. 10 provides a table summarizing various service processor 115 functional elements in accordance with some embodiments. Many of these agents are similarly described above, and the table shown in FIG. 10 is not intended to be an exhaustive summary of these agents, nor an exhaustive description of all functions that the agents perform or are described herein, but rather FIG. 10 is provided as a summary aid in understanding the basic functions of each agent in accordance with some embodiments and how the agents interact with one another, with the service controller server elements, and/or with other network functions in certain embodiments to form a reliable device based service delivery solution and/or platform.

FIG. 11 provides a table summarizing various service controller 122 functional elements in accordance with some embodiments. Many of these agents/elements are similarly described above, and the table shown in FIG. 11 is not intended to be an exhaustive summary of these server elements, nor an exhaustive description of all functions that the elements perform or are described herein, but rather FIG. 11 is provided as a summary aid in understanding the basic functions of each element in accordance with some embodiments and how the elements interact with one another, certain network elements, and/or the service processor agents in certain embodiments to form a reliable device based service delivery solution and/or platform.

Figure 12:
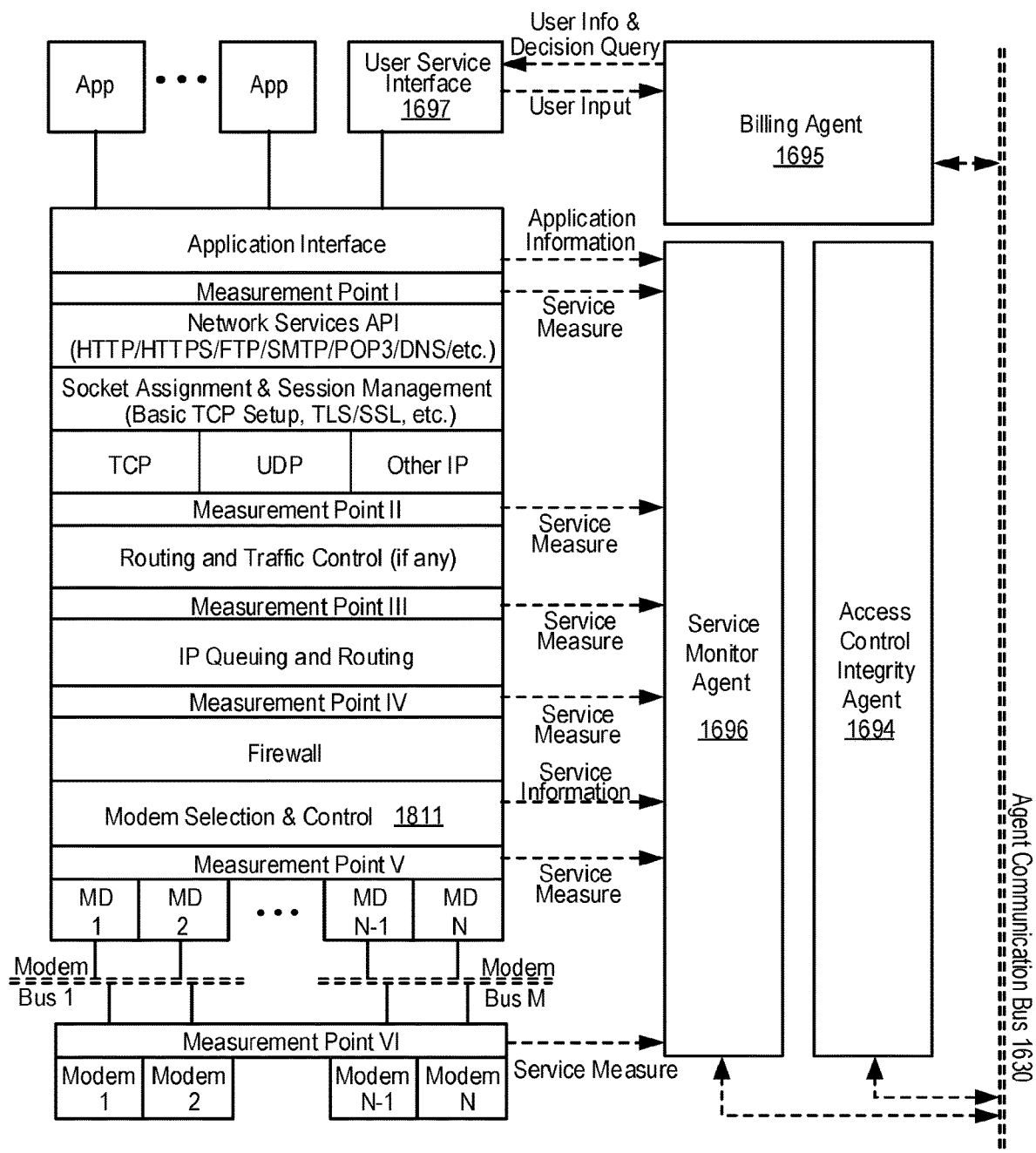
FIG. 12 illustrates a device stack providing various service usage measurement from various points in the networking stack for a service monitor agent, a billing agent, and an access control integrity agent to assist in verifying the service usage measures and billing reports in accordance with some embodiments.

FIG. 12 illustrates a device stack providing various service usage measurement from various points in the networking stack for a service monitor agent, a billing agent, and an access control integrity agent to assist in verifying the service usage measures and billing reports in accordance with some embodiments. As shown in FIG. 12, several service agents take part in data path operations to achieve various data path improvements, and, for example, several other service agents can manage the policy settings for the data path service, implement billing for the data path service, manage one or more modem selection and settings for access network connection, interface with the user and/or provide service policy implementation verification. Additionally, in some embodiments, several agents perform functions to assist in verifying that the service control or monitoring policies intended to be in place are properly implemented, the service control or monitoring policies are being properly adhered to, that the service processor or one or more service agents are operating properly, to prevent unintended errors in policy implementation or control, and/or to prevent tampering with the service policies or control. As shown, the service measurement points labeled I through VI represent various service measurement points for service monitor agent 1696 and/or other agents to perform various service monitoring activities. Each of these measurement points can have a useful purpose in various embodiments described herein. For example, each of the traffic measurement points that is employed in a given design can be used by a monitoring agent to track application layer traffic through the communication stack to assist policy implementation functions, such as the policy implementation agent 1690, or in some embodiments the modem firewall agent 1655 or the application interface agent, in making a determination regarding the traffic parameters or type once the traffic is farther down in the communication stack where it is sometimes difficult or impossible to make a complete determination of traffic parameters. The particular locations for the measurement points provided in these figures are intended as instructional examples, and other measurement points can be used for different embodiments, as will be apparent to one of ordinary skill in the art in view of the embodiments described herein. Generally, in some embodiments, one or more measurement points within the device can be used to assist in service control verification and/or device or service troubleshooting.

In some embodiments, the service monitor agent and/or other agents implement virtual traffic tagging by tracking or tracing packet flows through the various communication stack formatting, processing and encryption steps, and providing the virtual tag information to the various agents that monitor, control, shape, throttle or otherwise observe, manipulate or modify the traffic. This tagging approach is referred to herein as virtual tagging, because there is not a literal data flow, traffic flow or packet tag that is attached to flows or packets, and the book-keeping to tag the packet is done through tracking or tracing the flow or packet through the stack instead. In some embodiments, the application interface and/or other agents identify a traffic flow, associate it with a service usage activity and cause a literal tag to be attached to the traffic or packets associated with the activity. This tagging approach is referred to herein as literal tagging. There are various advantages with both the virtual tagging and the literal tagging approaches. For example, it can be preferable in some embodiments to reduce the inter-agent communication required to track or trace a packet through the stack processing by assigning a literal tag so that each flow or packet has its own activity association embedded in the data. As another example, it can be preferable in some embodiments to re-use portions of standard communication stack software or components, enhancing the verifiable traffic control or service control capabilities of the standard stack by inserting additional processing steps associated with the various service agents and monitoring points rather than re-writing the entire stack to correctly process literal tagging information, and in such cases, a virtual tagging scheme may be desired. As yet another example, some standard communication stacks provide for unused, unspecified or otherwise available bit fields in a packet frame or flow, and these unused, unspecified or otherwise available bit fields can be used to literally tag traffic without the need to re-write all of the standard communication stack software, with only the portions of the stack that are added to enhance the verifiable traffic control or service control capabilities of the standard stack needing to decode and use the literal tagging information encapsulated in the available bit fields. In the case of literal tagging, in some embodiments, the tags are removed prior to passing the packets or flows to the network or to the applications utilizing the stack. In some embodiments, the manner in which the virtual or literal tagging is implemented can be developed into a communication standard specification so that various device or service product developers can independently develop the communication stack and/or service processor hardware and/or software in a manner that is compatible with the service controller specifications and the products of other device or service product developers.

It will be appreciated that although the implementation/use of any or all of the measurement points illustrated in FIG. 12 is not required to have an effective implementation, such as was similarly shown with respect to various embodiments described herein, various embodiments can benefit from these and/or similar measurement points. It will also be appreciated that the exact measurement points can be moved to different locations in the traffic processing stack, just as the various embodiments described herein can have the agents affecting policy implementation moved to different points in the traffic processing stack while still maintaining effective operation. In some embodiments, one or more measurement points are provided deeper in the modem stack where, for example, it is more difficult to circumvent and can be more difficult to access for tampering purposes if the modem is designed with the proper software and/or hardware security to protect the integrity of the modem stack and measurement point(s).

Referring to FIG. 12, describing the device communications stack from the bottom to the top of the stack as shown, the device communications stack provides a communication layer for each of the modems of the device at the bottom of the device communications stack. Example measurement point VI resides within or just above the modem driver layer. For example, the modem driver performs modem bus communications, data protocol translations, modem control and configuration to interface the networking stack traffic to the modem. As shown, measurement point VI is common to all modem drivers and modems, and it is advantageous for certain embodiments to differentiate the traffic or service activity taking place through one modem from that of one or more of the other modems. In some embodiments, measurement point VI, or another measurement point, is located over, within or below one or more of the individual modem drivers. The respective modem buses for each modem reside between example measurement points V and VI. In the next higher layer, a modem selection & control layer for multimode device based communication is provided. In some embodiments, this layer is controlled by a network decision policy that selects the most desirable network modem for some or all of the data traffic, and when the most desirable network is not available the policy reverts to the next most desirable network until a connection is established provided that one of the networks is available. In some embodiments, certain network traffic, such as verification, control, redundant or secure traffic, is routed to one of the networks even when some or all of the data traffic is routed to another network. This dual routing capability provides for a variety of enhanced security, enhanced reliability or enhanced manageability devices, services or applications. In the next higher layer, a modem firewall is provided. For example, the modem firewall provides for traditional firewall functions, but unlike traditional firewalls, in order to rely on the firewall for verifiable service usage control, such as access control and security protection from unwanted networking traffic or applications, the various service verification techniques and agents described herein are added to the firewall function to verify compliance with service policy and prevent tampering of the service controls. In some embodiments, the modem firewall is implemented farther up the stack, possibly in combination with other layers as indicated in other Figures. In some embodiments, a dedicated firewall function or layer is provided that is independent of the other processing layers, such as the policy implementation layer, the packet forwarding layer and/or the application layer. In some embodiments, the modem firewall is implemented farther down the stack, such as within the modem drivers, below the modem drivers, or in the modem itself. Example measurement point IV resides between the modem firewall layer and an IP queuing and routing layer. As shown, an IP queuing and routing layer is separate from the policy implementation layer where the policy implementation agent implements a portion of the traffic control and/or service usage control policies. As described herein, in some embodiments, these functions are separated so that a standard network stack function can be used for IP queuing and routing, and the modifications necessary to implement the policy implementation agent functions can be provided in a new layer inserted into the standard stack. In some embodiments, the IP queuing and routing layer is combined with the traffic or service usage control layer. For example, a combined routing and policy implementation layer embodiment can also be used with the other embodiments, such as shown in FIG. 12. Measurement point III resides between the IP queuing and routing layer and a policy implementation agent layer. Measurement point II resides between the policy implementation agent layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POPS, DNS) resides above the session layer. Measurement point I resides between the network services API layer and an application layer, shown as application service interface agent in the device communications stack of FIG. 12.

As shown in FIG. 12, the application service interface layer is above the standard networking stack API and, in some embodiments, its function is to monitor and in some cases intercept and process the traffic between the applications and the standard networking stack API. In some embodiments, the application service interface layer identifies application traffic flows before the application traffic flows are more difficult or practically impossible to identify farther down in the stack. In some embodiments, the application service interface layer in this way assists application layer tagging in both the virtual and literal tagging cases. In the case of upstream traffic, the application layer tagging is straight forward, because the traffic originates at the application layer. In some downstream embodiments, where the traffic or service activity classification relies on traffic attributes that are readily obtainable, such as source address or URL, application socket address, IP destination address, time of day or any other readily obtained parameter, the traffic type can be identified and tagged for processing by the firewall agent or another agent as it initially arrives. In other embodiments, as described herein, in the downstream case, the solution is generally more sophisticated when a traffic parameter that is needed to classify the manner in which the traffic flow is to be controlled or throttled is not readily available at the lower levels of the stack, such as association with an aspect of an application, type of content, something contained within TLS, IPSEC or other secure format, or other information associated with the traffic. Accordingly, in some embodiments the networking stack identifies the traffic flow before it is fully characterized, categorized or associated with a service activity, and then passes the traffic through to the application interface layer where the final classification is completed. In such embodiments, the application interface layer then communicates the traffic flow ID with the proper classification so that after an initial short traffic burst or time period the policy implementation agents can properly control the traffic. In some embodiments, there is also a policy for tagging and setting service control policies for traffic that cannot be fully identified with all sources of tagging including application layer tagging.

As shown in FIG. 12, a service monitor agent, which is also in communication with the agent communication bus 1630, communicates with various layers of the device communications stack. For example, the service monitor agent, performs monitoring at each of measurement points I through VI, receiving information including application information, service usage and other service related information, and assignment information. An access control integrity agent is in communication with the service monitor agent via the agent communications bus 1630, as also shown.

Figure 13:
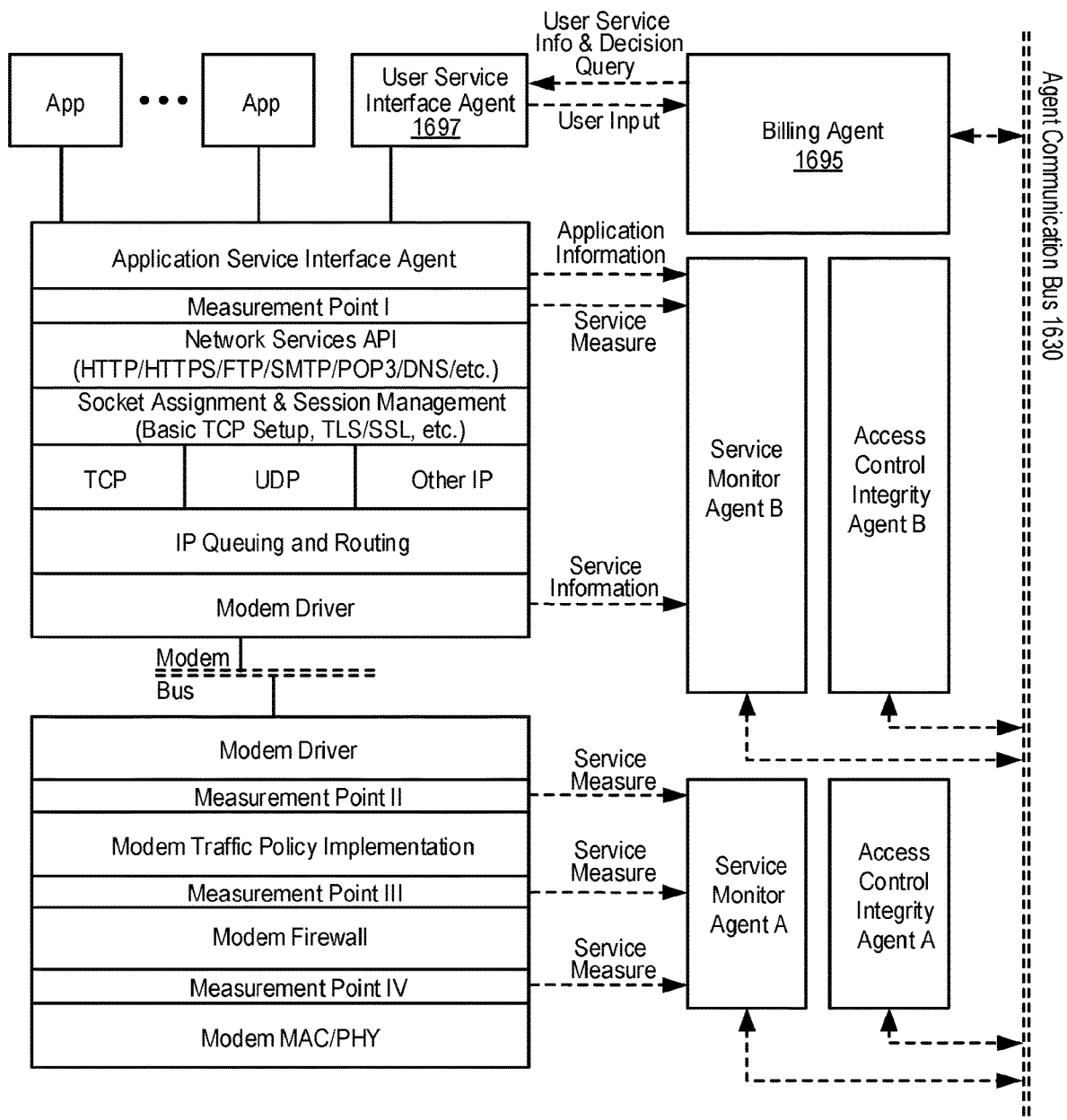
FIG. 13 illustrates an embodiment similar to FIG. 12 in which some of the service processor is implemented on the modem and some of the service processor is implemented on the device application processor in accordance with some embodiments.

FIG. 13 illustrates an embodiment similar to FIG. 12 in which some of the service processor is implemented on the modem and some of the service processor is implemented on the device application processor in accordance with some embodiments. In some embodiments, a portion of the service processor is implemented on the modem (e.g., on modem module hardware or modem chipset) and a portion of the service processor is implemented on the device application processor subsystem. It will be apparent to one of ordinary skill in the art that variations of the embodiment depicted in FIG. 13 are possible where more or less of the service processor functionality is moved onto the modem subsystem or onto the device application processor subsystem. For example, such embodiments similar to that depicted in FIG. 13 can be motivated by the advantages of including some or all of the service processor network communication stack processing and/or some or all of the other service agent functions on the modem subsystem (e.g., and such an approach can be applied to one or more modems). For example, the service processor can be distributed as a standard feature set contained in a modem chipset hardware of software package or modem module hardware or software package, and such a configuration can provide for easier adoption or development by device OEMs, a higher level of differentiation for the chipset or modem module manufacturer, higher levels of performance or service usage control implementation integrity or security, specification or interoperability standardization, and/or other benefits.

Referring to FIG. 13, describing the device communications stack from the bottom to the top of the stack as shown, the device communications stack provides a communication layer for modem MAC/PHY layer at the bottom of the device communications stack. Measurement point IV resides above the modem MAC/PHY layer. The modem firewall layer resides between measurement points IV and III. In the next higher layer, the policy implementation agent is provided, in which the policy implementation agent is implemented on the modem (e.g., on modem hardware). Measurement point II resides between the policy implementation agent and the modem driver layer, which is then shown below a modem bus layer. The next higher layer is shown as the IP queuing and routing layer, followed by the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 13.

FIGS. 14A through 14E illustrate various embodiments of intermediate networking devices that include a service processor for the purpose of verifiable service usage measurement, reporting, and billing reports in accordance with some embodiments. For example, FIGS. 14A through 14E illustrate various extended modem alternatives for access network connection through an intermediate modem or networking device combination that has a connection (e.g., LAN connection) to one or more devices 100.

Figure 14A:
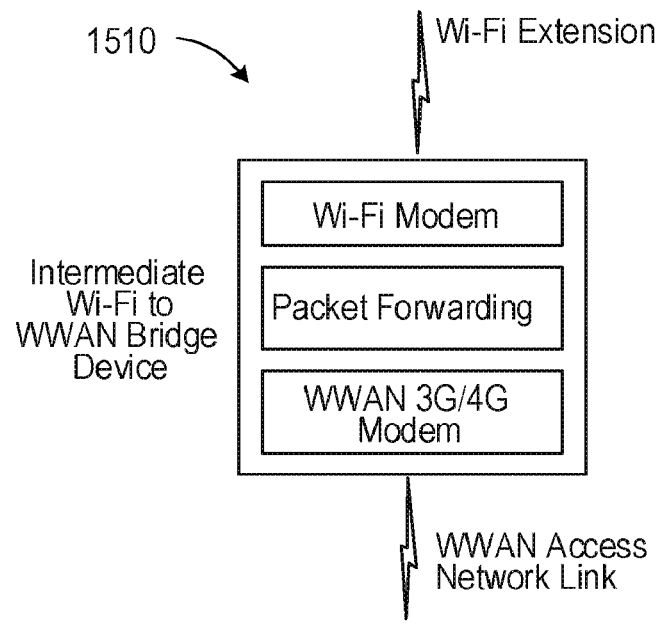
FIGS. 14A through 14E illustrate various embodiments of intermediate networking devices that include a service processor for the purpose of verifiable service usage measurement, reporting, and billing reports in accordance with some embodiments.

In some embodiments, device 100 includes a 3G and/or 4G network access connection in combination with the Wi-Fi LAN connection to the device 100. For example, the intermediate device or networking device combination can be a device that simply translates the Wi-Fi data to the WWAN access network without implementing any portion of the service processor 115 as shown in FIG. 14A. In some embodiments, an intermediate device or networking device combination includes a more sophisticated implementation including a networking stack and some embodiments a processor, as is the case for example if the intermediate networking device or networking device combination includes a router function, in which case the service processor 115 can be implemented in part or entirely on the intermediate modem or networking device combination. The intermediate modem or networking device combination can also be a multi-user device in which more than one user is gaining access to the 3G or 4G access network via the Wi-Fi LAN connection. In the case of such a multi-user network, the access network connection can include several managed service links using multiple instantiations of service processor 115, each instantiation, for example, being implemented in whole or in part on device 100 with the intermediate modem or networking device combination only providing the translation services from the Wi-Fi LAN to the WWAN access network.

Figure 14B:
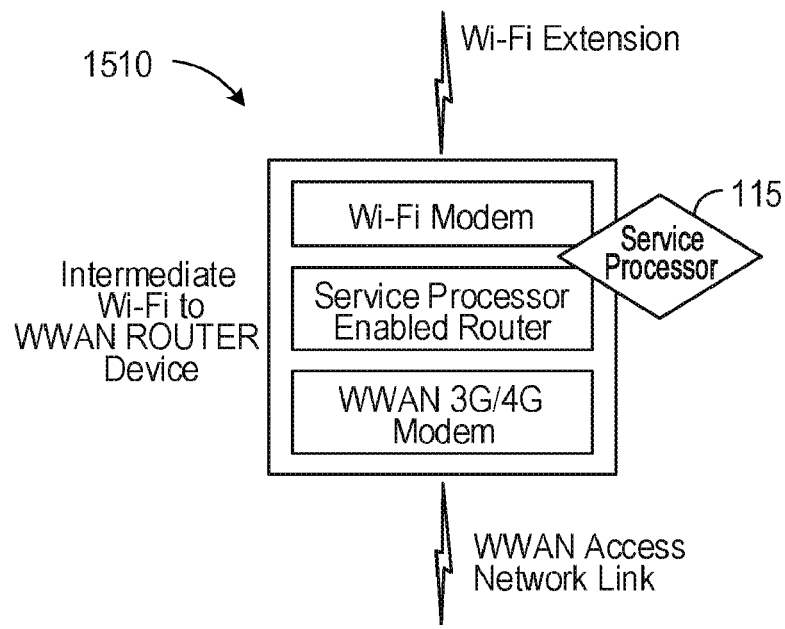
Figure 14C:
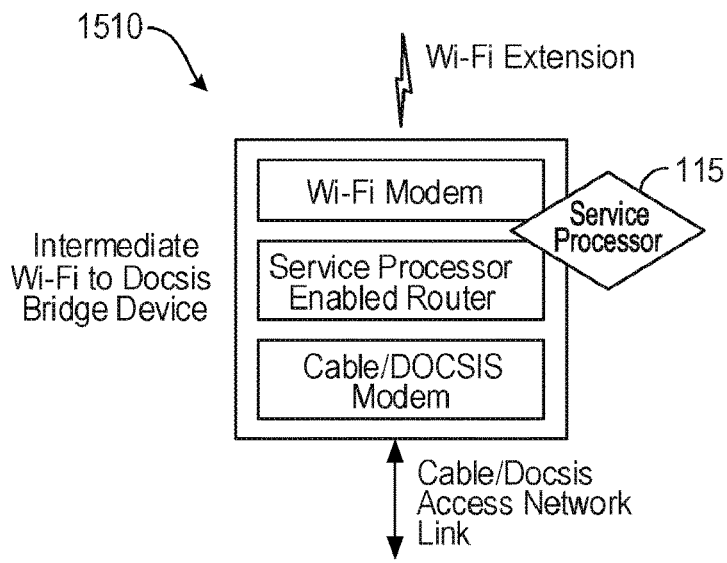
Figure 14D:
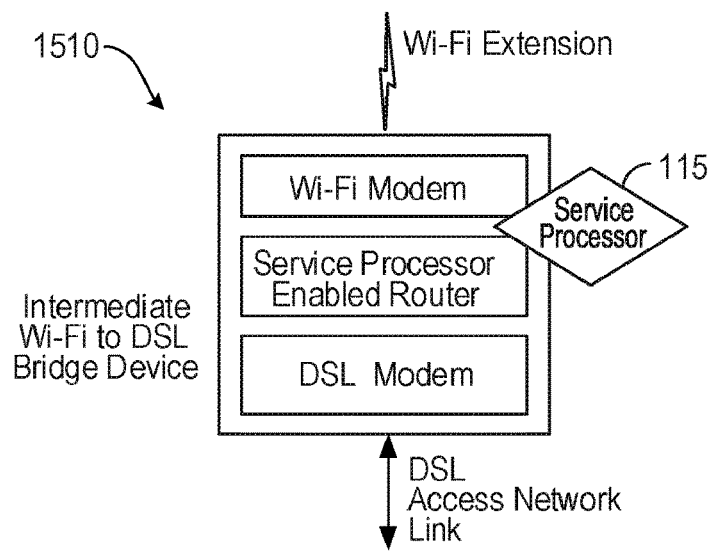

Referring now to FIGS. 14B through 14D, in some embodiments, the service processors 115 are implemented in part or in whole on the intermediate modem or networking device combination. In the case where the service processor 115 is implemented in part or in whole on the intermediate modem or networking device combination, the service processor 115 can be implemented for each device or each user in the network so that there are multiple managed service provider accounts all gaining access through the same intermediate modem or networking device combination. In some embodiments, the functions of service processor 115 are implemented on an aggregate account that includes the WWAN access network traffic for all of the users or devices connected to the Wi-Fi LAN serviced by the intermediate modem or networking device combination. In some embodiments, the central provider can also provide an aggregated account service plan, such as a family plan, a corporate user group plan and/or an instant hotspot plan. In the case where there is one account for the intermediate modem or networking device combination, the intermediate modem or networking device combination can implement a local division of services to one or more devices 100 or users in which the services are controlled or managed by the intermediate modem or networking device combination or the device 100, but the management is not subject to service provider control and is auxiliary to the service management or service policy implementation performed by service processors 115. In some embodiments, another service model can also be supported in which there is an aggregate service provider plan associated with one intermediate modem or networking device combination, or a group of intermediate modems or networking device combinations but where each user or device still has its own service plan that is a sub-plan under the aggregate plan so that each user or device has independent service policy implementation with a unique instantiation of service processor 115 rather than aggregate service policy implementation across multiple users in the group with a single instantiation of service processor 115.

Figure 14E:
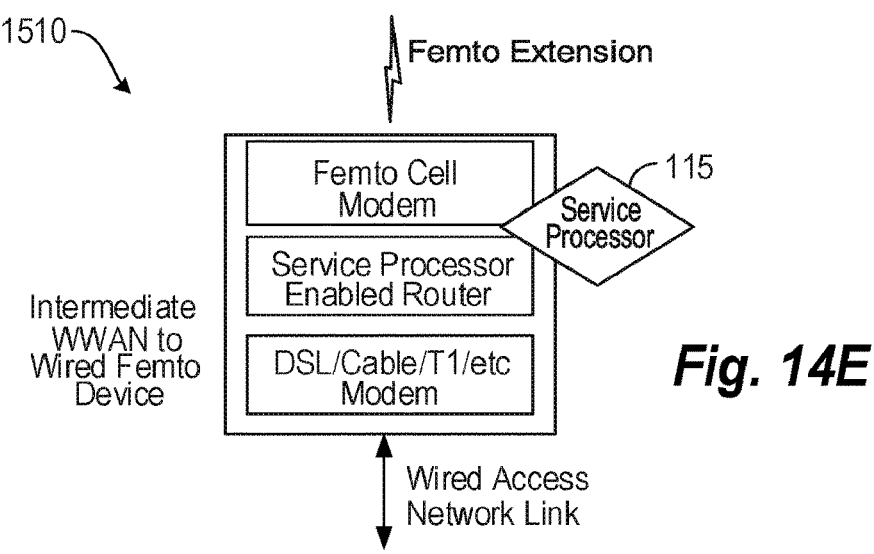

As shown in FIG. 14B, in some embodiments, device 100 includes a Wi-Fi modem, a Wi-Fi modem combined with a 3G and/or 4G WWAN modem on intermediate modem or networking device combination 1510, and the intermediate modem or networking device combination forwards WWAN access network traffic to and from device 100 via the Wi-Fi link. For example, the service processor 115 can be implemented in its entirety on device 100 and the service provider account can be associated exclusively with one device. Similarly, as shown in FIG. 14C, such an implementation can be provided using a different access modem and access network, such as a 2G and/or 3G WWAN, DSL wire line, cable DOC SIS wire line or fiber wire line configuration in place of the 3G and/or 4G access network connection to the intermediate modem or networking device combination 1510. In addition, various other embodiments similarly use DSL as shown in FIG. 14D, USB, Ethernet, Bluetooth, or another LAN or point to point connection from device 100 to the intermediate modem or networking device combination 1510, or a femto cell modem and DSL/cable/T1/other combination as shown in FIG. 14E.

Figure 15:
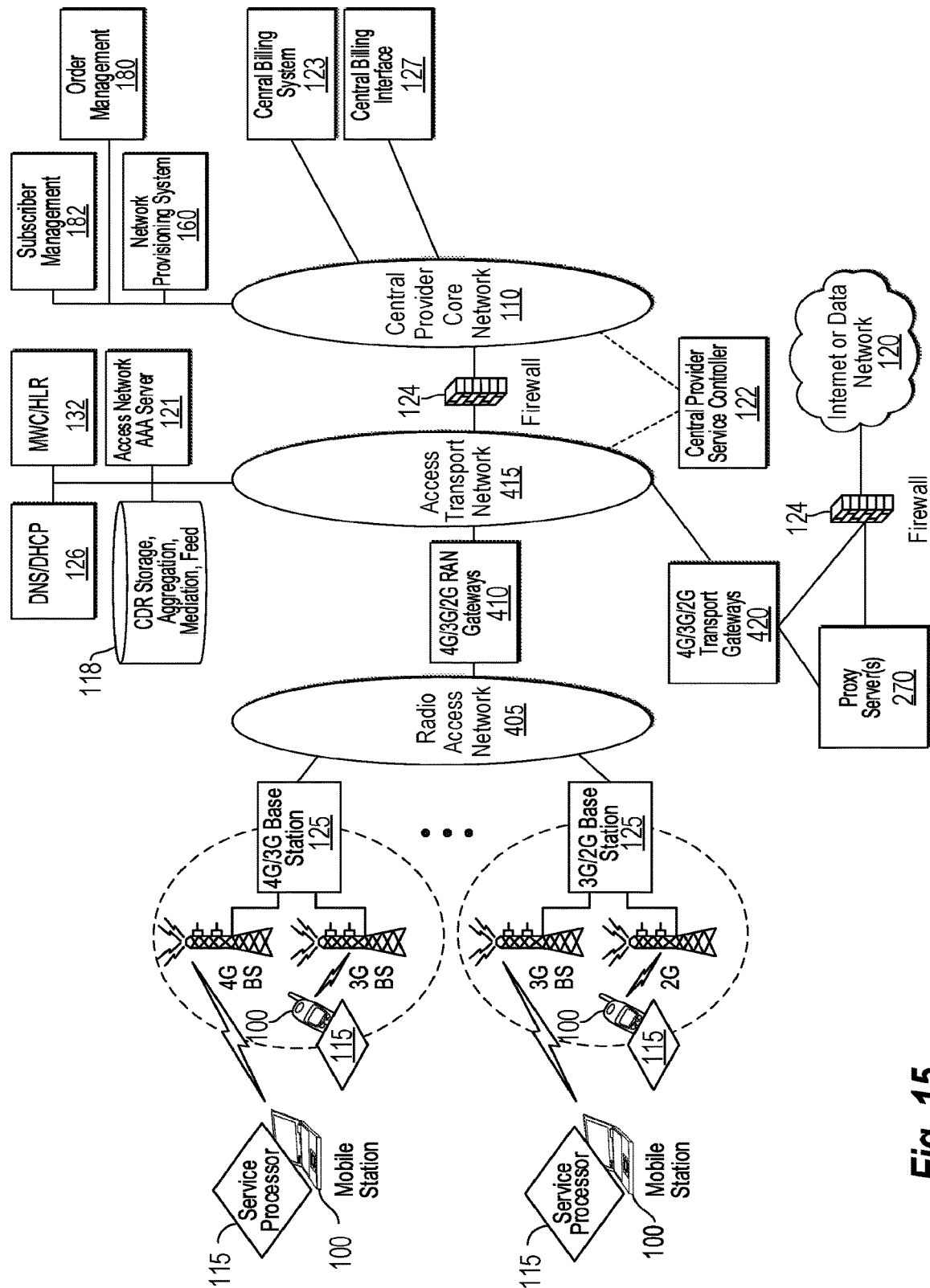
FIG. 15 illustrates a wireless network architecture for providing device assisted CDR creation, aggregation, mediation and billing including a proxy server in accordance with some embodiments.

FIG. 15 illustrates a wireless network architecture for providing device assisted CDR creation, aggregation, mediation and billing including a proxy server(s) 270 in accordance with some embodiments. As shown, FIG. 2 includes a proxy server(s) 270 in communication with a 4G/3G/2G wireless network operated by, for example, a central provider. For example, the proxy server(s) 270 can be used to implement and/or assist in providing various techniques described herein, such as service usage measurement and/or other techniques as described herein.

In some embodiments, it may not be possible to accurately identify every network service access attempt or service usage (e.g., or traffic access) as belonging to a given service usage partition (e.g., a given ambient service usage, background network chatter usage, user service plan usage, emergency service usage, and/or other type of service usage). As used herein, the terms service usage partition, service usage recording partition, service charging bucket, and micro-CDRs are used interchangeably. Accordingly, it is desirable to provide a service charging bucket for traffic that is allowed and not definitively identified as belonging to a known service charging bucket. This allows for techniques to employ an "allow but verify" approach to traffic that is likely to be legitimately associated with an ambient service or a user service or a network service that is intended to be allowed, but is not definitively identified as being associated with an allowed service.

As an example, there may be a web site access associated with an ambient service that does not have a reference identifier or other traffic parameter that allows the service processor to associate it with the correct ambient service. In this case, a set of rules can be applied to determine if it is likely that the web site access is a legitimate access given the access control policies that are in place, and if it is the access can be allowed and the traffic usage either recorded in the ambient service charging bucket that it is suspected to be associated with, or the traffic usage can be charged to a network chatter service usage bucket, or the traffic usage can be charged to the user service usage bucket, or the traffic usage may be recorded in a "not classified but allowed" service charging bucket. In some embodiments, in which such traffic is charged to the "not classified but allowed" service usage charging bucket, additional verification measures are employed to ensure that the amount of traffic that is not classified but allowed does not grow too large or become a back-door for service usage errors. For example, the access control policy rules for allowing unclassified traffic can be relatively loose as long as the amount of service usage charges accumulating in the not classified charging bucket remains within certain bounds, and/or the rate of service usage charged to the not classified bucket remains within certain bounds, but if the not classified traffic becomes large or the rate of not classified traffic growth becomes large then the rules governing when to allow not classified traffic can be tightened.

As another example, a browser application can access a web site that is known to be an ambient service website, and that web site might serve back a series of traffic flows, some of which are associated with the ambient service website through URL identifiers that are known to be part of the website, and other traffic can be associated with the ambient service website by virtue of a referring website tag or header, and some traffic can be returned to the same application with a relatively close time proximity to the other traffic as being identified as ambient traffic. In this example, as long as the not classified traffic service charging bucket does not exceed a given pre-set policy limit on its size, and/or does not grow faster than a given pre-set policy rate, and/or is received within a certain pre-set policy period of time difference from the time that other ambient service charging bucket traffic is received, then the not classified traffic is continued to be allowed. However, if the not classified traffic amount or rate of growth exceeds the pre-set policy limits, or if the period of time between when verified ambient service traffic is received and the not classified traffic is received exceeds policy limits, then the not classified traffic can be blocked or other action can be taken to further analyze the not classified traffic.

In some embodiments, it is important to provide a hierarchy of service usage charging rules for the various service usage partitions on a device. As an example, for a given service plan there can be two ambient service charging buckets, a network chatter (e.g., or network overhead) service charging bucket, and a user service plan service charging bucket and it is desirable to make sure that no ambient services or network overhead service or unclassified service is charged to the user service plan, and it is also desirable to ensure that all known ambient service traffic is charged to the appropriate ambient service partner, and it is desirable to ensure that no network overhead service or unclassified service is charged to ambient service partners. In such situations, a service charging bucket hierarchy can be provided as follows: determine if a traffic flow (e.g., or socket) is associated with network overhead, and if so allow it and charge that service bucket, then determine if a traffic flow (or socket) is associated with ambient service #1, and if so allow it and charge that service bucket, then determine if a traffic flow (or socket) is associated with ambient service #2, and if so allow it and charge that service bucket, then determine if a traffic flow (or socket) is associated with not classified traffic, and if so allow it and charge that service bucket, then if the traffic is not associated with any of the above service charging buckets allow it and charge it to the user service plan charging bucket. In another example, if the user has not yet chosen to pay for a user service plan, then the same hierarchical access control and service charging policy can be used except the final step would be: then if the traffic is not associated with any of the above service charging buckets block the traffic. Hierarchical service charging bucket identification such as depicted in these examples can be a crucial aspect of a robust access control policy and/or service charging policy system. Many other access control policy hierarchies and service charging bucket policy hierarchies will now be apparent to one of ordinary skill in the art.

In some embodiments, the not classified traffic is charged according to service charging rules that rely on the most likely candidate service charging bucket for the traffic. As another example, if the not classified traffic is being delivered to the same application as other known ambient service traffic and the time difference between delivery of the known ambient service traffic and the not classified traffic is small, then the not classified traffic can be charged to the ambient service in accordance with a pre-set charging policy rule specifying these conditions. Other embodiments that will now be apparent to one of ordinary skill in the art. For example, another charging rule for not classified traffic could be to perform a pro-rata allocation of the not classified traffic to all of the other service charging buckets with the pro-rata allocation being based on the percentage of the total traffic used by the device for each service charging bucket. As another example, the not classified traffic can be charged to a subset of the service charging buckets for the device (e.g., all ambient services plus the network overhead service) in accordance with the pro-rata share for each service included in the pro-rata split.

In some embodiments, the user service plan agreement is structured so that the user acknowledges that ambient services in which the access connection to the service is sponsored, paid for, and/or partially subsidized by an entity other than the user are a benefit to the user, and/or the user acknowledges that there is no inherent right to free ambient services, and that the service usage accounting system may not always properly characterize usage for a sponsored or subsidized ambient service (e.g., or some other specialized service) in the correct accounting service charging bucket, and, thus, the user service plan account can be charged and/or billed with some of this traffic. By having the user acknowledge a service use agreement of this form then some ambient traffic can be charged to the user service plan account, including, for example, allowed but not classified traffic, excess ambient service usage beyond pre-set policy limits, ambient service usage during busy network periods or on congested network resources, and/or other criteria/measures. In some embodiments, the user might be notified that they are being charged for service activities that are sometimes subsidized or free to the user. As discussed above, it is important to ensure that a not classified service charging bucket does not become a back door for service charging errors or hacking. It will now be apparent to one of ordinary skill in the art that the not classified service usage charges can be verified in a variety of manners, including, for example, observing the size of the not classified service charging bucket as compared to other service usage charges on the device (e.g., total device service usage, ambient service usage, user bucket service usage, and/or other criteria/measures), capping the not classified bucket, and/or capping the rate of growth of the not classified bucket.

In some embodiments, it is important to verify not only that the total device service usage amount is correct, but that the service usage is being reported in the proper service charging buckets. For example, if the service processor software can be hacked so that it correctly reports the total service usage, but reports user service plan traffic under one or more ambient service buckets, then simply verifying that the total amount of service usage is correct will not be sufficient to prevent the device from obtaining free user service that can be charged to ambient service partners. There are a variety of direct and indirect embodiments to accomplish this verification of service charging bucket divisions. For example, in direct verification embodiments, one or more alternative measures of service usage are employed to cross-check the accuracy of the service charging bucket divisions. In indirect embodiments one of two classes of verification are employed: the size and rate of growth for service charging buckets is analyzed and compared to a pre-set group of policies to detect and/or modify service charging bucket growth that is out of policy; and/or the proper operation of the service processor elements involved in service charging bucket partitioning is verified.

Various embodiments involving direct verification of service charging bucket usage and/or accounting include the use of network based service usage measures such as CDRs, IPDRs, flow data records (e.g., FDRs—detailed reports of service usage for each service flow, such as network socket connection, opened and used to transmit data to or from the device), accounting records, interim accounting records or other similar usage records to verify that the device is within service policy and/or the device based service usage reports are accurate. Use of such network generated service usage records to directly verify service charging and/or proper service usage policy adherence are described herein. When network address destination and/or source information is available in these records, as described herein, this can be used in some embodiments to verify the service charging bucket accounting provided by the device service processor. In some embodiments, some types of service usage records include real-time data but not necessarily all of the useful information needed to help verify service charging bucket accounting, while other types of service usage records provide more detail (e.g., IP address for destination and source) but do not always arrive in real-time. For example, in some embodiments, FDRs are created each time a new service flow (e.g., network socket connection) is opened and then closed. At the time the service flow is closed, a (e.g., possibly time stamped) data usage record indicating source address, destination address and amount of data transmitted is created and sent to a charging aggregation function in the network. The charging aggregation function can then forward the FDRs to the service controller for verification or direct accounting of service charging bucket accounting. By comparing the FDR addresses with known ambient service traffic address associations, the partitioning of service charging buckets between one or more ambient services and other services such as a user service plan service charging bucket may be verified. However, in some cases it can be a long period of time for an FDR to be generated when a device service flow (e.g., socket) remains open for a long period of time, as in the case for example with a long file download, a peer to peer connection with a socket keep alive, or a proxy server service with a socket keep alive. In such cases, it can be disadvantageous to have large amounts of data to be transferred without an FDR to confirm device service processor based reports, and in some cases this can provide an opportunity for service processor service reporting hacks. This can be remedied in a variety of ways by using other network reported service usage information to augment the FDR information. For example, start and stop accounting records can sometimes be obtained in some embodiments from a network element such as a service gateway or the AAA servers (e.g., or other network equipment elements depending on the network architecture). Although start and stop records do not possess the detail of service usage information that FDRs, CDRs, IPDRs, interim accounting records or other service usage records posses, they do inform the service controller that a device is either connected to the network or has stopped connecting. If a device is connected to the network and is not transmitting device usage reports or heartbeats, then the service controller is alerted that an error or hacking condition is likely. As another example of how two or more types of network reported service usage information may be used to create a better real time or near real-time check on device service usage, if both FDRs and start/stop accounting records are available, the service controller can send a stop-then-resume service command to the device (e.g., or alternatively send a stop then resume service command to a network equipment element), which will cause the device to terminate all open service flows before re-initiating them, and once the service flows are stopped then the FDR flow records will be completed and transmitted for any service flows that were in process but unreported when the stop service command was issued. This will cause any long term open socket file transfers to be reported in the FDR flow records thus plugging the potential back door hole in the FDR service usage accounting verification method.

As another example showing how multiple types of network generated service usage accounting records may be used to complement each other and strengthen the verification of service charging bucket accounting partitions, interim data records can be used with FDRs. Interim data records are available in accordance with some embodiments, n which the interim data records are generated on a regularly scheduled basis by a network element (e.g., gateway, base station, HLR, AAA, and/or other network element/function). Interim data records are typically near real time records that report the aggregate traffic usage for the device as of a point in time, but often do not include traffic address information or other traffic details. In embodiments in which both interim accounting records and FDRs are available, when the interim accounting records are indicating service usage that is not being reported in the FDR stream this is evidence that a device has one or more long term socket connections that are open and are not terminating. In this case, the service controller can verify that the device based usage reports are properly accounting for the total amount of service usage reported by the interim accounting records, and/or the service controller can force an FDR report for the open sockets by issuing a stop-resume service command as similarly discussed above.

As described herein, other embodiments involving direct verification of service charging bucket accounting can be provided. One example is to route ambient service traffic to a proxy server or router programmed to support only the network access allowed for the ambient service and to account for the ambient service usage. Additional proxy servers or routers can be similarly programmed for each ambient service that is part of the device service plan, and in some embodiments, another proxy server or router is programmed to support traffic control and account for the user service plan service access. By comparing the service usage accounting for each of these proxy servers or routers, the device generated service charging bucket accounting can be directly verified. In some embodiments, the usage accounting provided by the proxy servers or routers is used directly for service usage accounting.

In some embodiments, ambient service partner feedback is used to verify service charging bucket accounting. For example, web servers used by ambient service partners to provide ambient services can identify a user device based on header information embedded in the HTML traffic, and then account for either the service used by the device during the ambient service sessions or account for the number of transactions the user completes. If service usage is recorded, then it can be reported to the service controller and be used directly to verify ambient service charging bucket accounting. If transactions are all that are recorded, then this can be reported to the service controller and the amount of ambient service used by the device can be compared with the number of transactions completed to determine if the ambient service usage is reasonable or should be throttled or blocked. It will now be apparent to one of ordinary skill in the art that other embodiments can be provided that employ more than one type of network generated service usage records to verify service usage accounting and/or verify service charging bucket accounting.

Other embodiments involving indirect methods for verifying or controlling service charging bucket accounting include monitoring the size and/or growth rate of ambient service usage. In some embodiments, the access control policy rules call for restricting a given ambient service access when the amount of service usage charges accumulating in the ambient service charging bucket exceed a pre-set policy limit, and/or when the rate of service usage for the ambient service exceeds a pre-set policy limit. For example, once these limits are reached, the ambient service can be throttled back for a period of time, blocked for a period of time, or charged to the user service plan charging bucket. In some embodiments, before these actions are taken the user UI can be used to notify the user of the service policy enforcement action. In some embodiments, indirect verification of service charging bucket accounting includes the various techniques described herein for verifying proper operation of the service processor agent software and/or protecting the service processor agent software from errors, manipulation, or hacking.

In some embodiments, the device service processor directs traffic destined for a given ambient service to a proxy server or router programmed to support that ambient service, and any traffic control policies and/or access control policies for the ambient service are implemented in the proxy server or router. For example, in such embodiments the proxy server or router can be programmed to only allow access to one or more ambient services that are authorized by the device service plan, with the proxy server or router controlling device access so that other network destinations cannot be reached. Continuing this example embodiment, the proxy server or router can account for the ambient service usage in an ambient service charging bucket as discussed elsewhere. In such proxy server or router ambient service control embodiments, the same traffic association techniques described elsewhere that allow incoming traffic associated with an ambient service website or other service to be identified, allowed or blocked, potentially throttled, and accounted for in a service charging bucket can be implemented in the proxy server or router programming. Such proxy server or router embodiments can also implement user service plan service charging buckets, user service plan traffic controls, and user service plan access control as discussed herein. In some embodiments, the proxy server or router analyzes the HTML traffic content of the traffic flows as described herein to perform such associations, traffic control and/or service usage accounting. Similarly, in some embodiments, a proxy server or router can provide the "surf-out" capabilities described herein by performing the same surf-out traffic associations (e.g., HTML branch reference associations and/or other branch associations) described herein. It will now be apparent to one of ordinary skill in the art that many of the adaptive ambient service control and service usage charging functions described herein for a service processor can be readily implemented with a proxy server or router that is appropriately programmed.

In some embodiments, routing of device traffic for one or more ambient services and/or user service plan services to a proxy server or router is accomplished by the device service processor using the device service processor traffic control embodiments described herein. In some embodiments, routing of device traffic for one or more ambient services and/or user service plan services to a proxy server or router is accomplished by dedicated network equipment such as the gateways (e.g. SGSN, GGSN, PDSN, or PDN), home agents, HLRs or base stations, with the network equipment being provisioned by a service controller (e.g., or other interchangeable network element with similar functions for this purpose) to direct the device traffic to the proxy server or router. In some embodiments, the ambient service traffic or the user service plan traffic is controlled by the proxy server according to a service plan policy set supplied by the service controller (e.g., or equivalent network function for this purpose). The traffic control service policy thus implemented by the proxy server can control traffic based on one or more of the following: period of time, network address, service type, content type, application type, QoS class, time of day, network busy state, bandwidth, and data usage.

In some embodiments, a proxy server or router is used to verify accounting for a given service, for example, an ambient service. In some embodiments, this is accomplished by the device service processor directing the desired service flows to a proxy server or router programmed to handle the desired service flows, with the proxy server or router being programmed to only allow access to valid network destinations allowed by the access control policies for the desired service, and the proxy server or router also being programmed to account for the traffic usage for the desired services. In some embodiments, the proxy service usage accounting may then be used to verify device based service usage accounting reported by the service processor. In some embodiments, the accounting thus reported by the proxy server or router can be used directly to account for service usage, such as ambient service usage or user service plan service usage.

In some embodiments, in which a proxy server is used for device service usage accounting, the proxy server maintains a link to the device service notification UI via a secure communication link, such as the heartbeat device link described herein. For example, the proxy server or router can keep track of device service usage versus service plan usage caps/limits and notify the user device UI through the device communication link (e.g., heartbeat link) between the service controller and the device. In some embodiments, the proxy server/router communicates with a device UI in a variety of ways, such as follows: UI connection through a device link (e.g., heartbeat link), through a device link connected to a service controller (e.g., or other network element with similar function for this purpose), presenting a proxy web page to the device, providing a pop-up page to the device, and/or installing a special portal mini-browser on the device that communicates with the proxy server/router. In some embodiments, the UI connection to the proxy server/router is used as a user notification channel to communicate usage notification information, service plan choices, or any of the multiple services UI embodiments described herein.

In some embodiments for the proxy server/router techniques for implementing service traffic/access controls and/or service charting bucket accounting, it is desirable to have the same information that is available to the service processor on the device, including, for example, application associated with the traffic, network busy state, QoS level, or other information about the service activity that is available at the device. For example, such information can be used to help determine traffic control rules and/or special services credit is due (e.g., ambient services credit). In some embodiments, information available on the device can be communicated to the proxy server/router and associated with traffic flows or service usage activities in a variety of ways. For example, side information can be transmitted to the proxy server/router that associates a traffic flow or service activity flow with information available on the device but not readily available in the traffic flow or service activity flow itself. In some embodiments, such side information may be communicated over a dedicated control channel (e.g., the device control link or heartbeat link), or in a standard network connection that in some embodiments can be secure (e.g., TLS/SSL, or a secure tunnel). In some embodiments, the side information available on the device can be communicated to the proxy server/router via embedded information in data (e.g., header and/or stuffing special fields in the communications packets). In some embodiments, the side information available on the device can be communicated to the proxy server/router by associating a given secure link or tunnel with the side information. In some embodiments, the side information is collected in a device agent or device API agent that monitors traffic flows, collects the side information for those traffic flows, and transmits the information associated with a given flow to a proxy server/router. It will now be apparent to one of ordinary skill in the art that other techniques can be used to communicate side information available on the device to a proxy server/router.

For example, just as the hierarchy of charging rules can be important for implementations in which the service processor is creating the service charging bucket accounting, it can also important in implementations that use a proxy server or router for service charging bucket accounting. Accordingly, various embodiments described herein for creating a hierarchy of service usage charging rules can be applied to proxy server or proxy router embodiments. It will be apparent to one of ordinary skill in the art that the service charging bucket embodiments and traffic control and access control embodiments described herein for allowed but not classified buckets apply equally to the proxy server/router embodiments. For example, pre-defined service policy rules can be programmed into the proxy server/router to control the traffic flows and/or place usage limits or access limits on an ambient service, or a user service plan service. It will also now be apparent to one of ordinary skill in the art that the embodiments described herein disclosing an initial allowed service access list, temporarily allowing additional service activities until they are determined to be allowed or not allowed, expanding the allowed service activity list, maintaining a not allowed service activity list and expanding the not allowed service activity list also apply equally to proxy server/router embodiments. Similarly, it will now be apparent to one of ordinary skill in the art that the proxy/server router embodiments can be employed to directly generate the service charging bucket (or micro-CDR) usage reports used to provide further detail and/or billing capabilities for service usage. In some embodiments, in which the device service processor directs traffic to a proxy server/router, there are advantageous design feature embodiments available that can reduce the need to provision network to detect and force specialized device service traffic to the appropriate proxy server/router. For example, this can be done by creating a "usage credit" system for the services supported by the proxy server/outer. Total service usage is counted on the one hand by the device service processor, or by other network equipment, or by both. Credit on the other hand for ambient service or other specialized access service usage that is not charged to the user is then provided for services that the device directs through the proxy server/router destination (e.g., URL or route hop) supporting the particular ambient service or other specialized access service. If the device correctly directs traffic to the proxy server/router, then the counting and/or access rules are correctly implemented by the proxy server/router. The service can be thus controlled and/or accounted for. When the service is accounted for, the proxy server/router reports the service charging bucket accounting back to the service controller (e.g., or other network equipment responsible for service charging bucket/micro CDR mediation) and the user service plan service charging bucket account can be credited for the services. Traffic that reaches the proxy server/router is controlled by the access rules and/or traffic control rules and/or QoS control rules of the proxy server/router programming, so there is no question regarding the type of service that is supported with the service charging buckets that are reported to mediation functions (e.g., mediation functions can be performed by one or more of service controller, usage mediation, billing, AAA, and/or HLR/home agent). As the proxy server/router is in the network and can be physically secured and protected from hacking, there is high confidence that the service control and/or charging rules intended for ambient services or some other specialized service are properly implemented and that the proxy server/router connection is being used for the intended service and not some other unintended hacked service. If the device is somehow hacked or otherwise in error so that the traffic is not directed through the appropriate proxy server/router, then the proxy server/router does not log the traffic in micro CDRs/buckets and no specialized service usage credit is sent to the mediation functions, so there is no usage credit deducted from the device user service plan service usage totals. Thus, the user pays for the services when the device is hacked to avoid the proxy server/router. The user account service agreement can specify that if the user tampers with software and traffic is not routed to servers then credit will not be provided and user plan will be charged.

In some proxy server/router embodiments, the usage credit is sometimes recorded by the proxy server/router detecting which device is performing the access. Device identification can be accomplished in a variety of ways including a header/tag inserted into the traffic by the device, a route in the network specified for that device, a secure link (e.g., TLS/SSL, IP Sec, or other secure tunnel), a unique device IP address or other credential (e.g., where proxy server/router has access to an active IP address look up function), a unique proxy server/router address and/or socket for the device.

In some embodiments, the coordination of the device service controller traffic control elements with a proxy server/outer can make it simpler to locate, install, provision and operate the proxy servers. The proxy server/routers do not need to be located "in line" with the access network because it is the device's responsibility to make sure the traffic is routed to the servers/routers or else there is not credit and the user account is charged. In some embodiments, this makes it unnecessary or reduces the need to force device traffic routes in carrier network. In some embodiments, the proxy server/routers can be located in carrier network or on the Internet. If the proxy server/routers are on Internet, then traffic can be authenticated in a firewall before being passed to server/routers to enhance security to attack.

In some embodiments, the service charging bucket recording software in the proxy server/router can be programmed into an ambient service partners network equipment directly thus eliminating the need for special apparatus. The ambient service partner's equipment (e.g., a web server, load balancer or router) can recognize the device using one of the techniques described above, aggregate the device service charging bucket accounting, and periodically send the usage accounting to the service controller or other network service usage mediation function.

Programming and/or provisioning the types of ambient services, user service plan services and/or specialized services disclosed in various embodiments described herein can be a complex process. In some embodiments, a simplified user programming interface, also referred to herein as a service design interface, is used to program the necessary policy settings for such services is desirable. For example, a service design interface is provided that organizes and/or categorizes the various policy settings that are required to set up an ambient service (e.g., or other service) including one or more of the following: a policy list of service activities that are allowed under the ambient service (e.g., or other service), access control policies, rules for implementing and/or adapting an allowed list of network destinations, rules for implementing and/or adapting a blocked list of network destinations, service charging bucket policies, user notification policies, service control, and/or service charging bucket verification policies, actions to be taken upon verification errors. In some embodiments, the required information for one or more of these policy sets is formatted into a UI that organizes and simplifies the programming of the policies. In some embodiments, the UI is partly graphical to help the user understand the information and what settings need to be defined in order to define the service. In some embodiments, the UI is created with an XML, interface. In some embodiments, the UI is offered via a secure web connection. In some embodiments, a basic service policy for an ambient service (e.g., or another service) is created that includes one or more of the above service policy settings, and then this service policy set becomes a list or an object that can be replicated and used in multiple service plan policy set definitions (e.g., "dragged and dropped" in a graphical UI). In some embodiments, the resulting set of policies created in this service design interface are then distributed to the necessary policy control elements in the network and/or on the device that act in coordination to implement the service policy set for a given device group. For example, if a service processor is used in conjunction with a service controller, then the service design interface can load the service policy settings subsets that need to be programmed on the service controller and the device service processor into the service controller, and the service controller loads the service controller policy settings subset into the service controller components that control the policies and loads the device policy settings subset to the devices that belong to that device group. In embodiments in which a proxy server/router is used to help control and account for services, in some embodiments, the service design interface loads the service policy settings subsets that need to be programmed on the proxy server/router into the proxy server/router. In embodiments where other network equipment (e.g., gateways, base stations, service usage recording/aggregation/feed equipment, AAA, home agent/HLR, mediation system, and/or billing system) need to be provisioned or programmed, in some embodiments, the service design interface also loads the appropriate device group policy subsets to each of the equipment elements. Accordingly, various techniques can be used as described herein to greatly simplify the complex task of translating a service policy set or service plan into all the myriad equipment and/or device settings, programming, and/or provisioning commands required to correctly implement the service. It will now be apparent to one of ordinary skill in the art that several of these techniques can similarly be used for the VSP service design interface.

Those of ordinary skill in the art will appreciate that various other rules can be provided for the rules engine as described herein. Those of ordinary skill in the art will also appreciate that the functions described herein can be implemented using various other network architectures and network implementations (e.g., using various other networking protocols and corresponding network equipment and techniques).

In device-assisted service (DAS) systems, end-user device agents can assist the network in policy implementation or enforcement. For example, device agents can assist the network in recordkeeping to allocate costs when end-user devices access data services over an access network, enforcing access control or service limit policies for the device, enforcing usage limits, or assisting in notification policies for information regarding network access services that are in communication with the device end user. If a device is configured with a device agent configured to assist the network in policy implementation or enforcement, there may be a device portion of a network policy that is enforced on the device and a network portion of an access network service policy that is enforced by network elements in the network. In some access networks, network-based systems are employed to implement the network portion of the access network service policy, such as, for example, to manage the authentication process of allowing a device onto a network or to determine one or more network policies that should be enforced by the network elements such as access control policy, service usage limits, service usage accounting or billing policy, or service usage notification policy.

To achieve an overall network service policy, the network portion of the access network service policy may be configured to work in conjunction with the device-based portion of the access network service policy to achieve an overall combined network service policy. If the device agents required to implement the device portion of the access network service policy are not present on the device or are not properly configured, then the overall combined network service policy can be in error or may not be possible to achieve, potentially resulting in an undesired network service policy implementation. In such cases, it is desirable for a network system to be employed to detect this condition and modify the network portion of an access network service policy enforced by the network-based elements so that a desired network service policy enforcement may be achieved.

In some embodiments, a device agent that can assist the network in policy implementation or enforcement may be termed a "device policy implementation agent," which in some embodiments may be part of the service processor.

Examples of when it may be advantageous to adapt the network portion of an access network service policy in order to account for a missing or improperly configured service processor include but are not limited to: (i) a device credential has been moved to a device that does not have a service processor, (ii) a device credential has been moved to a device with a service processor with a different configuration than the service processor originally associated with the device credential, (iii) a device service processor has been tampered with or has an improper configuration.

In some embodiments, the service processor is used to assist in classifying service usage into sub-categories for the purpose of usage accounting policy enforcement, access control policy enforcement, service usage limits, or notification policy enforcement that differs according to the category. In some embodiments, the classification can be for one or more device applications. In some embodiments the classification can be for one or more network destinations. In some embodiments the classification can be for one or more network types. In some embodiments a classification of service usage (herein referred to as a sponsored service or an ambient service) can be performed to facilitate allocating access network costs, in whole or in part, associated with the sponsored or ambient service to a service sponsor, the service sponsor being an entity other than the device user.

What is needed is a network system that detects the presence and proper configuration of a service processor, or lack thereof, in the end-user device, wherein the service processor, if present, enforces a device portion of an access network service policy on a device configured with a device credential, and, if the service processor is present and properly configured, that causes a first network portion of an access network service policy to be enforced in the network, the first network portion of an access network service policy being configured to provide counterpart policy enforcement to a device portion of an access network service policy to achieve a first desired overall access network service policy; and if the service processor is not present and properly configured, that causes a second network portion of an access network service policy to be enforced in the network that is configured to operate without a device counterpart policy to achieve a second desired overall access network service policy.

In some embodiments, a network system is used to detect when unscrupulous users attempt to acquire free data services by tampering with a service processor in order to use one service and have the service usage accounting allocated to a second service that is sponsored. For example, if a device sends reports of its data usage to the network, a user might attempt to hack the device so that its reports contain information that is more favorable to the user than it should be, e.g., by reporting less data usage than the device actually used. As another example, a device may contain a "sponsored SIM" card or another credential that allows the device to use a fixed amount of data, possibly associated with a particular service, at a reduced charge or at no charge to the user. Unscrupulous users may attempt to find ways to increase their quantity of free or subsidized data usage with sponsored SIM cards.

Bandwidth limitations in the wireless access network are making unlimited data plans less attractive to service providers. At the same time, users of end-user devices want to have more control over their devices' data usage to control costs. The ability to track a device's data usage with high accuracy, on a more granular level than simply by measuring aggregate data usage, is an important enabler new service offerings that meet both of these needs. For example, accurate tracking of a device's data usage on a service-by-service or application-by-application basis, or on even finer levels, will allow service providers to offer a la carte service plans that allow users to choose customized application- or service-specific data plans.

Therefore, there is a need for security measures to prevent policy errors caused by changing device credentials, improper configuration of a service processor, or fraud in DAS systems. In particular, there is a need for tools that allow the network to detect fraudulent end-user device activity.

Disclosed herein are various embodiments to prevent, detect, or take action in response to moving a device credential from one device to another, improper configuration of a service processor, a missing service processor, or tampering with a service processor in device-assisted services (DAS) systems.

In some embodiments, the service controller in the network authenticates the service processor and checks that it is reporting the end-user device's usage in the expected manner, e.g., at expected times, including expected information, with expected indicia of authenticity, etc.

In some embodiments, when the end-user device reports usage, the service controller checks whether the reports sent by the service processor are consistent with reports from a trusted source, such as a network element.

In some embodiments, when the service controller detects fraudulent or potentially fraudulent activities, the service controller notifies a network administrator or network resource, which can then further evaluate the situation and decide how to respond. In some embodiments, the subscriber's billing rate is increased.

In some embodiments, a device client configured to implement a device portion of a network access service policy (e.g., an access control policy or traffic control policy, a device software or operating environment security policy, a service usage limit, a service accounting or charging policy, a service notification policy, or another policy) may be termed a "device policy implementation client," which in some embodiments may be part of the service processor. Also without loss of generality, the term "service controller" may be used to refer to a service processor authentication and management system. Both the service processor and service controller may have functions in addition to those described herein.

In some embodiments, a device is configured with a properly configured service processor responsible for implementing or enforcing a device portion of a first access network service policy. In some embodiments, the device is configured without a properly configured service processor. In some embodiments, a service controller can be configured to determine whether the service processor is present on the device and, if so, whether it is properly configured.

In some embodiments, if the service controller determines that the device is configured with a properly configured service processor, the service controller causes a network based access network service policy enforcement system to implement or enforce a first network-based portion of the first access network service policy. In this case, because the service controller has verified that a properly configured service processor is present on the device, the service controller system operates under the premise that the device is properly implementing or enforcing the device portion of the first access network service policy. If, however, the service controller determines that a properly configured device service processor is not present on the device, the service controller causes a network-based access network service policy enforcement system to implement or enforce a second network based portion of the first access network service policy. In this case, the service controller system operates under the premise that the device is not properly implementing or enforcing a device portion of an access network service policy.

In some embodiments, an end-user device is configured with: (1) a wireless modem to connect to a wireless access network (or another network access modem to connect to another type of access network); (2) one or more device credential sources (e.g., a SIM card, a soft-SIM, a universal SIM, an IMSI source, a wireless modem, a phone number source, an IMEI source, an MEID source, a user password or PIN, a MAC address source, an IP address source, a secure device identifier source, a device secure communication encryption key source, etc.) that store a device credential and provide the device credential to one or more network service policy enforcement elements (e.g., AAA, HLR, PCRF, access network authentication system, admission system or log-in system) for the purpose of seeking or gaining admission to the wireless access network (or other access network); and (3) a service processor (e.g., a device client) configured to implement or enforce a device-based portion of a wireless access network service policy and communicate with a network-based service controller in order to provide service processor authentication information configured to allow verification that the service processor is present and properly configured on the device.

In some embodiments, a network-based system is configured with: (1) one or more network-based device authentication or admission elements (e.g., AAA, HLR, PCRF, access network authentication system, admission system, log-in system, etc.) configured to receive a device credential from an end-user device that is attempting to receive or is receiving access network services; (2) one or more service policy enforcement elements (e.g., a network gateway, router, GGSN, SGSN, proxy, charging element, notification trigger element, etc.) configured to implement an access network service policy that is associated with the device credential; (3) a service processor authentication and management system (e.g., a service controller) configured to receive service processor authentication information and use the information to verify that the service processor is present and properly configured on the device. In some embodiments, the service processor authentication and management system is further configured to: (a) in the event that the service processor is present and properly configured on the device, cause the access network service policy that is associated with the device credential to be executed as a first network portion of an access network service; or (b) in the event that the service processor is not present on the device and properly configured, cause the access network service policy that is associated with the device credential to be executed as a second network portion of an access network service.

Without loss of generality, in the following related embodiments the terms, "SIM card" and "SIM" are used to represent a device credential source. As would be appreciated by one of ordinary skill in the art, other device credential sources (e.g., a soft-SIM, a universal SIM, an IMSI source, a wireless modem, a phone number source, an IMEI source, an MEID source, a MAC address source, an IP address source, a secure device identifier source, a device secure communication encryption key source, etc.) can be interchanged with SIM card in many of the embodiments. For example, in embodiments in which a SIM card is moved from one device to another, another type of device credential could be moved instead (e.g., soft SIM, universal SIM, an IMSI source, a wireless modem, a phone number source, an IMEI source, an MEID source, a MAC address source, an IP address source, a secure device identifier source, a device secure communication encryption key source, etc.). As another example, when a user tampers with a service processor associated with a SIM, the user could be tampering with a service processor associated with another type of device credential (e.g., soft SIM, universal SIM, an IMSI source, a wireless modem, a phone number source, an IMEI source, an MEID source, a MAC address source, an IP address source, a secure device identifier source, a device secure communication encryption key source, etc.). There are many other example embodiments where the term "SIM" can be exchanged for another source of device credentials, with the embodiments being too numerous to list and yet evident to one of ordinary skill in the art in the context of the teachings herein.

In some embodiments, the one or more device credential sources include a SIM card. In some embodiments, the service controller can be configured to recognize which device or service processor the SIM is associated with, use the SIM and device association to look up a desired device portion of a wireless access network service policy, and communicate the policy to the appropriate device service processor. In some embodiments, the two different device portions of a wireless access network policy are determined according to a device group or user group service policy definition that includes one or more SIM credentials and/or one or more service processor credentials, and these policy definitions are entered in a virtual service provider work station that manages the service controller and/or device service processor policies.

In some embodiments, the service controller is configured to recognize when the SIM card from a first device with a first service processor has been moved to a second device with a second service processor. In some such embodiments, the service controller can be configured to recognize which device or service processor the SIM is associated with, use the SIM and device association to look up a desired network portion of a wireless access network service policy, and cause the network portion of a wireless access network service policy to be implemented or enforced in one or more network service policy enforcement elements. In some embodiments, the two different network portions of a wireless access network policy are determined according to a device group or user group service policy definition that includes one or more SIM credentials and/or one or more service processor credentials, and these policy definitions are entered in a virtual service provider work station that manages the service controller and/or network service policy enforcement element policies.

In some embodiments, the one or more device credential sources include a SIM card. In some embodiments, the service controller is configured to detect when a device user has moved the SIM card from a first device configured with a properly configured service processor to a second device that is not configured with a properly configured service processor. In some embodiments, the service controller can be configured to determine that the first device is configured with a properly configured service processor and communicate a device portion of a wireless access network service policy to the appropriate device service processor. In some embodiments, the device portion of a wireless access network policy is determined according to a device group or user group service policy definition that includes a SIM credential and/or a service processor credential, and these policy definitions are entered in a virtual service provider work station that manages the service controller and/or device service processor policies. In some embodiments, the service controller is configured to determine that the first device is configured with a properly configured service processor and cause a first network portion of a wireless access network service policy to be implemented or enforced in one or more network service policy enforcement elements. In some embodiments the service controller is configured to determine that the second device is not configured with a properly configured service processor and cause a second network portion of a wireless access network service policy to be implemented or enforced in one or more network service policy enforcement elements. In some embodiments, the device portion of a wireless access network policy is determined according to a device group or user group service policy definition that includes a SIM credential, and these policy definitions are entered in a virtual service provider work station that manages the service controller and/or network service policy enforcement element policies.

In some of these embodiments, the differences between the first network portion of a wireless access network service policy and the second network portion of a wireless access network service policy can include a difference in network access privileges, a difference in allowable network destinations, a difference in service usage accounting or billing for "bulk" access, a difference in service usage accounting or billing for a classification of access, a difference in service usage accounting rates or billing rates for "bulk" access, a difference in service usage accounting rates or billing rates for a classification of access, a difference in sponsored (ambient) service accounting or billing, a difference in service speed or quality, a difference in which networks the device or user has access to, a difference in the service usage notification that is provided to the end user, a difference in roaming service policies or permissions or accounting/billing rates, a quarantining of the device or user access capabilities, differences between (e.g., disabling or otherwise modifying) one or more features of device operation, or suspending the device from access to the network.

In some embodiments, a SIM and a service processor are associated with a classification of service usage and a corresponding device portion of access network service policy enforcement. The service controller is then responsible for properly authenticating the proper configuration of the service processor in association with the SIM in order to determine the appropriate network portion of network access service policy that should be enforced.

In some embodiments, a SIM and a service processor are associated with one or more application-specific services wherein the device network access service has policy elements that are specific to a device software or firmware application. A software or firmware application-specific service can include but is not limited to a service with specific policy elements associated with a user application program; an operating system program, library or function; a background application service such as an application update, content caching, software update or other background application service.

In some embodiments, a SIM and a service processor are associated with one or more network-destination-specific services wherein the device network access service has policy elements that are specific to a network destination or resource. A network destination or resource can include but is not limited to a server, gateway, destination address, domain, website or URL.

In some embodiments, a SIM and a service processor are associated with any combination of a device application, network destination or resource; a type of network; a roaming condition (e.g., a home or roaming network); a time period; a level of network congestion; a level of network quality-of-service (QoS); and a background or foreground communication.

In some embodiments, a SIM and a service processor are associated with one or more sponsored services (also referred to herein as ambient services), wherein a portion or all of the service usage accounting for one or more classifications of service usage are accounted to, charged to, or billed to a service sponsor rather than the device user or party who pays for the user service plan. The portion of service that is sponsored can be all of the device access or a portion or classification of the device access. In some embodiments, the classification of the sponsored portion of service (e.g., the identification of the portion of the device's use of the access network that should be allocated to the service sponsor) is accomplished on the device with a service processor. In some embodiments, the classification of the sponsored portion of service is accomplished in the network using DPI elements, gateway elements, server elements, proxy elements, website elements or web service elements. In some embodiments, the classification of the sponsored portion of service is accomplished with a classification policy implemented by a combination of a service processor on the device (e.g., steering a classification of service to a given network element via a re-direction, re-route, or tunnel [e.g. secure SSL, VPN, APN or other tunnel protocol]) and one or more network elements (e.g., DPI elements, gateway elements, server elements, proxy elements, website elements or web service elements). In some embodiments, the portion of service that is sponsored includes service for one device application or a group of device applications. In some embodiments, the portion of service that is sponsored includes service for a network destination or resource, a server or website, or a group of network destinations, servers or websites. In some embodiments, the portion of service that is sponsored includes service on a specific type of network. In some embodiments, the portion of service that is sponsored includes service on a home network or a roaming network. In some embodiments, the portion of service that is sponsored includes service during a time period. In some embodiments, the portion of service that is sponsored includes service for a certain range of network congestion. In some embodiments, the portion of service that is sponsored can include service for a certain range of network QoS. In some embodiments, the portion of service that is sponsored includes service for a network background or foreground data communication. In some embodiments, the portion of service that is sponsored includes any combination of device application, network destination or resource, a type of network, a roaming condition (e.g., home or roaming network), a time period, a level of network congestion, a level of network QoS, and a background or foreground communication.

In some embodiments, a SIM (or other source of user credential or device credential, as explained previously) is installed in or present in association with a device configured with a device service processor configuration that provides access network policy enforcement. In such embodiments, one or more network elements can implement or enforce a network-based portion of access network policy enforcement, and the device service processor can be configured to implement or enforce a device-based portion of access network policy enforcement. In some embodiments, one or more SIM credentials can be used at least in part to identify the network-based portion of access network policy. In some embodiments, one or more SIM credentials can be used at least in part to identify the device-based portion of access network policy.

In some embodiments that include a SIM module policy association, the policy enforcement includes one or more of access control policy enforcement, service usage limit, access accounting policy enforcement, and access service user notification policy enforcement. In some embodiments, the access control policy enforcement includes one or more of allowing, limiting, blocking, deferring, delaying or traffic shaping device network access for "bulk" access (e.g., "not classified" access), or one or more specific classifications of access network service activities. In some embodiments, the access accounting policy enforcement includes one or more of counting an amount of "bulk" (e.g., "unclassified") access network service usage, or counting an amount of access network service usage for one or more specific classifications of access network service activities. In some embodiments, the access service notification policy enforcement includes one or more of notifying an end user when a pre-defined service usage condition occurs for "bulk" (e.g. "unclassified") access network service usage or notifying an end user when a pre-defined access network service usage condition occurs for one or more specific classifications of access network service activities. Examples of specific classifications of access network service activities include access by an application or OS function, access to one or more network destinations or network resources (such as a web site, domain, IP address or other address identifier, URL, socket tuple, network server, network route or APN, network gateway or proxy, network content source or sub-network). Additional examples of specific classifications of access network service activities include device access to network services with different QoS service levels. In some embodiments, a portion of the policies associated with specific classifications of access network service are implemented or enforced with a device-based service processor, and other portions of access network service policy are enforced in one or more network-based elements.

In some embodiments in which one or more network elements implement or enforce a network-based portion of access network policy enforcement and a device service processor is configured to implement or enforce a device-based portion of access network policy enforcement, one or more device SIM credentials are identified and used at least in part to determine the policies enforced by the network. In such embodiments, the device service processor can be relied upon to implement or enforce certain aspects of access network service policy that are not implemented or enforced in the network.

In some embodiments, a first portion of access network service policy is determined at least in part by one or more SIM credentials and is implemented by one or more network elements, and a second portion of access network service policy is intended to be implemented by a device-based service processor, but the SIM is installed in a device that is not configured with a service processor capable of implementing the second portion of access network service policy. In some such embodiments, a network element identifies whether the SIM is installed in a device that is configured with a service processor capable of implementing the second portion of access network service policy intended to be implemented on the device. In some embodiments, the identification is accomplished by a network system that implements one or more of the following device configuration detection and network policy selection functions: (1) Identify when a SIM whose credentials are used at least in part to identify a network-based portion of access network policy is installed in a device configured to include a service processor capable of implementing or enforcing a device-based portion of access network service policy, and provision a first network-based service policy in one or more network-based policy enforcement elements that implement or enforce access network service policy; (2) Identify when a SIM whose credentials are used at least in part to identify the network-based portion of access network policy is installed in a device that is not configured to include a service processor capable of implementing or enforcing a device-based portion of access network service policy and implement a second network-based service policy in one or more network-based policy enforcement elements that implement or enforce access network service policy.

In some embodiments, when it is determined that a SIM whose credentials are used at least in part to identify the network-based portion of access network policy is installed in a device configured to include a service processor capable of implementing or enforcing a device-based portion of access network service policy, a network-based service policy provisioning system provisions a first network-based service policy into one or more network elements (e.g., programs or sends the policy to one or more network elements) and also provisions a device-based service policy into a device service processor. In some embodiments, when it is determined that a SIM whose credentials are used at least in part to identify the network-based portion of access network policy is installed in a device that is not configured to include a service processor capable of implementing or enforcing a device-based portion of access network service policy, a network-based service policy provisioning system provisions a second network-based service policy into one or more network elements, and there is no policy provisioning for a device-based service processor.

Such embodiments are advantageous, for example, when a device-based service processor is capable of implementing or enforcing a network access service policy that has fine grain classification aspects that are not otherwise implemented or enforced in the network. For example, in some embodiments a SIM is installed in a first device configuration that includes a device-based service processor capable of classifying access network service usage associated with one or more device software applications and enforce a policy for access control, service limit, access accounting or access service notification for that classification. In this case a first set of network-based access network service policies may be provisioned into the network elements that implement or enforce access network service policy. If the same SIM is installed in a second device configuration that does not include the described service processor capability, a second set of network-based access network service policies may be provisioned into the network elements that implement or enforce access network service policy. In such embodiments, the first device configuration can include a trusted access control or service limit policies in the service processor that determine the network access allowances for one or more applications, and the first network service policies are configured to facilitate this device-based application access control or service limitation. In contrast, the second device configuration, having no service processor, has no trusted access control or service limitation policies, and therefore the second network service policies may be configured in a manner that allows access only if the service plan or service account associated with the SIM (or second device or SIM user) includes permissions for "bulk" access, "unclassified" access, or access that is classified by the network and not by the device.

In some embodiments, the second network service policies are configured to modify the classification of network access services in accordance with capabilities that exist only in the network without the assistance of a device-assisted classification component.

In some embodiments, the second network service policies include a second access service accounting or charging rate that is different than the access service accounting or charging rate of the first network service policies. For example, the method of service accounting or service charging to the end user in the case where the SIM is installed in a device configuration that includes a service processor capability (e.g., the device is capable of performing service classification, accounting, control or notification functions) can be different than the method of service accounting or service charging to the end user in the case where the SIM is installed in a device configuration that does not include the service processor capability. For example, if the SIM is installed in a device configuration that includes a service processor capability, a given application (e.g., social networking application, email application, search application, voice application, news application, etc.) might have a first service accounting or charging policy defining a first charging measure (e.g., time-based usage for an application, website, content type, service type QoS class; or e.g., megabyte-based usage for an application, website, content type, service type QoS class, etc.) and/or first charging rate (e.g., $X per minute; or e.g., $Y per megabyte, etc.) when the device configuration includes a service processor capability, whereas when the SIM is not installed in a device configuration that includes a service processor capability, all traffic may be rated in the same manner (e.g., time-based or megabyte-based), potentially with a higher price. In some embodiments, when the SIM is not installed in a device configuration that includes a service processor capability, the device network access permissions are altered, or the device's communications may be quarantined or blocked.

In some embodiments, when a SIM is installed in a device with a first device configuration, the service processor is configured to differentially treat one or more classifications of access network service activities based on network congestion level, time of day, QoS level or background/foreground access (e.g., background content caching or background upload of device/user analytics, background software or OS updates, background application/server communications, etc.), but the same SIM can alternatively be installed in a device without such service processor capabilities (e.g., a device with a second device configuration). In such an embodiment, one or more of the network-based portions of access control or service limitation policy, network-based portion of accounting or charging policy, or network-based portion of user notification policy can be varied depending on whether the SIM is installed in a device with the first device configuration or the second device configuration. For example, if the SIM is recognized by the network in association with the first device configuration, a lower accounting rating or service usage price can be applied to traffic that is (i) allocated to background status, (ii) is controlled based on network congestion level, (iii) is controlled based on time of day, (iv) is controlled based on a lower QoS classification allowance, etc., whereas if the SIM is recognized by the network in association with the second device configuration, a single, potentially higher accounting rating or service usage price can be applied. In some embodiments, if the SIM is recognized by the network in association with the second device configuration the device network access permissions can be altered, or the device's communications can be quarantined or blocked.

In some embodiments, when a SIM is determined by a network element to be installed in a device configuration that includes a service processor service usage charging capability, one or more network elements are configured to zero-rate the device access (i.e., the one or more network elements will not apply the service usage accounting recorded by one or more network elements to the user's bill), and user service accounting or charging is turned over to a service controller that receives service usage accounting or charging information from the service processor.

In some embodiments, when a SIM is determined by a network element to be installed in a device configuration that includes a service processor capability to route, re-direct or otherwise steer traffic for one or more service activity classifications to one or more proxy gateway/servers, one or more network elements are configured to zero-rate the device access (i.e., the one or more network elements will not apply the service usage accounting recorded by one or more network elements to the user's bill), and user service accounting or charging is turned over to one or more proxy gateway/servers configured to account or charge for device service usage.

In some embodiments, when a SIM is determined by a network element to be installed in a device configuration that includes a service processor capability to route, re-direct or otherwise steer traffic for one or more service activity classifications to one or more proxy gateway/servers, the one or more proxy gateway/servers perform additional traffic access control or service limitation policy implementation or enforcement for the one or more classifications of service usage.

In some embodiments, when a SIM is determined by a network element to be installed in a device configuration that includes a service processor capability to route, re-direct or otherwise steer traffic for one or more service activity classifications to one or more proxy gateway/servers, the one or more proxy gateway/servers perform additional service usage classification for the purpose of service usage accounting, access control, service limiting or user notification.

In some embodiments, when a SIM is determined by a network element to be installed in a device configuration that does not include a service processor capability to route, re-direct or otherwise steer traffic for one or more service activity classifications to one or more proxy gateway/servers, network elements other than the proxy gateway/servers account for service usage, potentially at a different rate than when a SIM is determined by a network element to be installed in a device configuration that includes a service processor capability to route, re-direct or otherwise steer traffic for one or more service activity classifications.

In some embodiments in which the device configuration includes a service processor capability to route, re-direct or otherwise steer traffic for one or more service activity classifications to one or more proxy gateway/servers, the device routing, re-directing, or steering is accomplished by routing, re-directing, or steering the device traffic for one or more service usage classifications to a specific network destination or resource associated with the proxy gateway/server. In some embodiments, the routing, re-directing, or steering is accomplished using a secure tunnel through the network. In some embodiments the routing, re-directing, or steering is accomplished with a VPN or APN tunnel.

In some embodiments, a network-based service charging policy system is used in conjunction with a user service agreement confirmation system, wherein the user agreement confirmation system provides confirmation that the user has agreed to access service usage terms that stipulate a first rate of access service usage accounting or charging when a SIM is detected in association with a device configuration that includes a service processor capability, and a second rate of access service usage accounting or charging when a SIM is detected in association with a device configuration that does not include a service processor capability. In some embodiments, if a user removes or tampers with a device configuration that includes a service processor capability, or if a user installs a SIM in a device that is not configured with a service processor capability, the user service usage billing conditions are changed. In some embodiments, depending on the device configuration (e.g., with or without a service processor capability), the user is billed at a different rate for "bulk" service usage, or is billed at a different rate for one or more classifications of service usage.

In some embodiments, a network-based service charging policy system is used in conjunction with a user service agreement confirmation system, wherein the user agreement confirmation system provides confirmation that the user has agreed to access service usage terms that stipulate a first set of access service privileges when a SIM is detected in association with a device configuration that includes a service processor capability, and a second set of access service privileges when a SIM is detected in association with a device configuration that does not include a service processor capability. In some embodiments, if a user removes or tampers with a device configuration that includes a service processor capability, or if a user installs a SIM in a device that is not configured with a service processor capability, the user service usage permissions are modified. In some embodiments, this modification can include altering the allowed network destinations, altering the allowed network services, altering the allowed network resources, quarantining access or blocking access.

In some embodiments the presence of a device service processor in combination with a SIM results in the service controller providing advantageous network access services to the user. Examples include but are not limited to the sponsored services discussed herein, user-paid application-based services (e.g., user-paid services where access for one or more device applications is included in a service allowance with potentially lower cost than overall internet access), user-paid destination services (e.g., user-paid services where access for one or more network destinations or resources is included in a service allowance with potentially lower cost than overall internet access), roaming services (e.g., services that aid the user when the device is connected to a roaming network, such as by informing the user that she is roaming and asking if she wishes to continue or block roaming service usage, up to date roaming service usage indication or cost indication, roaming service rate indications, allowing a user to decide which device service usage classifications he wishes to allow while roaming, etc.), or service usage notification services (e.g., providing the user with an update of how much service usage or cost has been incurred, informing the user of what service plans are available, informing the user when a service plan sign up may be advantageous to the user based on an activity or group of activities the user is attempting, or providing the user with a set of service plan sign up choices that can be selected and purchased in a device user interface (UI), etc.). In some embodiments, these user services are made possible by the capabilities of the service processor on the device in conjunction with a specific configuration of a service controller or other network elements on an access service provider network.

In some embodiments, if the SIM for a first network service provider is removed from the device and another SIM for a second network or service provider is installed, the user may not have access to the same services. In some embodiments, the service processor on the device detects that the SIM has been changed and informs the user through a device user interface (UI) notification that if the user changes SIMS or service provider networks, the user will lose certain services. In some embodiments, the services that will be lost are listed in a UI notification. In some embodiments the UI notification states that if the user wishes to regain access to certain services, the user can re-install the original SIM.

In some embodiments, one or more network elements determine whether an end-user device has an active service processor. In some embodiments, a service controller in the network authenticates the service processor.

In some embodiments, the service controller performs authentication of the service processor to ensure that it is present and properly configured to implement a device portion of an access network service policy. FIGS. 16 and 17 show a system diagram for a device service processor to service controller communication link that can aid in secure communication and service processor authentication and verification functions.

FIG. 16 is a functional diagram illustrating service control device link 1691 of service processor 115 and the service control service link 1638 of service controller 122 in accordance with some embodiments. In particular, service control device link 1691 of service processor 115 and service control service link 1638 of service controller 122 as shown in FIG. 16 provide for secure control plane communication over service control link 1653 between service processor 115 and service controller 122 in accordance with some embodiments. Various embodiments include two or three layers of encryption in the service control link, with one embodiment or layer being implemented in the encrypt functions (2408, 2428) and decode functions (2412, 2422), and another embodiment or layer implemented in the transport services stack (2410, 2420). An optional third embodiment or layer of encryption is implemented below the transport services stack, for example, with IPSEC or another IP layer encryption, VPN or tunneling scheme. For example, various known security encryption techniques can be implemented in the encrypt functions (2408, 2428), with public/private or completely private keys and/or signatures so that very strong levels of security for service processor control plane traffic can be achieved even through the basic transport services (2410, 2420) implemented with standard secure or open Internet networking protocols, such as TLS or TCP. For example, the service processor agent communications local to the device can be conducted to and from the service controller elements via service control device link 1691 connection to agent communication bus 1630. The combination of service control device link 1691 and agent communication bus 1630, which in some embodiments is also securely encrypted or signed, provides a seamless, highly secure, asynchronous control plane connection between the service processor and service controller server elements and the service controller and service controller agents that works over a wide range of access networks, such as any access network that has the capability to connect IP or TCP traffic to another TCP or IP endpoint on the access network, another private network or over the Internet. As described herein, in some embodiments, agent communication bus 1630 also provides a fourth level of encrypted or signed communication to form a secure closed system on the device for agent to agent communication, for example, making it very difficult or practically impossible for software or applications to gain access to one or more of the a service processor agents on the device in any way other than service control device link 1691. In this way, in some embodiments, agent communication bus 1630 and the service processor agents can only be accessed by one another as necessary or permitted by agent communication policies, or by the service controller or other authorized network function with proper security credentials communicating over service control device link 1691. Additionally, in some embodiments, communications between a subset of two or more agents, or between one or more agents and one or more service controller server elements are encrypted with unique keys or signatures in such a way that a fourth level of security providing private point to point, point to multipoint, or multipoint to multipoint secure communication lines is provided.

In some embodiments, all of service control device link 1691 communications are transformed into a continuous control plane connection, with a frequency based on the rate of service usage, a minimum set period between connections, and/or other methods for establishing communication frequency. In some embodiments, this heartbeat function provides a continuous verification link by which the service controller verifies that the service processor and/or device are operating properly with the correct service policies being implemented. In view of the following heartbeat function embodiments described herein, it will be apparent to one of ordinary skill in the art that different approaches for implementing the various heartbeat embodiments are possible, and it will be clear that there are many ways to achieve the essential features enabling a reliable, sometimes continuous control link and verification function for the purpose of assisting control of service usage in a verifiable manner. As shown, inside service processor 115, service control device link 1691 includes heartbeat send counter 2402 in communication with agent communication bus 1630. For example, heartbeat send counter 2402 can provide a count for triggering when a service processor 115 communication (e.g., periodic communication based on a heartbeat mechanism) should be sent to service controller 122, and heartbeat buffer 2404, also in communication with agent communication bus 1630, buffers any such information for the next service processor 115 communication, in accordance with various heartbeat based embodiments, as similarly described herein. Heartbeat buffer 2404 is in communication with framing element 2406 and encrypt element 2408 for framing and encrypting any service processor 115 communications transmitted to service controller 122 by transport services stack 2410 over service control link 1653. Similarly, as shown inside service controller 122, service control server link 1638 includes heartbeat send counter 2434 in communication with service controller network 2440, and heartbeat buffer 2432, also in communication with service controller network 2440, which buffers any such information for the next service controller 122 communication, in accordance with various heartbeat based embodiments, as similarly described herein. Heartbeat buffer 2432 is in communication with framing element 2430 and encrypt element 2428 for framing and encrypting any such service controller 122 communications transmitted to service processor 115 by transport services stack 2420 over service control link 1653.

As also shown inside service processor 115 of FIG. 16, service control device link 1691 includes decode element 2412 for decoding any received service controller 122 communications (e.g., decrypting encrypted communications), unpack element 2414 for unpacking the received service controller 122 communications (e.g., assembling packetized communications), and agent route 2416 for routing the received service controller 122 communications (e.g., commands, instructions, heartbeat related information or status reports, policy related information or configuration settings and/or updates, challenge/response queries, agent refreshes and/or new software for installation) to the appropriate agent of service processor 115. Similarly, as shown inside service controller 122, service control server link 1638 also includes decode element 2422 for decoding any received service processor 115 communications (e.g., decrypting encrypted communications), unpack element 2424 for unpacking the received service processor 115 communications (e.g., assembling packetized communications), and agent route 2426 for routing the received service processor 115 communications (e.g., responses to instructions and/or commands, heartbeat related information or status reports, policy related information or configuration settings and/or updates, challenge/response queries, agent status information, network service/cost usage and/or any other reporting related information) to the appropriate agent of service controller 122. Accordingly, as described herein with respect to various embodiments, the various secure communications between service controller 122 and service processor 115 can be performed using the embodiment as shown in FIG. 16, and those of ordinary skill in the art will also appreciate that a variety of other embodiments can be used to similarly provide the various secure communications between service controller 122 and service processor 115 (e.g., using different software and/or hardware architectures to provide secure communications, such as using additional and/or fewer elements/functions or other design choices for providing such secure communications).

In some embodiments, an efficient and effective communication framing structure between the service processor and service controller is provided, and the following embodiments (e.g., as shown and described with respect to FIG. 17) teach such a structure that packs the various service processor agent control plane communications and the various service controller element control plane connections into a format that does not consume excessive bandwidth to enable a continuous control plane connection between the device and service controller. In some embodiments, an efficient and effective communication framing structure between the service processor and service controller is provided to buffer such communication messages for some period of time before framing and transmitting, such as in a heartbeat frequency that is based on rate of service usage. In some embodiments, an efficient and effective communication framing structure between the service processor and service controller is provided to allow for the frame to be easily packed, encrypted, decoded, unpacked and the messages distributed. In view of the various embodiments described herein, it will be apparent to one of ordinary skill in the art that many framing structures will work for the intended purpose of organizing or framing agent communications and the uniqueness and importance of combining such a system element with the device service controller functions, the service processor functions, the service control verification functions and/or the other purposes.

FIG. 17 is a functional diagram illustrating a framing structure of service processor communication frame 2502 and service controller communication frame 2522 in accordance with some embodiments. In particular, service control device link 1691 of service processor 115 and service control service link 1638 of service controller 122 (e.g., as shown in FIG. 16) provide for secure control plane communication over service control link 1653 between service processor 115 and service controller 122 using communication frames in the format of service processor communication frame 2502 and service controller communication frame 2522 as shown in FIG. 17 in accordance with some embodiments. As shown, service processor communication frame 2502 includes service processor framing sequence number 2504, time stamp 2506, agent first function ID 2508, agent first function message length 2510, agent first function message 2512, and, assuming more than one message is being transmitted in this frame, agent Nth function ID 2514, agent Nth function message length 2516, and agent Nth function message 2518. Accordingly, service processor communication frame 2502 can include one or more messages as shown in FIG. 17, which can depend on networking frame length requirements and/or other design choices. Similarly, as shown, service controller communication frame 2522 includes service controller framing sequence number 2524, time stamp 2526, agent first function ID 2528, agent first function message length 2530, agent first function message 2532, and, assuming more than one message is being transmitted in this frame, agent Nth function ID 2534, agent Nth function message length 2536, and agent Nth function message 2538. Accordingly, service controller communication frame 2522 can include one or more messages as shown in FIG. 17, which can depend on networking frame length requirements and/or other design choices.

FIGS. 18A through 18J, 19A through 19S, and 20A through 20E present numerous embodiments that can be used in isolation or in combination by a service controller in authenticating the service processor to ensure that it is present and properly configured to implement a device portion of an access network service policy. FIGS. 18A through 18J provide tables summarizing various service processor heartbeat functions and parameters (e.g., implemented by various agents, components, and/or functions implemented in software and/or hardware) in accordance with some embodiments. Many of these heartbeat functions and parameters are similarly described above, and the tables shown in FIGS. 18A-J are not intended to be an exhaustive summary of these heartbeat functions and parameters, but rather are provided as an aid in understanding these functions and parameters in accordance with some heartbeat based embodiments described herein.

FIGS. 19A through 19S provide tables summarizing various device based service policy implementation verification techniques in accordance with some embodiments. Many of these device based service policy implementation verification techniques are similarly described above, and the tables shown in FIGS. 19A-S are not intended to be an exhaustive summary of these device based service policy implementation verification techniques, but rather are provided as an aid in understanding these techniques in accordance with some device based service policy embodiments described herein.

FIGS. 20A through 20E provide tables summarizing various techniques for protecting the device based service policy from compromise in accordance with some embodiments. Many of these techniques for protecting the device based service policy from compromise are similarly described above, and the tables shown in FIGS. 20A-E are not intended to be an exhaustive summary of these techniques for protecting the device based service policy from compromise, but rather are provided as an aid in understanding these techniques in accordance with some device based service policy embodiments described herein.

Figure 21:
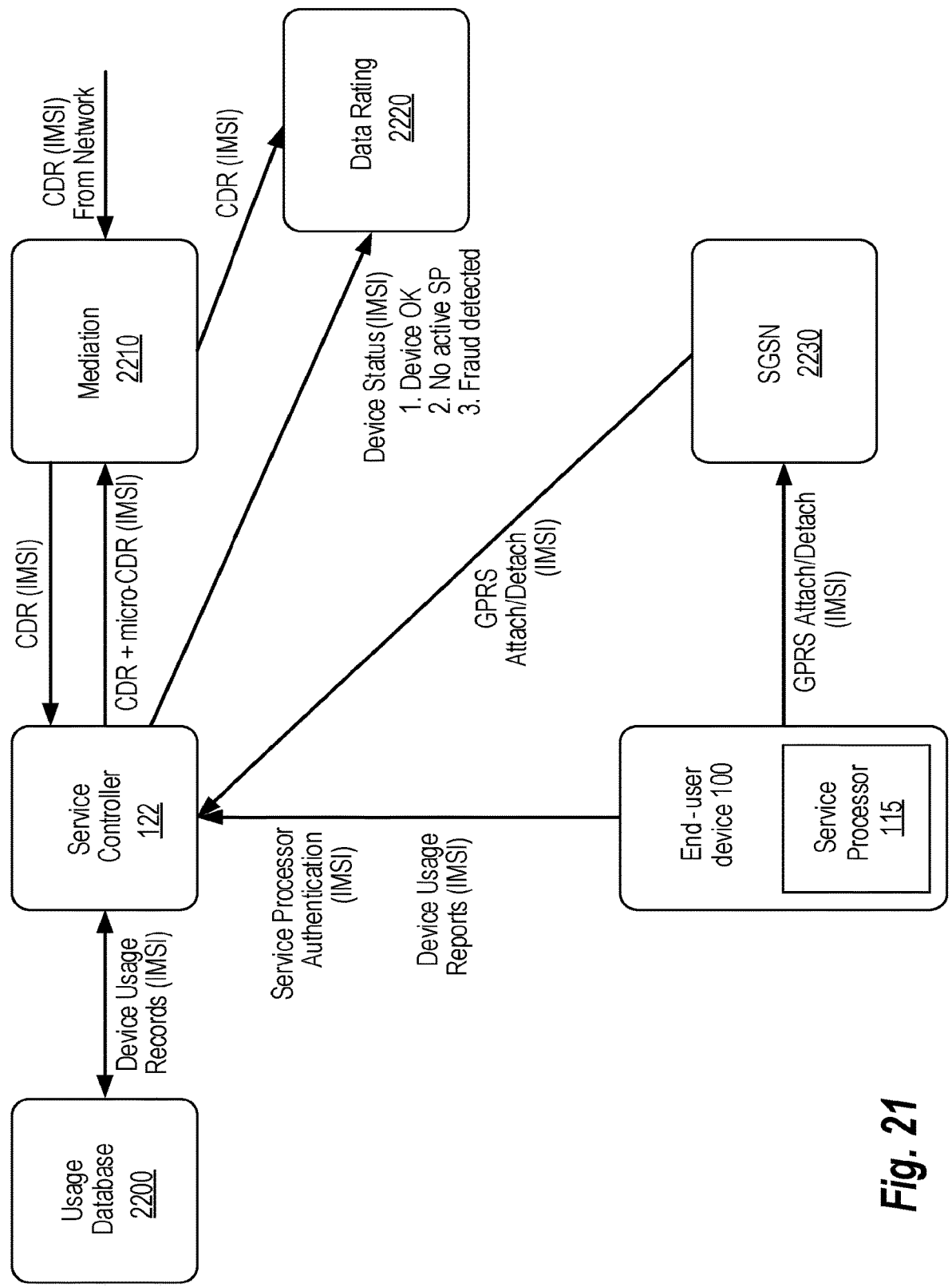
FIG. 21 illustrates an example embodiment of a process to start or stop a data session with SGSN notification.

FIG. 21 illustrates an example embodiment of a process to start or stop a data session with SGSN notification. End-user device 100 attempts to start a data session by sending a GPRS Attach message to SGSN 2230. SGSN 2230 notifies service controller 122 that end-user device 100 has started a data session. Service controller 122 waits for a pre-determined time, for example, one minute, to receive a login or authentication request from service processor 115. In some embodiments, service controller 122 sets a login timer. If service controller 122 receives the login or authentication request before the timer expires, it attempts to authenticate service processor 115.

One or more authentication errors may occur when service controller 122 attempts to authenticate service processor 115. For example, service processor 115 may have invalid credentials. As another example, service processor 115 may send invalid application or kernel signatures. As another example, service processor 115 may report end-user device "root" detection errors. As another example, service processor 115 may contact service controller 122 using an identifier that is already in use by a different end-user device.

If service controller 122 does not receive the request from service processor 115 within the pre-determined time, or if service controller 122 is unable to authenticate service processor 115 for some reason, service controller 122 assumes that either (1) end-user device 100 does not contain a service processor, and is therefore unable to participate in device-assisted services, or (2) although end-user device 100 has a service processor, service processor 115 has been disabled. Service controller 122 sends a notification ("No active SP" message) to data rating element 2220 to indicate that end-user device 100 does not have the ability to provide the information necessary for data mediation element 2210 to generate detailed data usage reports, e.g., "micro-CDRs." In some embodiments, service controller 122 sends a trigger to the network to indicate that end-user device 100 should be charged for usage at "standard" bulk rates. In some embodiments, service controller 122 specifies a "standard" bulk rate charging code in the CDRs it sends to data mediation element 2210. In some embodiments, data rating element 2220 determines data usage by end-user device 100 based on carrier-based records.

If service controller 122 receives the login or authentication request from service processor 115 within the pre-determined time and successfully authenticates service processor 115, service controller 122 sends a notification ("Device OK" message) to data rating element 2220 to indicate that end-user device 100 has a service processor and is capable of supporting device-assisted services. In some embodiments, data rating element 2220 expects to receive "micro-CDR" reports from data mediation element 2210 when service controller 122 has determined that end-user device 100 has an active service processor. In some embodiments, data rating element 2220 determines usage based on the micro-CDRs, which contain more granular information than ordinary CDRs. For example, whereas an ordinary CDR might simply report that an end-user device used 100 Megabytes (MB) of data, a set of micro-CDRs might report that the end-user device used 15 MB of e-mail, 35 MB of social networking, and 50 MB of streaming video.

In some embodiments, data mediation element 2210 sends carrier-based usage reports (e.g., CDRs) to service controller 122. Service controller 122 queries usage database 2200 for device-based usage reports (e.g., micro-CDRs) for end-user device 100. Service controller 122 determines the data usage of end-user device 100 from the carrier-based usage reports. Service controller 122 determines the data usage of end-user device 100 from the device-based usage reports. Service controller 122 compares the usage determined from the carrier-based usage reports to the usage determined from the device-based usage reports. If service controller 122 determines that the two usage measures do not match (e.g., are not identical or are not within a threshold of each other), service controller 122 sends a notification (e.g., a fraud alert) to data rating element 2220 to indicate that the end-user device is in a fraud state, and data rating element 2220 should bill usage for end-user device 100 based on carrier-based usage reports. Service controller 122 sends the carrier-based usage reports and device-based usage reports to data mediation element 2210.

When the "GPRS detach" message is received by SGSN 2230, SGSN 2230 sends a notification to service controller 122 that the data session for end-user device 100 is closed.

Figure 22:
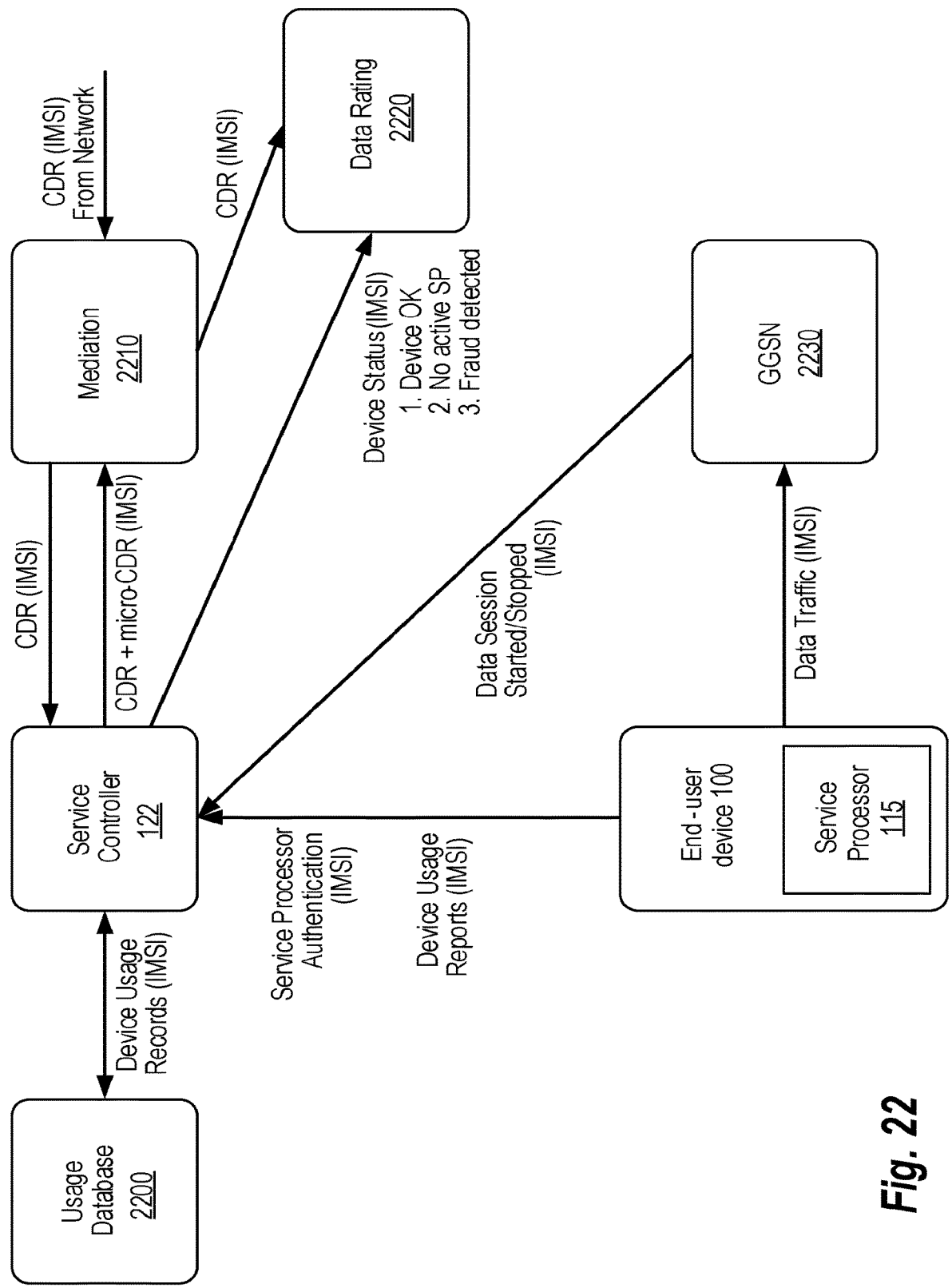
FIG. 22 illustrates an example embodiment of a process to start or stop a data session with GGSN notification.

FIG. 22 illustrates an example embodiment of a process to start or stop a data session with GGSN notification. The process is similar to that described with reference to FIG. 21, except in how the data session starts and ends. End-user device 100 starts a data session by sending data traffic to GGSN 2240. GGSN 2240 recognizes the start of a new data session and notifies service controller 122 that end-user device 100 has started a data session. When GGSN 2240 determines that the data session has closed, it sends a notification to service controller 122 that the data session for end-user device 100 is closed.

As discussed above, in some embodiments a device service processor can provide information to assist in classification of service usage for any combination of device application, network destination or resource, a type of network, roaming condition (e.g., home or roaming network), a time period, a level of network congestion, a level of network QoS, and a background or foreground communication. In some embodiments, when a service processor provides service usage for a classification of service usage involving one or more of device application, network destination or resource, a type of network, roaming condition (e.g., home or roaming network), a time period, a level of network congestion, a level of network QoS, and a background or foreground communication, service processor 115 generates a service usage report, called a "micro-CDR," that is then communicated to a network element (e.g., a service controller). The micro-CDR provides a service usage accounting breakdown in finer detail (e.g., including information about a device application, network destination or resource, a type of network, roaming condition (e.g., home or roaming network), a time period, a level of network congestion, a level of network QoS, and a background or foreground communication) than a "bulk" CDR that does not provide such a usage accounting breakdown.

In some embodiments, a device is configured to receive access network services and is further configured to include a service processor capability to account for one or more service activity classifications and send the accounting to a service controller. In some embodiments the service controller is configured to communicate at least a portion of the service processor service accounting as a service usage credit to a service usage reconciliation system. Note that a service usage reconciliation system is also referred to herein in various embodiments as a service usage mediation system or similar term involving mediation. In some embodiments, the service usage reconciliation system is configured to remove a credit from a user service accounting or usage bill. In some embodiments, the service usage credit that is removed from a user service accounting or usage bill is allocated to sponsor service accounting or bill.

In some embodiments it is advantageous to reconcile the micro-CDR service usage accounting reports received from a service processor against a trusted source. In some embodiments, this is accomplished through a system that provides usage credit for one or more micro-CDR usage reports that are reconciled with or validated by a trusted source. In some embodiments, if such credit is provided, the corresponding usage is removed from the user "bulk" usage and re-assigned to the user according to service usage accounting rules associated with the micro-CDR classification. In some embodiments the micro-CDR accounting rules can be designed to account micro-CDR service usage report accounting to a paid user service classification (e.g., a device application based service accounting, a network destination or resource based service accounting, a roaming service usage accounting, etc.). In some embodiments, the micro- CDR accounting rules can be designed to account micro-CDR service usage report accounting to a sponsored service classification (e.g., a sponsored device application based service accounting, a sponsored network destination or resource-based service accounting, a sponsored background classification of service usage, a sponsored content source classification of service usage, a sponsored shopping service, etc.).

In some embodiments the trusted source used to validate micro-CDR service usage classification reports is an FDR (flow data record) source that reports a detailed level of classification that indicates network source or destination (e.g., domain, URL, IP address, etc.) and possibly one or more ports and protocols. In some embodiments, the source of the FDR is a network element. In some embodiments the source of the FDR is a device agent. In some embodiments, the agent that generates the FDR report is located in a secure execution environment on the device. In some embodiments, the agent that generates the FDR report is located in a secure hardware environment on the device. In some embodiments, the agent that generates the FDR report uses a secure transmission protocol with the service controller that is sequenced and signed and/or encrypted in a manner wherein if the sequence of FDR reports or the content of FDR reports is tampered with, then an FDR integrity violation may be detected by the service controller. In some embodiments, a communication from the service controller to the agent generating the FDR reports is sequenced and signed and/or encrypted in a manner wherein if the sequence of FDR reports or the content of FDR reports is tampered with, then an FDR integrity violation may be detected by the agent generating the FDR reports. In some embodiments, when the agent generating the FDR reports detects an FDR integrity violation, the agent generating the FDR reports causes device access to be quarantined or blocked for one or more access networks. In some embodiments, other device communication links than access network links can also be quarantined or blocked, including one or more of wired device access ports (e.g., Ethernet, USB, firewire, etc.), Bluetooth, WiFi, and near field communications.

In some embodiments, the trusted source used to validate micro-CDR service usage classification reports is a network-based element such as a server, gateway, proxy or router that processes the classification of service associated with the micro-CDR. In some embodiments, the network-based element classifies service usage associated with the micro-CDR, measures the service usage, and provides a service usage classification report back to a service controller so that it can be reconciled against the mirco-CDR reports.

In some embodiments, a device is configured to receive access network services and is further configured to include a service processor capability to route, re-direct or otherwise steer traffic for one or more service activity classifications to one or more proxy gateway/servers. In some such embodiments, a service usage reconciliation system is configured to receive device service usage information (e.g., a credit amount) from the one or more proxy gateway/servers, and the service usage information is used in removing an amount (e.g., a credit amount) from service usage allocated to or charged to a user bill by the service usage reconciliation system. In some embodiments, the device routing is accomplished by routing, re-directing, or steering device traffic for one or more service usage classifications to a specific network destination or resource associated with the proxy gateway/server. In some embodiments, the routing, re-directing, or steering is accomplished using a secure tunnel through the network. In some embodiments the routing, re-directing, or steering is accomplished using an SSL, VPN or APN tunnel.

In some embodiments, a device service processor classifies service usage according to a service classification policy and routes, re-directs, or steers the traffic associated with the classification policy to a network element (e.g., a server, gateway, proxy or router that processes the classification of service associated with the micro-CDR) that generates the micro-CDR for that service usage accounting. In this manner, the device can associate service usage for device applications or OS functions with a specific network destination that in turn further processes the traffic and generates the appropriate micro-CDRs that are sent to the service controller for reconciliation (e.g., mediation) as described above. The service processor can steer the traffic classified according to the classification policy by re-directing the traffic to the network destination associated with the appropriate network element, routing the traffic to the network destination associated with the appropriate network element, or tunneling or securely tunneling (e.g. SSL, VPN, APN) the traffic to the network destination associated with the appropriate network element.

In some embodiments, the trusted source used to validate micro-CDR service usage classification reports is a server or website that provides the service, and the validation is provided in the form of good customer feedback associated with a user credential, a service processor credential or a device credential that can be used to determine which device or user to provide the credit to. For example, if a website is associated with the service usage classification defined for a micro-CDR, and the website is visited by a device with a given device credential or user credential, and the website servers track the number of visits, number of transactions, amount of business generated, amount of data communicated or another measure of device interaction with the website, then a summary of this device interaction with the website can be communicated to the service controller and the service controller can provide credit for the micro-CDR.

In some embodiments, another means of limiting the possibility of improper service usage accounting due to improper configuration of a service processor or tampering with a service processor can be accomplished by capping the amount of service over a given period of time that is allowed for a given micro-CDR service usage classification category (e.g., by limiting the amount of service usage in a given period of time for one or more service usage classifications including a device application, network destination or resource, a type of network, a roaming condition (e.g., home or roaming network), a time period, a level of network congestion, a level of network QoS, or a background or foreground communication). In some embodiments, capping the amount of service over a given period of time that is allowed for a given micro-CDR service usage classification category is advantageous as a way of limiting service usage costs for a user-paid service that is based on a specific classification of service usage. In some embodiments, capping the amount of service over a given period of time that is allowed for a given micro-CDR service usage classification category is advantageous as a way of limiting service usage costs for a sponsored service that is based on a specific classification of service usage. In some embodiments, the possibility of service usage report tampering for one or more micro-CDR service usage classification categories is limited by combining reconciliation of service usage using one or more of start/stop accounting, CDR feedback, FDR feedback, etc., and setting a limit on the usage that is allowed for one or more of the micro-CDR service usage classification categories.

In some embodiments, the possibility of service usage report tampering for one or more micro-CDR service usage classification categories is limited by comparing the total service usage for all combined micro-CDR service usage classifications against the total amount of service used in bulk CDR reports received from a trusted source.

In some embodiments using associative classification (also referred to as adaptive ambient service usage classification), some service usage that can not be directly identified as belonging to a give micro-CDR service usage classification is assigned to the micro-CDR service usage classification based on one or more of: (i) time proximity with one or more known service usage flows identified as belonging to the micro-CDR classification, (ii) a maximum amount of service usage (e.g., byte count) that has occurred since one or more known service usage flows that belong the micro-CDR classification were identified, or (iii) the fact that the unidentified service usage is associated with the same application as one or more known service usage flows that belong to the micro-CDR classification.

In some such associative classification (adaptive ambient service classification) embodiments, service usage fraud exposure can be limited by setting a limit on the amount of service usage that can be "unaccounted for" so that if the majority of usage can be classified as belonging to a micro-CDR service usage classification category, the unaccounted-for service usage is allowed to be accounted for in the same micro-CDR accounting. In this manner, if fraudulent service usage activity results in a large percentage of service usage that is not known to be classified as belonging to the micro-CDR usage classification category, a micro-CDR accounting integrity violation can be declared. Service usage above the limits that cannot be reconciled (accounted for) can alternatively be accounted for (e.g., charged to the user) at an agreed-upon contract rate. In some embodiments, the agreed-upon rate is as high or higher than the rate for user paid bulk services (e.g., higher than the rate at which sponsored and specialized application or website based services are billed). In some embodiments, the user is sent a notification by the service controller that the user is being billed at the higher rate. In some embodiments, the user signs up to a service agreement wherein the user agrees to be billed at the higher rate in the event that the service processor is compromised or the micro-CDR accounting is compromised.

In some embodiments, the micro-CDR reports include the amount of service usage that was identified by the service processor as known to belong to the micro-CDR service usage category. In some embodiments, a flow identifier (e.g., domain, URL, IP address, port, or device application associated with [originating or terminating] the flow) can be provided in the micro-CDR reports for service usage known to belong to the micro-CDR classification. In some embodiments, the service controller samples or scans these "known good" micro-CDR flow identifiers to ensure that the flows do in fact belong to the micro-CDR service usage classification, and if they do not a micro-CDR accounting integrity violation can be declared. In some embodiments a flow identifier (e.g., domain, URL, IP address, port, or device application associated with [originating or terminating] the flow) can be provided in the micro-CDR reports for service usage that cannot be classified as belonging to the micro-CDR classification. In some embodiments, the service controller samples or scans these "unknown" micro-CDR flow identifiers to determine if the service destination patterns indicate fraudulent service usage that is inconsistent with micro-CDR classification policies, and if so a micro-CDR accounting integrity violation can be declared.

In some embodiments, a SIM that is expected to be installed in a device configured with a properly configured service processor is allocated a relatively small service usage cap in a network portion of an access network service usage policy so that the device can connect to the network and allow the service processor to authenticate with the service controller. By limiting the initial amount of service usage allowed prior to the service processor authentication with the service controller, it is not possible to get a large amount of service prior to ensuring that a properly configured service processor is present on the device. In some embodiments, once the device service processor is authenticated, an increment can be added to the usage limit in the network portion of the access network service policy. In some embodiments, additional usage limit increments can be added to the network portion of the access network service policy as device service processor generated CDRs, FDRs or micro-CDRs are received by the service controller. In some embodiments, if at any time the flow of CDRs, FDRs or micro-CDRs from the device is tampered with or stopped, the service controller stops incrementing the usage limit in the network portion of access network service policy, and the device access is denied. Alternatively, in some embodiments, rather than stopping service when a service processor is removed or tampered with, the network portion of the access network service policy calls for the application of a higher rate of billing as compared to one or more micro-CDR billing rates for micro-CDR credits provided by the service controller (e.g., user paid application based services, user paid website based services, user paid content services, sponsored application based services, sponsored website based services or sponsored content based services). In some embodiments, if the service processor ceases to send micro-CDRs to the service controller, the user ceases to be credited for the micro-CDR service usage and all usage is billed at a bulk rate that may be higher than the micro-CDR service rates.

In some embodiments, a SIM is provided or sold to a user wherein the SIM is associated with sponsored services that are based on network access service policies configured in the network policy enforcement elements and a service controller. In such embodiments, the problem arises that the SIM may be installed in a device that does not have a properly configured service processor, giving rise to the possibility that a user could receive unintended free services with the sponsored SIM. Embodiments described above can be used to limit the amount of access the SIM is allowed to receive prior to service processor authentication with the service controller by limiting the initial service usage amount allowed in the initial network portion of access network service policy. However, if a number of sponsored SIMs are readily available and inexpensive or free, a user could potentially swap several SIMs into the device and remove each SIM when the service controller fails to authenticate the service processor. In some embodiments, the service controller recognizes the SIM and a second device credential (e.g., an IMEI, a modem credential or a device credential) the first time the sponsored SIM acquires service usage and fails to authenticate the service processor for that device. Once the service processor fails to authenticate with the service controller, the service controller re-sets the network portion of the access network service policy to deny service the next time a SIM attempts to authenticate with the device credential associated with the original SIM.

In some embodiments, good customer feedback may be used as a micro-CDR credit source directly without a service processor on the device. For example, in some embodiments, a website is associated with the service usage classification defined for a micro-CDR, and the website or server that is visited by a device with a given device credential or user credential tracks one or more of the number of visits, number of transactions, amount of business generated, amount of data communicated or another measure of device interaction with the website or server, creates a summary report of this device interaction with the website or server, and then communicates the summary report to a service controller. The service controller can then reconcile the good customer feedback summary report of the device interaction with the website or server by applying a user service usage credit rating rule to deduct a bulk portion of service usage from the user account and add a classification of service usage to the user account that is rated for billing purposes by a rating rule for the given micro-CDR classification. Alternatively, the service controller can deduct a portion of the good customer micro-CDR service usage accounting or billing from the user account and add it to a sponsor entity account, such as the entity that provides the website or server service. In this way, a micro-CDR service usage charging system can be implemented in a network for classification service usage with specialized service usage classification rating, for both user paid classification and sponsored classifications, without the need for a service processor on the device.

Although the foregoing embodiments have been described in some detail for purposes of clarity of understanding, the invention is not limited to the details provided. There are many alternative ways of implementing the invention. The disclosed embodiments are illustrative and not restrictive.

CROSS REFERENCE TO OTHER APPLICATIONS

This document incorporates by reference for all purposes the following non-provisional U.S. patent applications: application Ser. No. 12/380,778, filed Mar. 2, 2009, entitled VERIFIABLE DEVICE ASSISTED SERVICE USAGE BILLING WITH INTEGRATED ACCOUNTING, MEDIATION ACCOUNTING, AND MULTI-ACCOUNT, now U.S. Pat. No. 8,321,526 (issued Nov. 27, 2012); application Ser. No. 12/380,780, filed Mar. 2, 2009, entitled AUTOMATED DEVICE PROVISIONING AND ACTIVATION, now U.S. Pat. No. 8,839,388 (issued Sep. 16, 2014); application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012); application Ser. No. 12/695,020, filed Jan. 27, 2010, entitled ADAPTIVE AMBIENT SERVICES, now U.S. Pat. No. 8,406,748 (issued Mar. 26, 2013); application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); application Ser. No. 12/694,451, filed Jan. 27, 2010, entitled DEVICE GROUP PARTITIONS AND SETTLEMENT PLATFORM, now U.S. Pat. No. 8,548,428 (issued Oct. 1, 2013); application Ser. No. 12/694,455, filed Jan. 27, 2010, entitled DEVICE ASSISTED SERVICES INSTALL, now U.S. Pat. No. 8,402,111 (issued Mar. 19, 2013); application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); application Ser. No. 13/134,005, filed May 25, 2011, entitled SYSTEM AND METHOD FOR WIRELESS NETWORK OFFLOADING, now U.S. Pat. No. 8,635,335 (issued Jan. 21, 2014); application Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); and application Ser. No. 13/229,580, filed Sep. 9, 2011, entitled WIRELESS NETWORK SERVICE INTERFACES, now U.S. Pat. No. 8,626,115 (issued Jan. 7, 2014).

This document incorporates by reference for all purposes the following provisional patent applications: Provisional Application No. 61/206,354, filed Jan. 28, 2009, entitled SERVICES POLICY COMMUNICATION SYSTEM AND METHOD; Provisional Application No. 61/206,944, filed Feb. 4, 2009, entitled SERVICES POLICY COMMUNICATION SYSTEM AND METHOD; Provisional Application No. 61/207,393, filed Feb. 10, 2009, entitled SERVICES POLICY COMMUNICATION SYSTEM AND METHOD; and Provisional Application No. 61/207,739, entitled SERVICES POLICY COMMUNICATION SYSTEM AND METHOD, filed Feb. 13, 2009; Provisional Application No. 61/270,353, filed on Jul. 6, 2009, entitled DEVICE ASSISTED CDR CREATION, AGGREGATION, MEDIATION AND BILLING; Provisional Application No. 61/275,208, filed Aug. 25, 2009, entitled ADAPTIVE AMBIENT SERVICES; and Provisional Application No. 61/237,753, filed Aug. 28, 2009, entitled ADAPTIVE AMBIENT SERVICES; Provisional Application No. 61/252,151, filed Oct. 15, 2009, entitled SECURITY TECHNIQUES FOR DEVICE ASSISTED SERVICES; Provisional Application No. 61/252,153, filed Oct. 15, 2009, entitled DEVICE GROUP PARTITIONS AND SETTLEMENT PLATFORM; Provisional Application No. 61/264,120, filed Nov. 24, 2009, entitled DEVICE ASSISTED SERVICES INSTALL; Provisional Application No. 61/264,126, filed Nov. 24, 2009, entitled DEVICE ASSISTED SERVICES ACTIVITY MAP; Provisional Application No. 61/348,022, filed May 25, 2010, entitled DEVICE ASSISTED SERVICES FOR PROTECTING NETWORK CAPACITY; Provisional Application No. 61/381,159, filed Sep. 9, 2010, entitled DEVICE ASSISTED SERVICES FOR PROTECTING NETWORK CAPACITY; Provisional Application No. 61/381,162, filed Sep. 9, 2010, entitled SERVICE CONTROLLER INTERFACES AND WORKFLOWS; Provisional Application No. 61/384,456, filed Sep. 20, 2010, entitled SECURING SERVICE PROCESSOR WITH SPONSORED SIMS; Provisional Application No. 61/389,547, filed Oct. 4, 2010, entitled USER NOTIFICATIONS FOR DEVICE ASSISTED SERVICES; Provisional Application No. 61/385,020, filed Sep. 21, 2010, entitled SERVICE USAGE RECONCILIATION SYSTEM OVERVIEW; Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; Provisional Application No. 61/387,247, filed Sep. 28, entitled SECURED DEVICE DATA RECORDS, 2010; Provisional Application No. 61/407,358, filed Oct. 27, 2010, entitled SERVICE CONTROLLER AND SERVICE PROCESSOR ARCHITECTURE; Provisional Application No. 61/418,507, filed Dec. 1, 2010, entitled APPLICATION SERVICE PROVIDER INTERFACE SYSTEM; Provisional Application No. 61/418,509, filed Dec. 1, 2010, entitled SERVICE USAGE REPORTING RECONCILIATION AND FRAUD DETECTION FOR DEVICE ASSISTED SERVICES; Provisional Application No. 61/420,727, filed Dec. 7, 2010, entitled SECURE DEVICE DATA RECORDS; Provisional Application No. 61/422,565, filed Dec. 13, 2010, entitled SERVICE DESIGN CENTER FOR DEVICE ASSISTED SERVICES; Provisional Application No. 61/422,572, filed Dec. 13, 2010, entitled SYSTEM INTERFACES AND WORKFLOWS FOR DEVICE ASSISTED SERVICES; Provisional Application No. 61/422,574, filed Dec. 13, 2010, entitled SECURITY AND FRAUD DETECTION FOR DEVICE ASSISTED SERVICES; Provisional Application No. 61/435,564, filed Jan. 24, 2011, entitled FRAMEWORK FOR DEVICE ASSISTED SERVICES; and Provisional Application No. 61/472,606, filed Apr. 6, 2011, entitled MANAGING SERVICE USER DISCOVERY AND SERVICE LAUNCH OBJECT PLACEMENT ON A DEVICE.

What is claimed is:

1. A network system, comprising:
one or more network elements configured to receive a device credential and request to connect to a network from an end-user device having a service processor, and,
based on the request, device credential, and a network service usage policy, allow the device to connect to the network with an initial service usage limit sufficient to allow the device to contact, through the network, a service processor authentication and management system to authenticate, the initial service usage limit insufficient to allow the device to obtain a significant amount of network services prior to authenticating; and
the service processor authentication and management system, configured to:
obtain service processor authentication information for the end-user device service processor,
using the service processor authentication information, facilitate execution of an end-user device service processor authentication procedure, and
upon successful completion of the end-user device service processor authentication procedure, signal the one or more network elements to increase or remove the initial service usage limit.

2. The network system of claim 1, wherein configured to signal the one or more network elements to increase or remove the initial service usage limit comprises configured to signal the one or more network elements to add an increment of allowed service usage to the service usage limit.

3. The network system of claim 2, wherein the service processor authentication and management system is further configured to, after signaling the one or more network elements to add an increment of allowed service usage to the service usage limit, accept a flow of data usage records from the end-user device service processor.

4. The network system of claim 3, wherein the service processor authentication and management system if further configured to, while a flow of data usage records continues, verify the integrity of at least a portion of the flow of data usage records, and, upon successful integrity verification, signal the one or more network elements to add additional increments of allowed service usage to the service usage limit so as to allow the end-user device to continue accessing network services.

5. The network system of claim 4, wherein the service processor authentication and management system is further configured to, upon either of unsuccessful integrity verification and a stoppage in the flow of data usage records, signal the one or more network elements to change the network service usage policy applied to the end-user device.

6. The network system of claim 5, wherein the change in the network service usage policy disallows access to the network.

7. The network system of claim 5, wherein the change in the network service usage policy bills network usage for the end-user device at a higher rate.

8. The network system of claim 4, wherein at least a portion of the flow of data usage records indicate a sponsored background classification of service usage.

9. The network system of claim 4, wherein at least a portion of the flow of data usage records indicate a classification of service usage that differentiates between background and foreground communication.

10. The network system of claim 9, wherein at least a portion of the flow of data usage records indicate a classification of service usage that differentiates according to which of a plurality of device applications is responsible for respective portions of the service usage.

11. The network system of claim 4, wherein at least a portion of the flow of data usage records indicate a classification of service usage that differentiates according to which of a plurality of device applications is responsible for respective portions of the service usage.

12. The network system of claim 4, wherein at least a portion of the flow of data usage records indicate a classification of service usage that differentiates according to a network destination or resource accessed for respective portions of the service usage.

13. The network system of claim 4, wherein at least a portion of the flow of data usage records indicate a classification of service usage that differentiates according to a type of network used for respective portions of the service usage.

14. The network system of claim 3, further comprising an intermediate message server link in direct communication with the end-user device service processor, where configured to accept a flow of data usage records from the end-user device service processor comprises configured to accept the flow as messages from the intermediate message server link.

15. The network system of claim 14, wherein the flow of messages from the intermediate message server link are encrypted with unique keys shared between an agent on the end-user device and the service processor authentication and management system.

16. The network system of claim 1, wherein the end-user device service processor comprises a service processor configuration stored on a Subscriber Identity Module (SIM) installed in the end-user device.

17. The network system of claim 16, wherein the SIM and service processor are associated with one or more sponsored network services.

18. The network system of claim 17, wherein the one or more sponsored network services include network service for one or more device applications.

* * * * *